United States Patent
Temblador et al.

(10) Patent No.: US 10,766,735 B2
(45) Date of Patent: *Sep. 8, 2020

(54) FLANGE STAND AND ADAPTER FOR FLANGES

(71) Applicant: SOUTHWIRE COMPANY, LLC, Carrollton, GA (US)

(72) Inventors: Richard Mike Temblador, Carrollton, GA (US); Myron Dale Deese, Carrollton, GA (US); Harry William Kent, Jr., Carrollton, GA (US); Juan Alberto Galindo Gonzalez, Powder Springs, GA (US); James Phillip Tuggle, Carrollton, GA (US); Franklin Clarence Calhoun, Carrollton, GA (US)

(73) Assignee: Southwire Company, LLC, Carollton, GA (US)

( * ) Notice: Subject to any disclaimer, the term of this patent is extended or adjusted under 35 U.S.C. 154(b) by 103 days.

This patent is subject to a terminal disclaimer.

(21) Appl. No.: 15/726,158

(22) Filed: Oct. 5, 2017

(65) Prior Publication Data

US 2018/0029825 A1 Feb. 1, 2018

Related U.S. Application Data

(63) Continuation-in-part of application No. 15/482,025, filed on Apr. 7, 2017, now Pat. No. 10,221,036, (Continued)

(51) Int. Cl.
   *B65H 75/18* (2006.01)
   *B65H 75/24* (2006.01)
   (Continued)

(52) U.S. Cl.
   CPC ......... *B65H 75/185* (2013.01); *B65H 49/321* (2013.01); *B65H 49/325* (2013.01);
   (Continued)

(58) Field of Classification Search
   CPC .... B65H 75/22; B65H 75/146; B65H 75/005; B65H 75/185; B65H 75/505; B65H 75/242; B65H 75/403; B65H 75/40; B65H 75/248
   See application file for complete search history.

(56) References Cited

U.S. PATENT DOCUMENTS

| | | |
|---|---|---|
| 220,460 A | 10/1879 | Yobk |
| 308,411 A | 11/1884 | Harding |

(Continued)

FOREIGN PATENT DOCUMENTS

| | | |
|---|---|---|
| CA | 2869183 A1 | 12/2013 |
| CN | 102107824 A | 6/2011 |

(Continued)

OTHER PUBLICATIONS

Non-Final Office Action dated May 4, 2018 in U.S. Appl. No. 15/482,025, 8 pages.

(Continued)

*Primary Examiner* — William E Dondero
(74) *Attorney, Agent, or Firm* — Merchant & Gould P.C.

(57) ABSTRACT

A flange for use on a reel, a flange adapter, and a flange stand are provided. The flange may include an outer circumference, a hub assembly, and an arbor hole adapter that is adapted to engage an arbor hole to secure the flange to the reel. The arbor hole adapter may include an expandable portion that is movable between an extended position and a retracted position. First and second expansion plates may be coupled to the arbor hole adapter and connected by shoulder bolts that guide movement of the plates between an abutting (Continued)

configuration and a spaced-apart configuration, allowing movement of the expandable portion relative to the reel for modified engagement. The flange stand may include a base, a support portion, and a coupler for engaging a central extension of the flange to allow the flange to be supported in an upright position.

10 Claims, 40 Drawing Sheets

Related U.S. Application Data which is a continuation of application No. 15/239,163, filed on Aug. 17, 2016, now Pat. No. 9,617,112.

(60) Provisional application No. 62/313,404, filed on Mar. 25, 2016, provisional application No. 62/277,748, filed on Jan. 12, 2016, provisional application No. 62/243,494, filed on Oct. 19, 2015, provisional application No. 62/207,374, filed on Aug. 19, 2015, provisional application No. 62/405,084, filed on Oct. 6, 2016.

(51) Int. Cl.
| | | |
|---|---|---|
| *B65H 75/22* | (2006.01) | |
| *B65H 75/40* | (2006.01) | |
| *B65H 75/14* | (2006.01) | |
| *B65H 49/32* | (2006.01) | |
| *B65H 49/38* | (2006.01) | |
| *B65H 49/36* | (2006.01) | |
| *B21C 47/28* | (2006.01) | |

(52) U.S. Cl.
CPC .............. *B65H 49/36* (2013.01); *B65H 49/38* (2013.01); *B65H 75/14* (2013.01); *B65H 75/146* (2013.01); *B65H 75/22* (2013.01); *B65H 75/24* (2013.01); *B65H 75/248* (2013.01); *B65H 75/403* (2013.01); *B21C 47/28* (2013.01)

(56) References Cited

U.S. PATENT DOCUMENTS

| | | | |
|---|---|---|---|
| 364,434 | A | 6/1887 | Pitmon |
| 486,010 | A | 11/1892 | Wirt |
| 582,451 | A | 5/1897 | Brandon |
| 613,138 | A | 10/1898 | Gempeler |
| 1,353,541 | A | 9/1920 | Retterer et al. |
| 1,461,939 | A | 7/1923 | Sager et al. |
| 1,561,160 | A | 11/1925 | Ingenthron et al. |
| 1,661,991 | A | 3/1928 | Benit et al. |
| 1,726,137 | A | 8/1929 | Bernal |
| 1,795,853 | A | 3/1931 | Glass et al. |
| 1,852,939 | A | 4/1932 | Schmidt et al. |
| 1,858,825 | A | 5/1932 | Hescock et al. |
| 1,882,950 | A | 10/1932 | Rulon, Jr. et al. |
| 1,949,378 | A | 2/1934 | Roehm et al. |
| 1,961,376 | A | 6/1934 | McIlvried et al. |
| 2,132,043 | A | 10/1938 | Oldham et al. |
| 2,549,224 | A | 4/1951 | Moldovan et al. |
| 2,553,835 | A | 5/1951 | Sachs et al. |
| 2,707,599 | A | 5/1955 | Snyder et al. |
| 2,720,285 | A | 10/1955 | Taylor et al. |
| 2,960,857 | A | 11/1960 | Winter et al. |
| 2,982,491 | A | 5/1961 | Beiderwell et al. |
| 3,009,667 | A | 11/1961 | Browne et al. |
| 3,152,772 | A | 10/1964 | Schjerven et al. |
| 3,184,175 | A | 5/1965 | Geen et al. |
| 3,207,456 | A | 9/1965 | Hill et al. |
| 3,294,338 | A | 12/1966 | O'Brien et al. |
| 3,298,667 | A | 1/1967 | Grantham et al. |
| 3,393,790 | A | 7/1968 | Dixon et al. |
| 3,405,881 | A | 10/1968 | Sanford et al. |
| 3,450,366 | A | 6/1969 | Goldberg |
| 3,633,316 | A | 1/1972 | Belser |
| 3,652,026 | A | 3/1972 | Awebro |
| 3,762,100 | A | 10/1973 | Kempel |
| 3,820,733 | A | 6/1974 | Roederer et al. |
| 3,822,841 | A | 7/1974 | Campbell et al. |
| 3,850,382 | A | 11/1974 | Clingerman et al. |
| 3,860,193 | A | 1/1975 | Green |
| 3,900,967 | A | 8/1975 | Bursk et al. |
| 3,967,412 | A | 7/1976 | Governale |
| 3,976,260 | A | 8/1976 | Irik |
| 3,997,127 | A | 12/1976 | Kovaleski |
| 4,006,562 | A | 2/1977 | Belanger et al. |
| 4,034,933 | A | 7/1977 | Hara et al. |
| 4,047,751 | A | 9/1977 | Koike et al. |
| 4,055,917 | A | 11/1977 | Coller |
| 4,060,272 | A | 11/1977 | Mori et al. |
| 4,074,464 | A | 2/1978 | McCay |
| 4,176,801 | A | 12/1979 | Douglas |
| 4,183,475 | A | 1/1980 | Martija |
| D254,595 | S | 4/1980 | Hart |
| 4,224,766 | A | 9/1980 | Procton |
| 4,226,383 | A | 10/1980 | Douglas et al. |
| 4,232,837 | A | 11/1980 | Cutler et al. |
| 4,237,664 | A | 12/1980 | Wilmes |
| 4,255,902 | A | 3/1981 | Ruff |
| 4,287,684 | A | 9/1981 | McKann |
| 4,289,418 | A | 9/1981 | Westin et al. |
| 4,290,233 | A | 9/1981 | Hubbard |
| 4,298,174 | A | 11/1981 | Kovaleski |
| 4,310,991 | A | 1/1982 | Seely |
| 4,325,522 | A | 4/1982 | Sauber |
| 4,333,616 | A | 6/1982 | Strouse |
| 4,352,258 | A | 10/1982 | Bursk et al. |
| 4,354,644 | A | 10/1982 | Grant |
| 4,447,012 | A | 5/1984 | Woodruff et al. |
| 4,462,555 | A | 7/1984 | Olson et al. |
| 4,492,405 | A | 1/1985 | Chikaraishi et al. |
| 4,496,186 | A | 1/1985 | Tuchiya et al. |
| 4,513,536 | A | 4/1985 | Giguere et al. |
| 4,549,761 | A | 10/1985 | Lee et al. |
| 4,605,237 | A | 8/1986 | Torgrimson |
| 4,626,026 | A | 12/1986 | Hasegawa et al. |
| 4,628,639 | A | 12/1986 | Lownsdale et al. |
| 4,686,793 | A | 8/1987 | Mills |
| 4,716,683 | A | 1/1988 | Minter |
| 4,726,147 | A | 2/1988 | Beske et al. |
| 4,746,078 | A | 5/1988 | Setzke |
| 4,747,561 | A | 5/1988 | Sweeny et al. |
| 4,784,221 | A | 11/1988 | Share et al. |
| 4,807,923 | A | 2/1989 | Nakamura et al. |
| 4,825,507 | A | 5/1989 | Killingstad et al. |
| 4,831,779 | A | 5/1989 | Kehrli et al. |
| 4,919,471 | A | 4/1990 | Seino et al. |
| 4,948,064 | A | 8/1990 | Richard et al. |
| 5,040,739 | A | 8/1991 | Wolf et al. |
| 5,054,745 | A | 10/1991 | Swayze et al. |
| 5,060,882 | A | 10/1991 | Rousculp et al. |
| 5,113,976 | A | 5/1992 | Noakes |
| D347,988 | S | 6/1994 | Thorne |
| D354,572 | S | 1/1995 | Headrick |
| 5,379,965 | A | 1/1995 | Isler et al. |
| 5,490,805 | A | 2/1996 | Bredesen et al. |
| 5,611,173 | A | 3/1997 | Headrick et al. |
| D385,525 | S | 10/1997 | Beavers et al. |
| 5,743,486 | A | 4/1998 | Bulman |
| 5,752,670 | A | 5/1998 | Lasecki et al. |
| 5,868,348 | A | 2/1999 | Bulman |
| 5,908,172 | A | 6/1999 | Pierro et al. |
| 6,105,604 | A | 8/2000 | Furness et al. |
| 6,122,864 | A | 9/2000 | Martin et al. |
| 6,138,413 | A | 10/2000 | Fehr et al. |
| 6,161,343 | A | 12/2000 | Young |
| 6,193,185 | B1 | 2/2001 | Kim |
| 6,234,421 | B1 | 5/2001 | Cox et al. |
| 6,299,100 | B1 | 10/2001 | Cloud |
| 6,305,409 | B1 | 10/2001 | Furness |

(56) References Cited

U.S. PATENT DOCUMENTS

| | | |
|---|---|---|
| 6,318,665 B1 | 11/2001 | King |
| 6,419,184 B1 | 7/2002 | Oppmann et al. |
| 6,435,450 B1 | 8/2002 | Shields et al. |
| D488,243 S | 4/2004 | Babka et al. |
| 6,978,960 B2 | 12/2005 | Schaller |
| 7,222,818 B2 | 5/2007 | Couchey et al. |
| D582,451 S | 12/2008 | Davies et al. |
| 7,594,771 B2 | 9/2009 | Mindler |
| D613,231 S | 4/2010 | Anderson et al. |
| 7,861,904 B1 | 1/2011 | Taylor et al. |
| 7,874,511 B2 | 1/2011 | Chiorgno et al. |
| 8,016,267 B2 | 9/2011 | Jordan et al. |
| 8,245,965 B2 | 8/2012 | Andrea et al. |
| 8,272,591 B2 | 9/2012 | Baranov et al. |
| 8,403,345 B2 | 3/2013 | Iossa et al. |
| 8,444,078 B1 | 5/2013 | Brown et al. |
| 8,602,341 B2 | 12/2013 | Land |
| 8,616,485 B2 | 12/2013 | Iossa |
| D709,932 S | 7/2014 | Schuetz et al. |
| 9,027,908 B1 | 3/2015 | Calhoun et al. |
| 9,004,392 B1 | 4/2015 | Bigbee, Jr. et al. |
| 9,016,607 B2 | 4/2015 | Wong et al. |
| D742,733 S | 11/2015 | Galindo Gonzalez et al. |
| 9,409,744 B2 | 8/2016 | Jordan et al. |
| 9,452,908 B1 | 9/2016 | Bigbee, Jr. et al. |
| 9,617,112 B1 * | 4/2017 | Temblador ............. B65H 75/24 |
| D787,024 S | 5/2017 | Ball |
| 9,828,209 B2 * | 11/2017 | Temblador ............. B65H 75/24 |
| D828,308 S | 9/2018 | Smith |
| D836,560 S | 12/2018 | Temblador et al. |
| 10,221,036 B2 * | 3/2019 | Temblador ............. B65H 75/24 |
| 2007/0114039 A1 | 5/2007 | Hobdy et al. |
| 2007/0181739 A1 | 8/2007 | Derendal |
| 2007/0257146 A1 | 11/2007 | Fleming |
| 2008/0048063 A1 | 2/2008 | Wells et al. |
| 2010/0044490 A1 | 2/2010 | Fleming |
| 2011/0162916 A1 | 7/2011 | Saliger et al. |
| 2012/0104146 A1 | 5/2012 | Perry |
| 2012/0199683 A1 | 8/2012 | Cox et al. |
| 2012/0223179 A1 | 9/2012 | Galindo Gonzalez et al. |
| 2013/0008995 A1 | 1/2013 | Langella |
| 2013/0284852 A1 | 10/2013 | Fuller et al. |
| 2014/0091770 A1 | 4/2014 | Lee et al. |
| 2014/0193235 A1 | 7/2014 | Kennedy et al. |
| 2015/0291386 A1 | 10/2015 | Watkins |
| 2015/0321876 A1 | 11/2015 | Galindo Gonzalez et al. |
| 2015/0322980 A1 | 11/2015 | Giacalone et al. |
| 2017/0081147 A1 | 3/2017 | Mickey et al. |
| 2017/0210589 A1 | 7/2017 | Temblador et al. |
| 2017/0275131 A1 | 9/2017 | Temblador et al. |
| 2018/0029825 A1 | 2/2018 | Temblador et al. |
| 2019/0193984 A1 * | 6/2019 | Temblador ............. B65H 75/24 |

FOREIGN PATENT DOCUMENTS

| | | |
|---|---|---|
| CN | 103562045 A | 2/2014 |
| CN | 103910251 A | 7/2014 |
| CN | 203903693 U | 10/2014 |
| CN | 203922263 U | 11/2014 |
| DE | 10232897 A1 | 2/2004 |
| DE | 102010021357 A1 | 2/2011 |
| DE | 102004008328 A1 | 5/2015 |
| EP | 2619125 A2 | 8/2015 |
| FR | 2425486 A1 | 12/1979 |
| GB | 711140 | 6/1954 |
| GB | 719830 | 12/1954 |
| GB | 954244 | 4/1964 |
| GB | 1015528 | 1/1966 |
| GB | 1048101 | 11/1966 |
| JP | 60052444 A | 3/1985 |
| JP | 05127317 A | 5/1993 |
| SE | 339368 B | 10/1971 |
| WO | 0208107 A1 | 1/2002 |
| WO | 03035529 A1 | 5/2003 |
| WO | 2012158485 A1 | 11/2012 |
| WO | 2013041771 A1 | 3/2013 |

OTHER PUBLICATIONS

Encore Wire Corporation YouTube.com video for Reel Payoff®, published on Feb. 6, 2013, retrieved on May 23, 2016 from https://www.youtube.com/watch?v=KnXJGTIWY0E.

Encore Wire Corporation, Reel Payoff, Copyright 2013 Encore Wire Corporation, 1 page.

Schlumpf USA, SDE Pneumatic Core Chucks, 1 page. Last Accessed Sep. 17, 2015 http://www.schlumpf-inc.com/products/chucks/pneumatic-core-chucks/.

Tidland Raptor Series Air Powered Lug Chucks, Copyright 2015 Maxcess International, Inc., 5 pages. Last Accessed Sep. 17, 2015 http://www.maxcessintl.com/core-chucks/tidland-raptor-series-air-powered-lug-chucks.

Double E Company, Core Chucks, DF-2000 Torque Activated Core Chucks, Copyright 2015 Double E Company L.L.C., 5 pages. Last Accessed Sep. 17, 2015 http://ee-co.com/products/torque-activated-shaftless-core-chucks.

Double E Company, Core Chucks, PC-4000 Torque-Independent Core Chucks, Copyright 2015 Double E Company L.L.C., 2 pages. Last Accessed Sep. 17, 2015 http://ee-co.com/products/pc4000-torque-independent-core-chuck.

Wire Wizard Dereeling Arms Specification Sheets, 2 pages. Last Accessed Sep. 17, 2015 http://www.wire-wizard.com/spec_sheet/DereelingArms_11-5-12.pdf.

Southwire Reel Data, Copyright 2014, Southwire Company, 5 pages.

PC-4000 Torque Independent Core Chuck, The DoubleECompany https://youtu.be/FdFTirmJ2SE (:35-:60).

DF-2000 Torque Activated Shafless Core Chucks, The DoubleECompany https://youtu.be/X_LKv4iaiig (:40-:60).

Servicing Tidland Raptor Series Air Powered Chucks, Maxcess Webex, Fife, Tidland, MAGPOWR https://youtu.be/JfRUJHOSE-U (:40-:60).

MP J02 Maxis Pro-Jax Reel Stands, Southwire Company, LLC http://www.southwiretools.com/tools/tools/MPJ02.

Maxis ProJax, Southwire Company, LLC https://www.youtube.com/watch?v=8f2VIYwfeeY (2:00-2:07; 1:49-1:53; and 2:40-3:04).

Maxis Pro Jax Reel Stands, SchellCompany https://www.youtube.com/watch?v=UUZHRy7Q9vs (:19-:24).

DTS1 Drum Tip Stand, SEB International, Retrieved on Apr. 6, 2016 from: http://www.sebinternational.com/shop_php?sec=prod&prod=75.

Lever Action Cable Reel Jack, WCT Products, Retrieved on Apr. 6, 2016 from: http://www.wctproducts.com/products/reels/lever-action-reel-jack.php.

Cable Reel Trolley—Large, Brandon Tool Hire, Retrieved on Apr. 6, 2016 from: http://www.brandontoolhire.co.uk/en/moving-and-winching/672-cable-reel-trolley-large.html.

McMaster-Carr Catalog, Ball Bearings, available at http://www.mcmaster.com/#r6-ball-bearings/=12hbnve.

Non-Final Office Action dated Dec. 12, 2011 in U.S. Appl. No. 12/604,883, 11 pages.

Notice of Allowance dated Apr. 16, 2012 in U.S. Appl. No. 12/604,883, 7 pages.

Non-Final Office Action dated Dec. 22, 2015 in U.S. Appl. No. 14/198,348, 10 pages.

Non-Final Office Action Apr. 25, 2016 in U.S. Appl. No. 14/198,348, 9 pages.

Notice of Allowance dated Jul. 8, 2015 in Design U.S. Appl. No. 29/488,243, 8 pages.

Non-Final Office Action dated Oct. 13, 2016 in U.S. Appl. No. 15/239,163, 13 pages.

Non-Final Office Action dated Nov. 15, 2016 in U.S. Appl. No. 15/287,429, 16 pages.

Notice of Allowance dated Dec. 2, 2016 in U.S. Appl. No. 15/239,163, 9 pages.

(56) References Cited

OTHER PUBLICATIONS

International Search Report with Written Opinion dated Nov. 7, 2016 in International Patent Application No. PCT/US16/47592, 12 pages.
Corrected Notice of Allowability dated Feb. 27, 2017 in U.S. Appl. No. 15/239,163, 2 pages.
Notice of Allowance dated Mar. 15, 2017 in U.S. Appl. No. 15/287,429, 9 pages.
Notice of Allowance dated Dec. 12, 2017 in U.S. Appl. No. 29/569,124, 8 pages.
Notice of Allowance dated Jan. 19, 2018 in U.S. Appl. No. 29/569,122, 11 pages.
Notice of Allowance dated Aug. 15, 2018 in U.S. Appl. No. 29/643,214, 8 pages.
Notice of Allowance dated Oct. 3, 2018 in U.S. Appl. No. 15/482,025, 7 pages.
International Preliminary Report on Patentability dated Mar. 1, 2018 in International Patent Application No. PCT/US2016/047592, 11 pages.
Extended search report dated Jun. 26, 2019 in European Patent Application No. 16837851.1, 8 pages.
First Office Action and Search Report dated Nov. 4, 2019 issued in Chinese Application No. 201680058131.2, 15 pages.

* cited by examiner

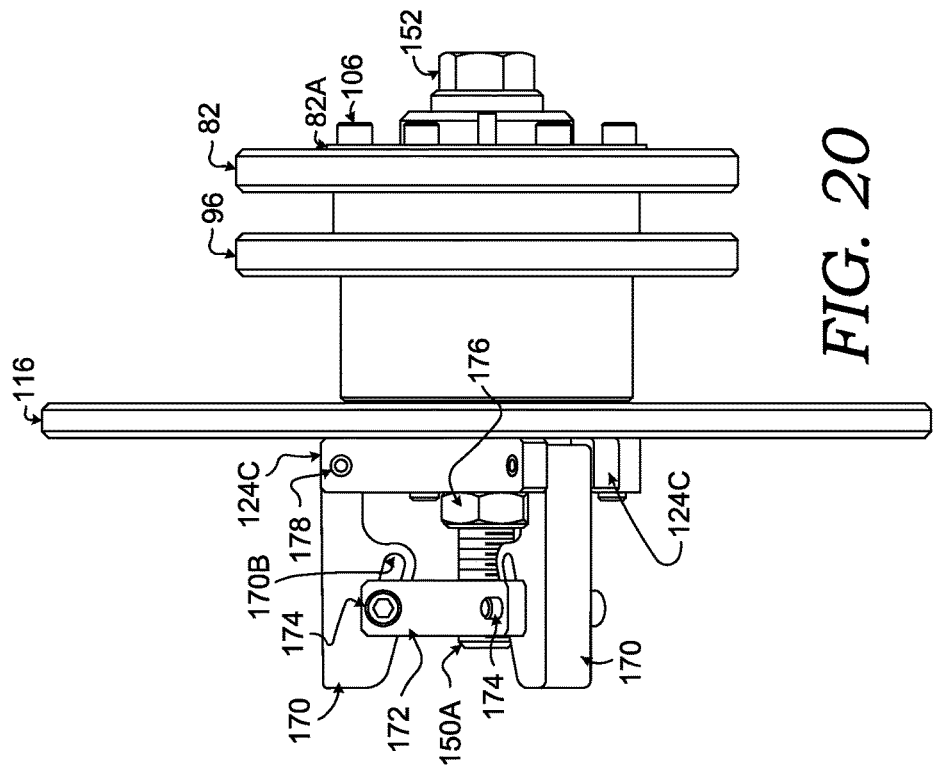
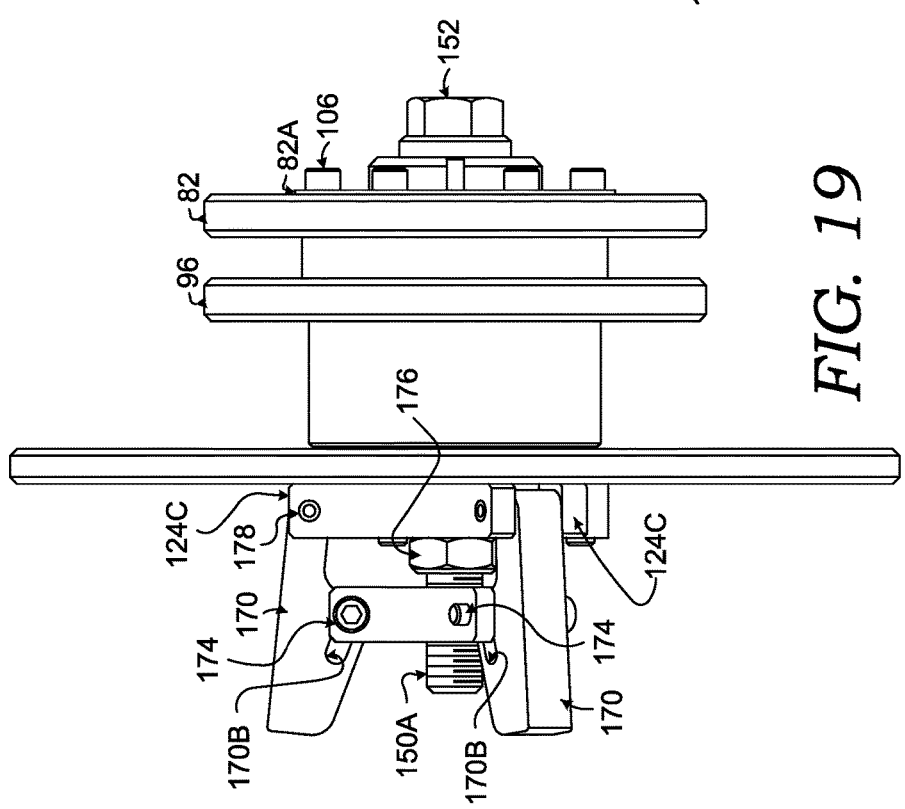
FIG. 19
FIG. 20

FLANGE STAND AND ADAPTER FOR FLANGES

CROSS-REFERENCE TO RELATED APPLICATIONS

This application is a Continuation-In-Part of co-pending U.S. patent application Ser. No. 15/482,025, filed Apr. 7, 2017, and titled "Independently Rotatable Flanges and Attachable Arbor Hole Adapters," which is a continuation that claims priority benefit of U.S. patent application Ser. No. 15/239,163, filed Aug. 17, 2016, and titled "Independently Rotatable Flanges and Attachable Arbor Hole Adapters," which issued on Apr. 11, 2017 as U.S. Pat. No. 9,617,112, which claims priority benefit of U.S. Provisional Patent App. No. 62/313,404, filed Mar. 25, 2016, and titled "Self-Loading Flange With Moveable Hub Assembly," U.S. Provisional Patent App. No. 62/277,748, filed Jan. 12, 2016, and titled "Self-Loading Reel Flange With Arbor Hole Adapter," U.S. Provisional Patent App. No. 62/243,494, filed Oct. 19, 2015, and titled "Self-Loading Flange With Collar and Spring-Loaded Safety Device," and U.S. Provisional Patent App. No. 62/207,374, filed Aug. 19, 2015, and titled "Independently Rotatable Arbor Hole Adapter." This application also claims priority benefit of U.S. Provisional Patent App. No. 62/405,084, filed Oct. 6, 2016, and titled "Flange Stand and Adapter for Flanges." The contents of each of these referenced applications is incorporated herein by reference in the entirety.

SUMMARY

A summary of various aspects of the disclosed embodiments is provided here to offer an overview of the patent, and to introduce a selection of concepts that are further described in the detailed description section below. This summary is not intended to identify key or essential features of the claimed subject matter, nor is it intended to be used as an aid in isolation to determine the scope of the claimed subject matter. In brief and at a high level, this patent describes, among other things, independently rotating flanges that are removably attachable to material-carrying apparatus, such as a reel.

The independently rotating flanges allow technicians to maneuver reels of cable. For example, it is advantageous to easily move a reel of cable into a position that is close to where cable will be unwound from the reel and installed. Embodiments of this patent provide a pair of flanges that are attachable to a reel's arbor hole. Each flange in the pair of flanges is removably attached to the reel via a hub assembly, in at least one embodiment. In turn, the hub assembly allows the removably attached flanges to rotate independently from one another, and from the reel to which the removably attached fingers are attached. The hub may have an arbor hole adapter that allows the flanges to be removably attached to the reel. The arbor hole adapter provides great flexibility, in that the flanges may be coupled to, and used with, any width material-carrying apparatus. This is not the case with solutions requiring an axle (thus accommodating only a fixed width). Additionally, by eliminating the need for an axle, there is less material handling required.

The pair of flanges, in some embodiments, may be configured with a mechanism to allow the reel to be easily loaded and lifted into place. The loading and lifting mechanism may be physically separate from the pair of flanges in certain embodiments. In other embodiments, the loading and lifting mechanism is completely integrated into each flange in the pair of flanges. Once the reel is loaded and lifted into place, a locking device within the flanges secures the reel in place at the center of the pair of flanges. With the flanges locked on the reel, the technician may maneuver the reel with its load of wound cable (e.g., industrial-grade electric power cable, fiber optic, hybrid fiber-coaxial, etc.) to an appropriate installation location.

BRIEF DESCRIPTION OF THE SEVERAL VIEWS OF THE DRAWINGS

Illustrative aspects are described in detail below with reference to the attached drawing figures, and wherein:

FIG. 19 depicts a side view of the hub assembly of FIG. 16 in an assembled condition, with the arbor fingers in an extended, or engaged, position;

FIG. 20 depicts a side view of the hub assembly of FIG. 16 in an assembled condition, with the arbor fingers in a retracted, or disengaged, position;

DETAILED DESCRIPTION

Figure 1:
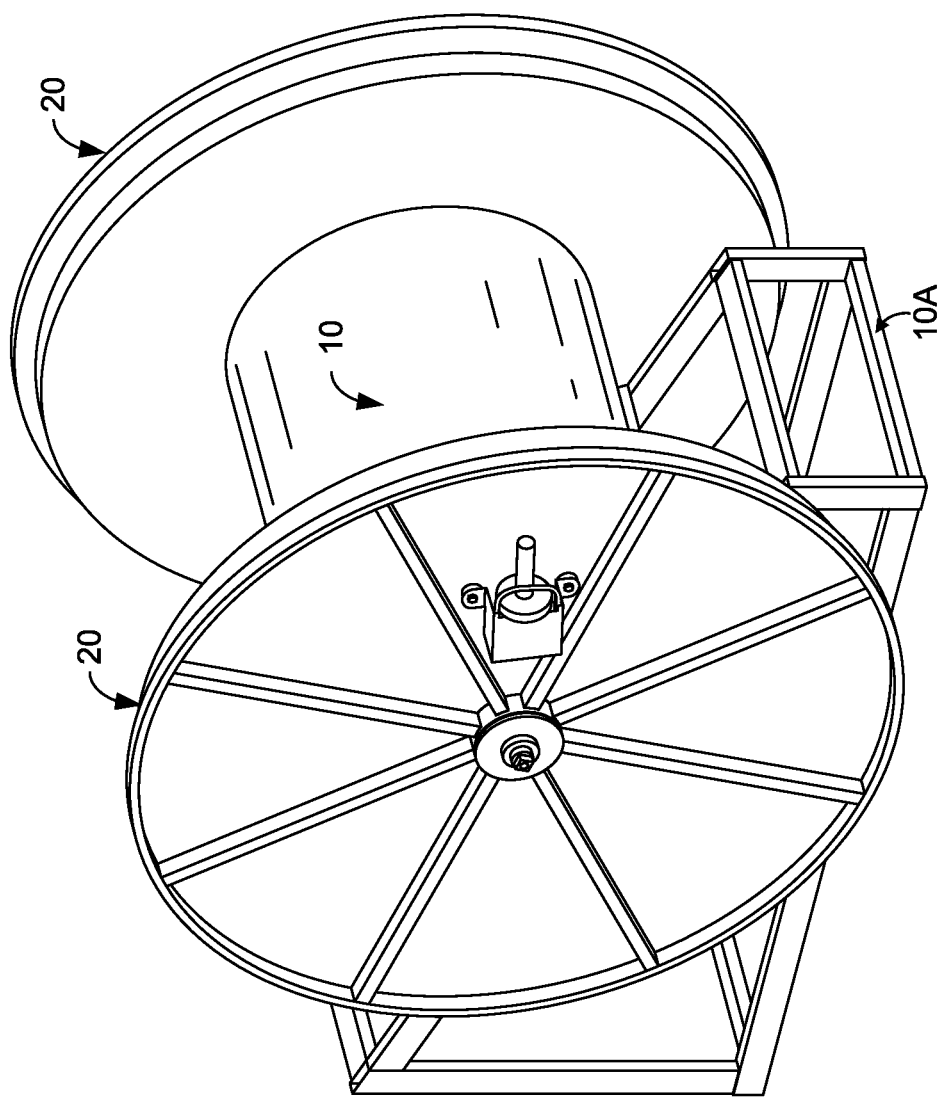
FIG. 1 depicts a perspective illustration of a reel, flange, and reel mount, in accordance with one embodiment of the invention.

The subject matter of select embodiments is described with specificity in this patent to meet statutory requirements; however, the description itself is not intended to define what the inventors regard as the only embodiments. The claimed subject matter might be implemented in other ways, to include different steps, components, or combinations of steps or combination of components similar to the ones described in this document, in conjunction with other present or future technologies. Terms should not be interpreted as implying any particular order among or between various steps herein disclosed, unless and except when the order of individual steps is explicitly described.

There are a variety of ways to carry material, such as wires or cables. For example, to carry wire or similar material, reels, spools, drums, or coil on a core, may be used. Additionally, in what are known as reel-less packages, the wire may be wound or packaged without a core, or without a reel. As used in this specification, for simplicity, "reel" is used to capture all of these different ways to carry material. The typical cable reel has a pair of spaced apart discs separated by a central, cylindrical drum. The cable or wire is wound onto the drum and the outer discs contain the spool of cable wire. The discs have a central arbor hole that provides an axis about which the reel can rotate.

To efficiently install the cable wire, a pair of flanges that offers maneuverability of the reel is provided. Each pair of the flanges is attachable to a corresponding disc of the reel, and each flange rotates independently of the other flange and the reel. In some embodiments, a flange is attached to each arbor hole. Before attaching the flanges, the reel may be positioned on a reel mount to lift the discs of the reel away from the ground. When in the lifted position, the flanges, which include arbor hole adapters, are secured to the arbor hole of the reel.

In other embodiments, a flange is configured with components that provide self-loading of reels as explained below. The flange may include a cam plate with an elliptical-shaped aperture. Two maneuverable and attachable independently rotating flanges may be attached to the reel. The independently rotating flanges may include a rotatable arbor hole adapter that mates with an arbor hole of the reel. The arbor hole adapter may include a hub assembly that contains a groove. The groove allows the hub assembly to slide along an edge of the elliptical-shaped aperture in the cam plate. The two independently rotating flanges can be mounted on the reel at opposing, distal ends of the reel via the arbor hole adapter. In some embodiments, a band and collar arrangement secures the arbor hole adapter at a center location on each of the independently rotating flanges. Accordingly, the reel may rotate about an axis. This rotation may be independent of both independently rotating flanges.

In additional embodiments, the arbor hole adapter is a movable member of the independently rotating flange. The arbor hole adapter and hub assembly may move along the inner circumference of the elliptical aperture in the cam plate. The elliptical-shaped aperture of the cam plate receives the grooves of the hub assembly and has a width that corresponds to the diameter of the hub assembly. The elliptical-shaped aperture of the cam plate is positioned to end at the center of the flange and before the outer circumference of the flange. Accordingly, the independently rotating flange provides rotation of the reel to enable unspooling of the reel, or maneuverability of the reel for transport to different install locations.

In one embodiment, the independently rotating flange may include a spring-loaded safety device that catches a bolt head of the arbor hole adapter as the arbor hole adapter travels along the edge of the elliptical-shaped aperture of the cam plate. The spring-loaded safety device holds the arbor hole adapter steadily in place once the hub assembly is centered.

In additional embodiments, a flange has an arbor hole adapter that mates with the arbor hole of the reel via an extension or expansion assembly. The arbor hole adapter is a member of the independently rotating flange. The arbor hole adapter may include a collet, bolt, O-rings, and wedge. The collet and the wedge engage the arbor hole of the reel. The inner portions of the arbor hole sit on the expanded collet, which fills the arbor hole without traversing the entire length of the reel. Other extending or expanding arbor hole adapters are also contemplated, including those having a plurality of retractable, extending fingers or a plurality of expanding fingers. Accordingly, the independently rotating flange provides rotation of the reel to enable unspooling of the reel or maneuverability of the reel to transport the reel to different sections of the install location. Accordingly, the reel may rotate about an axis. This rotation may be independent of both independently rotating flanges. The independently rotating flanges also may rotate about the same axis independent of the reel and of each other to maneuver the reel to different install locations.

In other embodiments, the arbor hole adapter is secured to a jack that lifts the reel once the arbor hole adapter is secured to the reel. Accordingly, several configurations for the flange and reel are contemplated and are further described below.

In some embodiments, a reel mount may be used to lift a reel to a load position before the flanges are attached. The reel mount may include a stopper to ensure that the reel is in the load position. Once secured on the reel mount, the flanges are attached to the reel.

Figure 3:
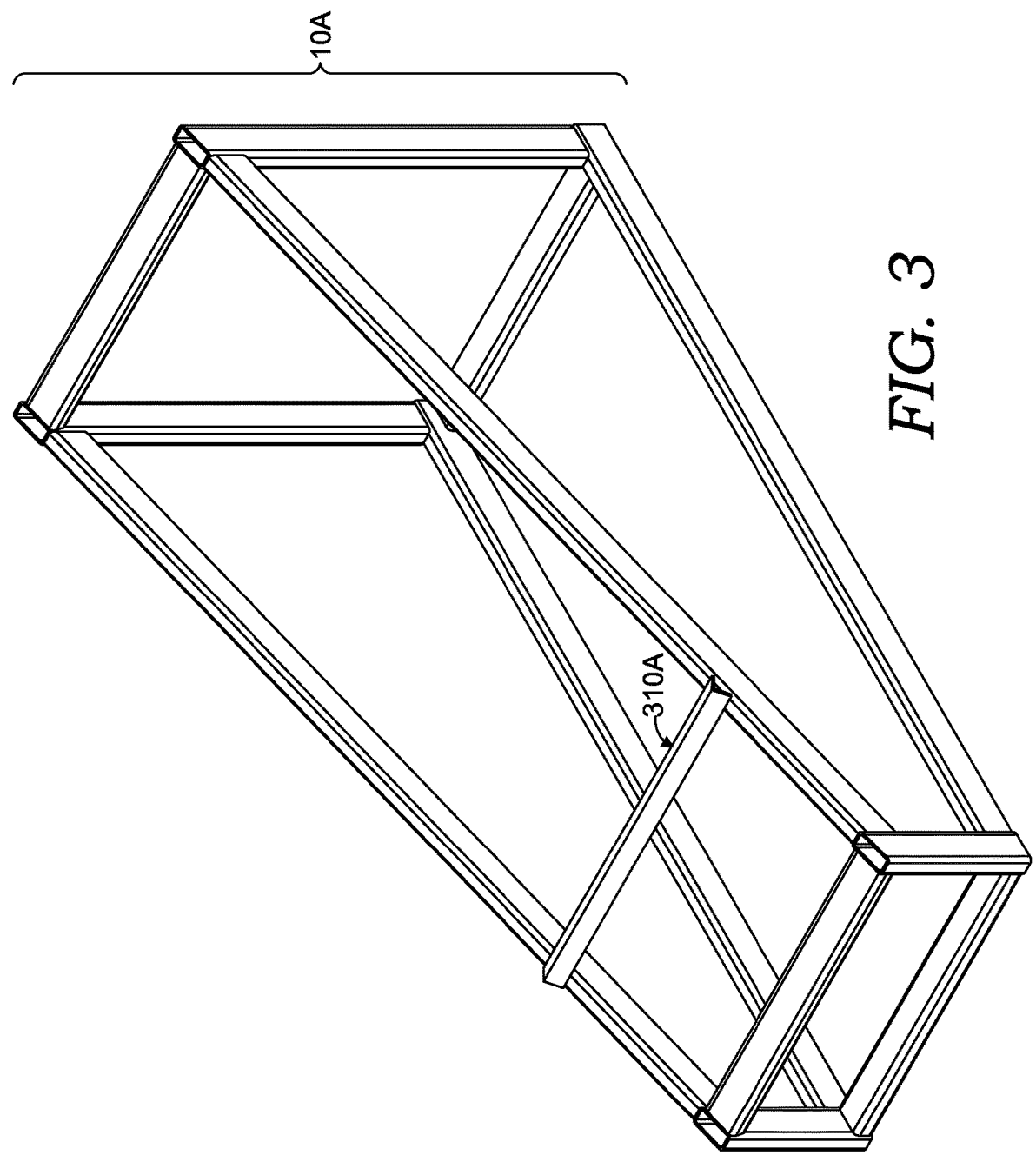
FIG. 3 depicts a perspective illustration of a reel mount, in accordance with embodiments of the invention.

FIG. 1 depicts a perspective illustration of a reel 10 that has opposed outer discs separated by a central drum, a pair of independently rotating flanges 20, and a reel mount 10A, in accordance with embodiments of the invention. The reel mount 10A, in one embodiment, is an inclined trapezoidal pallet as shown in FIG. 3. Once the reel is in place and the discs are lifted off the ground, each of the independently rotating flanges 20 is attached to an arbor hole 16 of the reel 10 illustrated in FIG. 6. The reel mount 10A prevents the rotation of the reel 10 during installation of the independently rotating flanges 20. The reel mount 10A may include an adjustable stopper 310A that allows mounting of reels with different sizes, as shown in FIG. 3.

Each flange that is secured to the reel may have an attachment component and a rotation component. The attachment component may be the arbor hole adapter, which secures the flange to the reel. The rotation component is the hub assembly that provides free rotation to the flange.

Figure 2B:
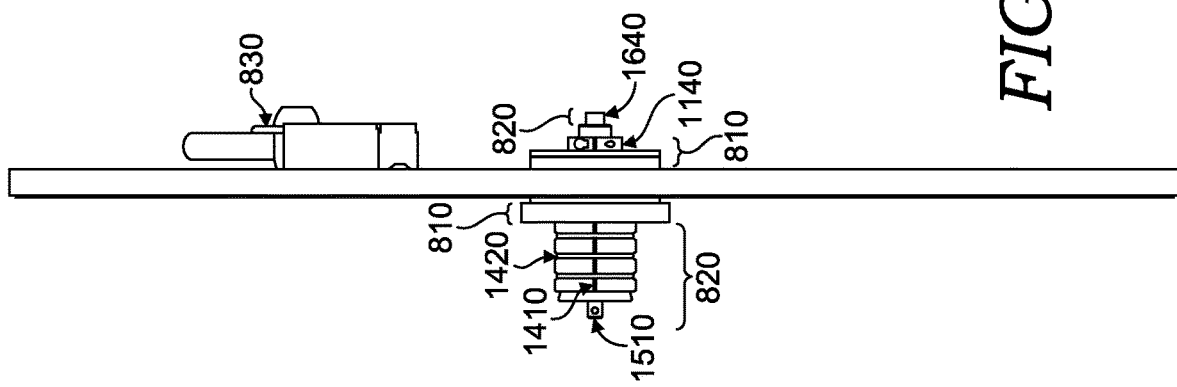
FIGS. 2A and 2B depict a front and perspective side-view illustration of an independently rotating flange having a hub assembly and arbor hole adapter, in accordance with embodiments of the invention.
Figure 2A:
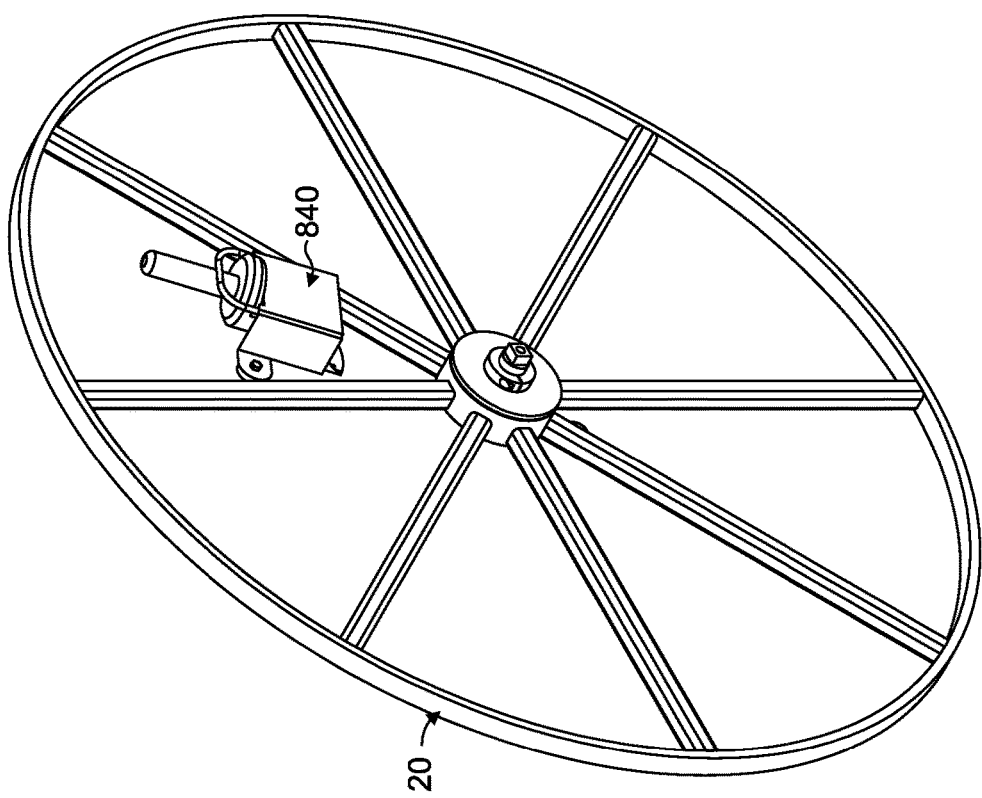

FIGS. 2A and 2B depict a front perspective and side-view illustration, respectively, of an apparatus with the independently rotating flange 20 having a hub assembly 810 and arbor hole adapter 820, in accordance with embodiments of the invention. The independently rotating flanges 20 are stationary when a chock 830, which can be seated in a chock carriage 840, is placed on the floor just before the flange 20. A bolt head 1640 or other coupling mechanism of the arbor hole adapter 820, along with a collet 1410 of the arbor hole adapter 820, secures the arbor hole adapter 820 to the reel (such as reel 10 shown in FIG. 1) via the arbor hole 16 of the reel 10.

In one embodiment, the hub assembly 810 includes a spindle and collar 1140 that supports and secures bearing assemblies (illustrated in FIGS. 9, 11 and 17 below) of the independently rotating flange 20. The bolt head 1640 of the arbor hole adapter 820 traverses both the hub assembly 810 and the arbor hole adapter 820. The bolt, among other things, connects the hub assembly 810 and the arbor hole adapter 820.

The arbor hole adapter 820 comprises the collet 1410, O-rings 1420 or other expandable circular member, and an expansion assembly 1510. The expansion assembly 1510 may include a wedge, bolt, and the bolt head 1640. The arbor hole adapter 820 secures the independently rotating flange 20 to the reel (such as the reel 10 shown in FIG. 1) by circumferentially expanding the collet 1410.

The expansion assembly 1510 advances or retracts the wedge in response to an installer turning the bolt head 1640. In turn, the wedge engages the tapered underside of the collet 1410. The wedge expands the collet 1410 to the limits allowed by the O-ring 1420 and the size of the wedge. Accordingly, the wedge pushes against the collet 1410 (which may be segmented into four pieces) to allow displacement of each of the segments as the wedge retracts or advances. While the expansion assembly 1510 engages the collet 1410 in the arbor hole 16 of the reel 10, the reel 10 is secured to the flange 20.

FIG. 3 depicts a perspective illustration of the reel mount 10A, in accordance with embodiments of the invention. As explained above, the reel mount 10A may be a steel frame that receives empty or loaded reels 10. The reel mount 10A secures the reel 10 and prevents movement of the reel 10 when the independently rotating flange 20 is installed. The reel mount 10A has a base and slanted top side that creates a trapezoidal body. The reel mount 10A also may include an adjustable stopper 310A, which prevents rotation of the reel 10. The reel mount 10A includes a base, which may be a steel bar that is longer than the independently rotating flanges 20. The top side of the reel mount 10A is longer than the base and includes the adjustable stopper 310A. The adjustable stopper 310A is positioned and secured when the reel is rolled over and onto the reel mount 10A.

Accordingly, the reel 10 may be hoisted onto a trapezoidal platform before the flanges 20 are secured via the arbor hole adapter 820. In other embodiments, a self-loading flange 20' with a collar 1120 and a spring-loaded safety device 1220 secures a reel (such as the reel 10) that is rolled into the center location of a cam plate 920 within the flange 20'. These embodiments of the invention are illustrated in detail in FIGS. 4A-4D. An exemplary independently rotating flange 20' and arbor hole adapter 1020 are described below. One of ordinary skill in the art understands that the illustrated subject matter might be implemented in other ways, to include different shapes, sizes, steps, or combinations of steps similar to the ones described in this document, in conjunction with other present or future technologies.

FIGS. 4A-4D depict perspective illustrations of a reel, such as reel 10, and the self-loading independently rotating flange 20', in accordance with embodiments of the invention.

Figure 4A:
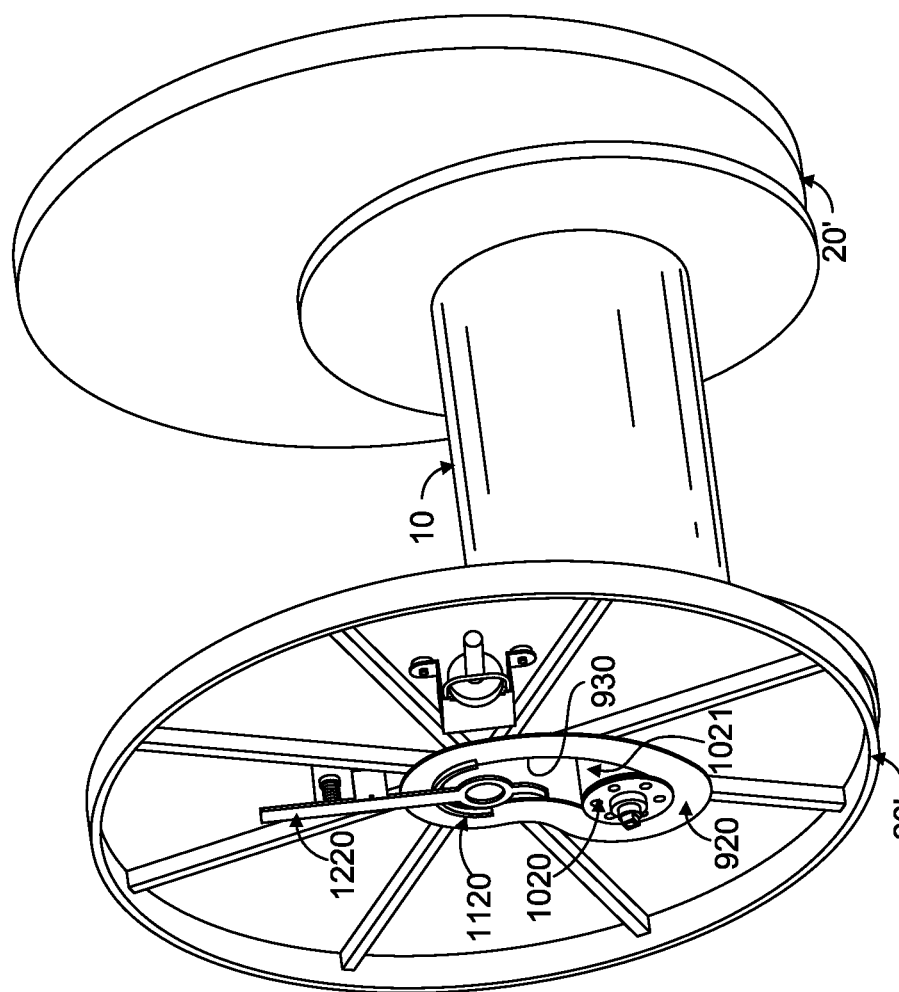
FIGS. 4A-4D depict perspective illustrations of a reel and a self-loading independently rotating flange, in accordance with embodiments of the invention.

FIG. 4A depicts a perspective illustration of independently rotating flanges 20' and a reel 10, in accordance with embodiments of the invention. The independently rotating flanges 20' are designed to mate with the reel 10. The independently rotating flanges 20' may include the cam plate 920, a hub assembly 1021, the collar 1120, and the spring-loaded safety device 1220.

Figure 4B:
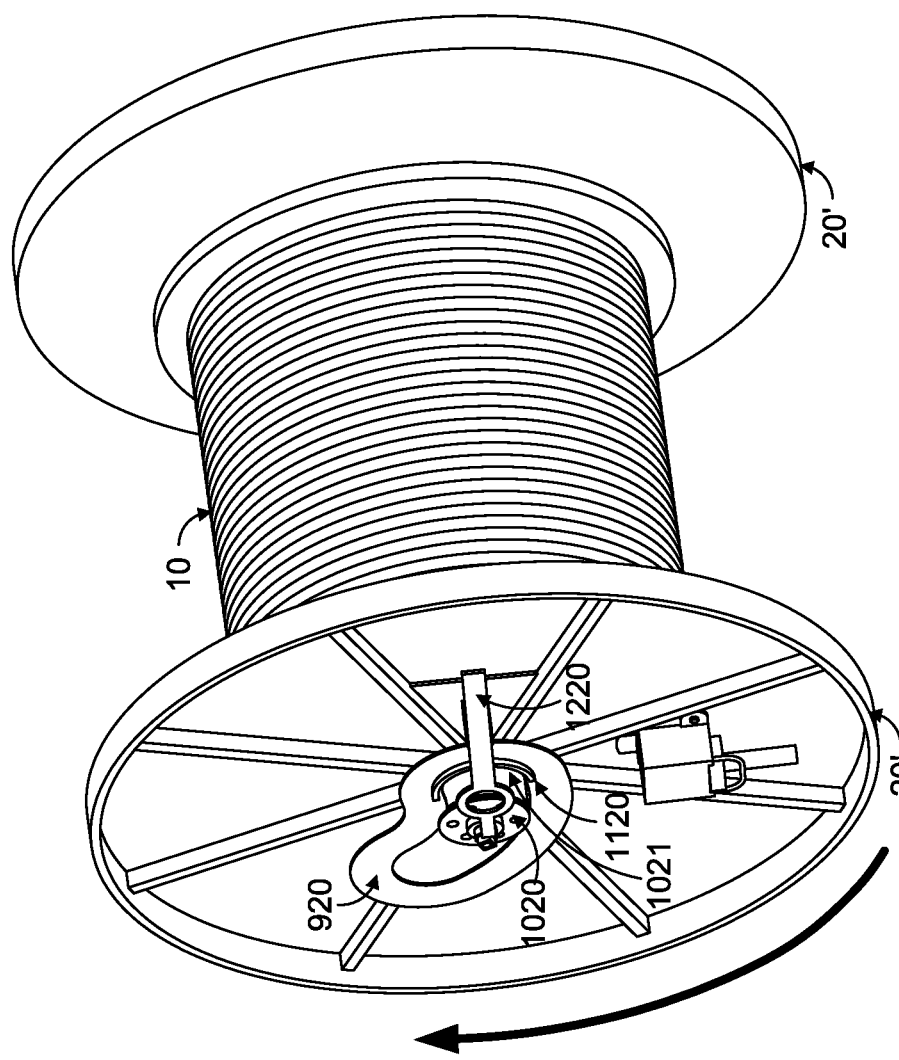
Figure 4C:
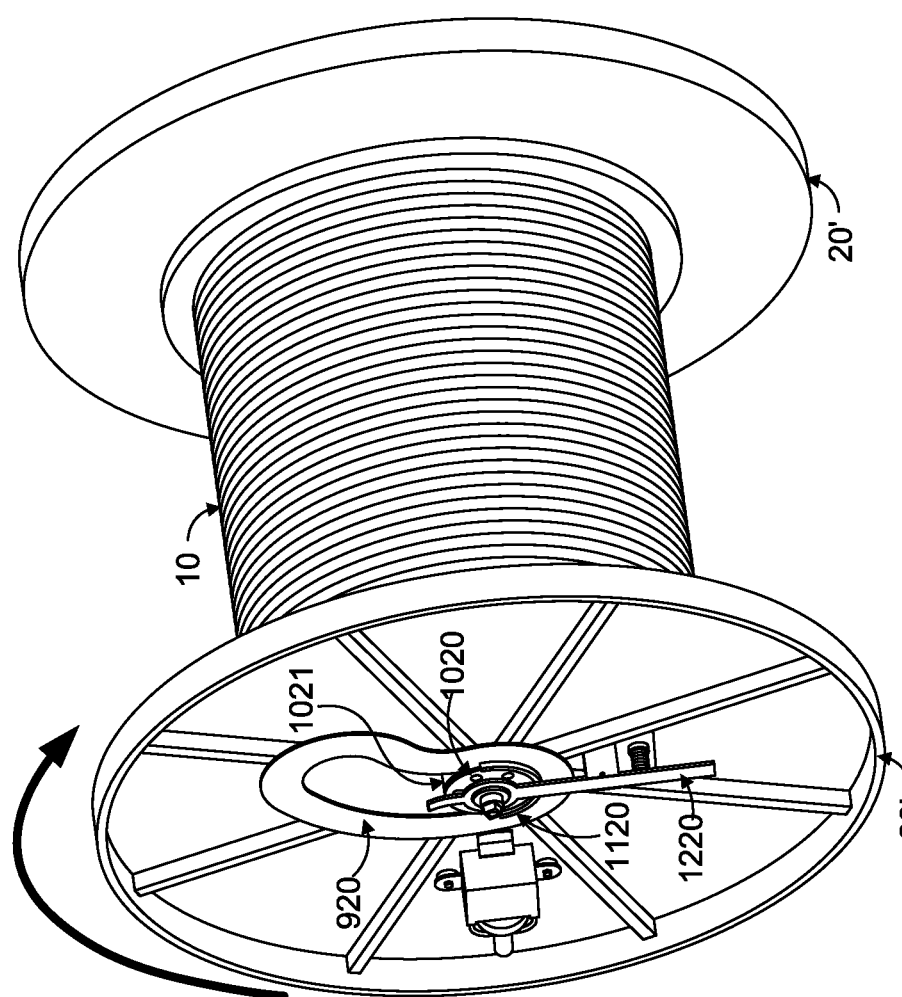
Figure 4D:
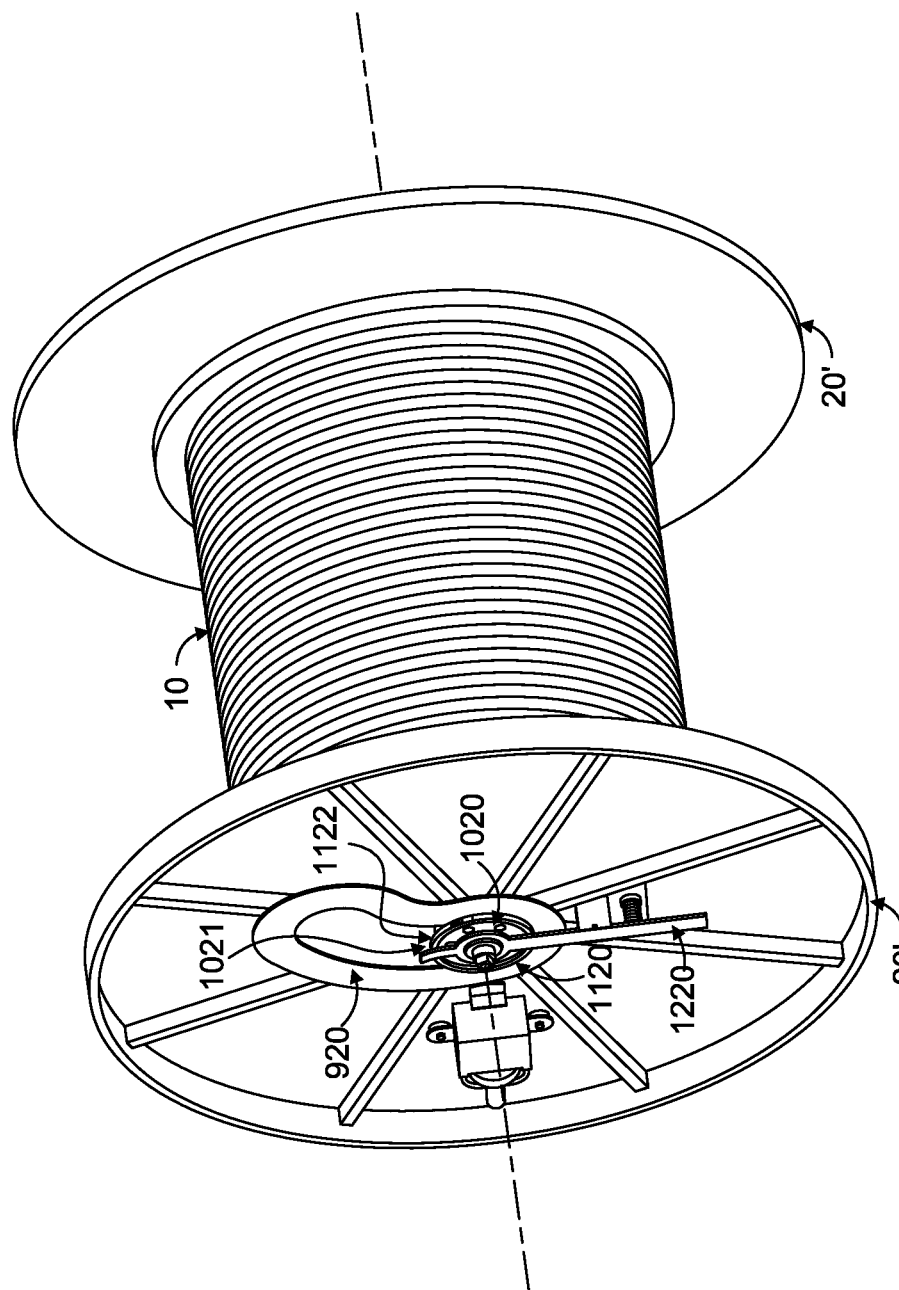

The cam plate 920 is positioned within the independently rotating flanges 20'. The cam plate 920 may be cut from a single sheet, or made of two sheets, of metal. In one embodiment, the cam plate 920 has an aperture 930 is shaped like an ellipse or kidney bean. The shape of the aperture 930 is variable and is selected based on the ability of the aperture 930 to allow the hub assembly 1021 to move from a lower position on the flanges 20' (FIG. 4A) to the center of the independently rotating flanges 20' (FIG. 4D). The inner edge of the aperture 930 may sit in a groove of the hub assembly 1021 to establish the path along which the hub assembly 1021 will move during self-loading of the independently rotating flanges 20'.

The hub assembly 1021 is configured to move along the path provided by the edges of the aperture 930. The hub assembly 1021 provides rotation for the independently rotating flanges 20' and the reel 10. The groove in the hub assembly 1021 is constructed to receive an edge of the cam plate 920. During the self-loading, the hub assembly 1021 is freely moveable within the confines of the cam plate 920. At the end of self-loading, the hub assembly 1021 is secured to a location at the center of the independently rotating flanges 20'.

The collar 1120, in at least one embodiment, provides part of a fastening mechanism to keep the hub assembly 1021 in position when the reel 10 is lifted from the floor. The collar 1120 and a band 1122 make up two components that surround the hub assembly 1021 and secure the hub assembly 1021 to the independently rotating flanges 20'. In one embodiment, the two components (collar 1120 and band 1122) may be semi-circular shaped pieces that are connectable to form collar around the hub assembly 1021. The collar 1120 and band 1122 may be fabricated from metal. The collar 1120 and band 1122 are designed to secure the hub assembly 1021 to a position at the center of the independently rotating flanges 20'. FIGS. 4A-4C depict only the collar 1120. FIG. 4D shows the collar 1120 and band 1122 completely surrounding the hub assembly 1021.

The spring-loaded safety device 1220 is configured to hold the hub assembly 1021 in the center position as the band 1122 is tightened to the hub assembly 1021. The spring-loaded safety device 1220 may be permanently attached to the independently rotating flanges 20. In some embodiments, the spring-loaded safety device 1220 is welded to the independently rotating flanges 20. The spring-loaded safety device 1220 may have a triangular base that is secured to the independently rotating flanges 20 above the band 1122. The spring-loaded safety device 1220 includes an arm and washer that receive a bolt head 1640 of the arbor hole adapter 820. The washer is positioned on the arm proximate to the band 1122. The arm is connected to the triangular base by a spring that allows movement of the arm as the hub assembly 1021 moves toward the band 1122. Once the hub assembly 1021 is centered, the washer surrounds the bolt head 1640 to hold the hub assembly 1021 in position.

FIG. 4A depicts the reel 10 on the surface or floor, with the hub assembly 1021 aligned with the arbor hole 16 of the reel 10. In this position, the flanges 20' are secured to the reel 10, such as with any of the arbor hole adapters described previously (such as arbor hole adapter 820) or below. Once secured, the flanges 20' can be rotated to move the hub assembly 1021 within the aperture 930.

FIG. 4B depicts a perspective illustration of independently rotating flanges 20' and the reel 10 as the flanges 20' are rotated clockwise, in accordance with embodiments of the invention. The self-loading action of the independently rotating flange 20' occurs as the hub assembly 1021 moves from the position within aperture 930 in FIG. 4A to the position within the aperture 930 shown in FIG. 4C. In some embodiments, gravity pulls the hub assembly 1021 along the aperture 930 in the cam plate 920. As the hub assembly 1021 travels along the path provided by the aperture 930, the reel 10 is lifted off the floor. The collar 1120 and the band 1122, along with the spring-loaded safety device 1220, receive the hub assembly 1021 and secure the hub assembly 1021 to the center location.

FIG. 4C depicts a perspective illustration of the independently rotating flanges 20' and the reel 10 as the flanges 20' complete clockwise rotation, with the spring-loaded safety device 1220 engaged, in accordance with embodiments of the invention.

The self-loading action of the independently rotating flange 20' is completed after the hub assembly 1021 is positioned in the center location. In some embodiments, the hub assembly 1021 is held in the center of the independently rotating flange 20' by the spring-loaded safety device 1220. The collar 1120 and the band 1122 further secure the hub assembly 1021 in place. To secure the hub assembly 1021, both the collar 1120 and the band 1122 may be fastened together, as described above.

FIG. 4D depicts a perspective illustration of the independently rotating flanges 20' and the reel 10 as the hub assembly 1021 is secured to the center position of the flanges 20', in accordance with embodiments of the invention.

Figure 5B:
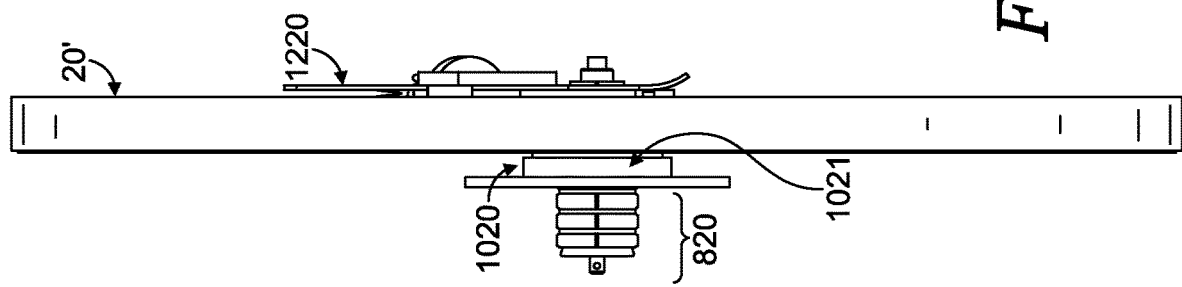
FIGS. 5A and 5B depict another perspective and side-view illustration of a self-loading flange with an arbor hole adapter and hub assembly of FIGS. 4A-4D, in accordance with embodiments of the invention.
Figure 5A:
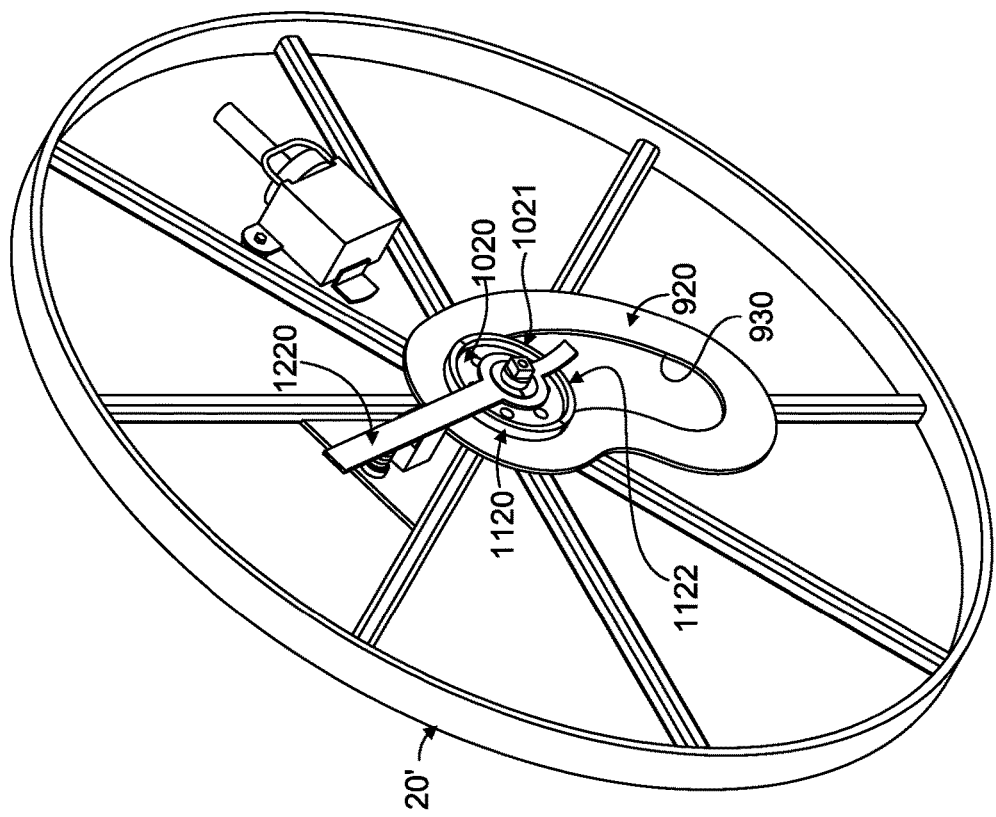

FIGS. 5A and 5B depict a front perspective and a side illustration of the self-loading flange 20' of FIGS. 4A-4D, showing the arbor hole adapter 820 and the hub assembly 1021, in accordance with embodiments of the invention.

In other embodiments of the invention, the flange 20' may be modified to include a cam plate such as cam plate 920 with a longer aperture and modified arbor hole adapters. The longer aperture may provide loading advantages when positioning the reel 10. The modified arbor hole adapters may be configured to increase the grip that the arbor hole adapter has on the reel 10. Additionally, in some embodiments, the cam plates 920 may be replaced with a jack-lift that loads the reel 10 on the flange 20' once the arbor hole adapters are secured. These embodiments are describes in detail with reference to FIGS. 6-32.

Figure 6:
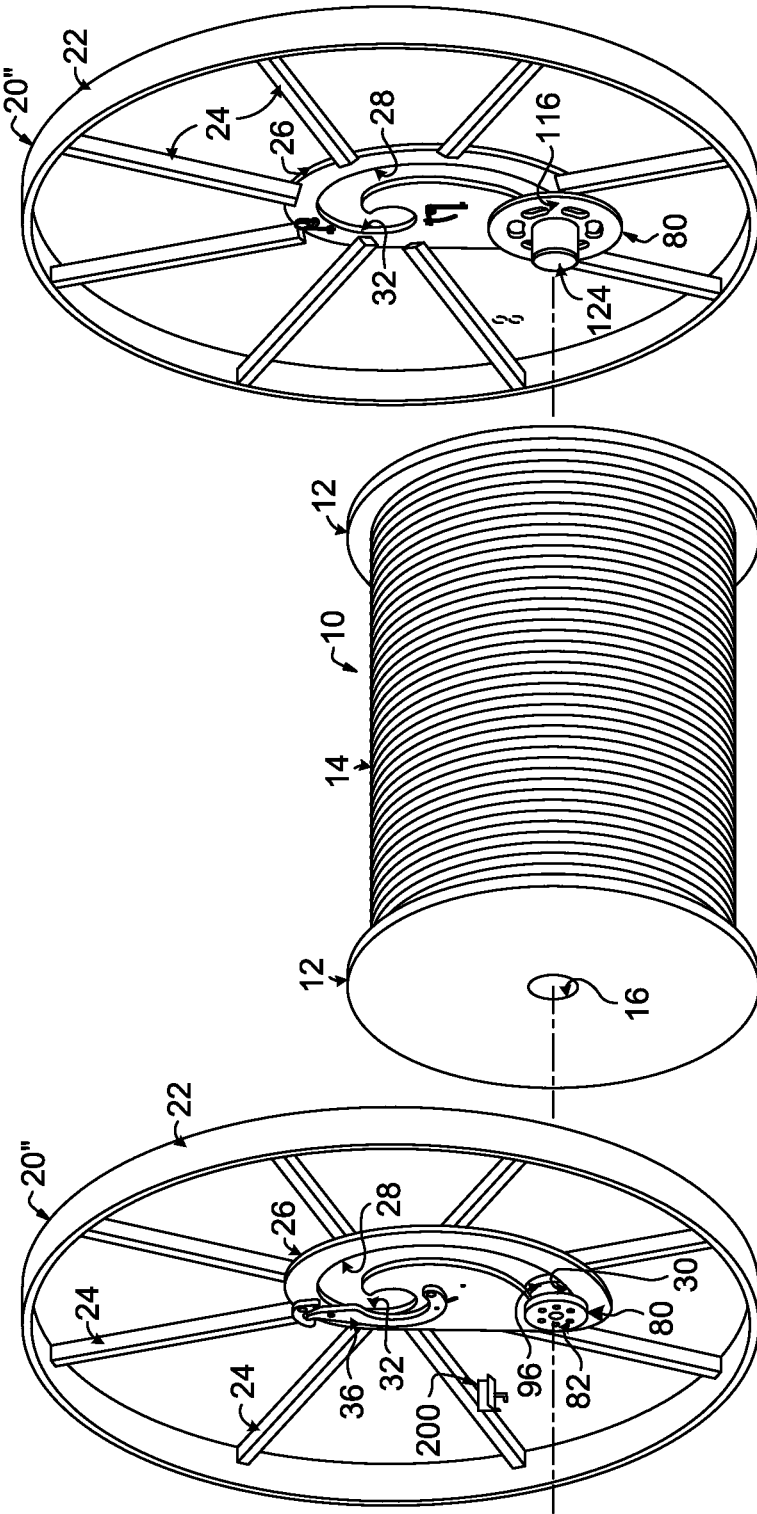
FIG. 6 depicts a perspective illustration of a pair of flanges and a reel of another embodiment, prior to loading.

As best seen in FIG. 6, the reel 10 is shown having a pair of outer discs 12. The reel 10 is shown loaded with a spool of wire 14. Each outer disc 12 has a central arbor hole, such as the arbor hole 16. The reel 10 as shown is merely exemplary and shown for context only. Any number of different reels can be used with aspects of the structure described below. The reels can be wood, plastic, or steel, for example, and can be in a variety of sizes. The outer disc diameters, and the arbor hole diameters, can vary as well. As stated above, the use of the term "reel" throughout is intended to include reels, spools, drums, coil on a core, or even wound material forming a reel-less package.

Figure 12:
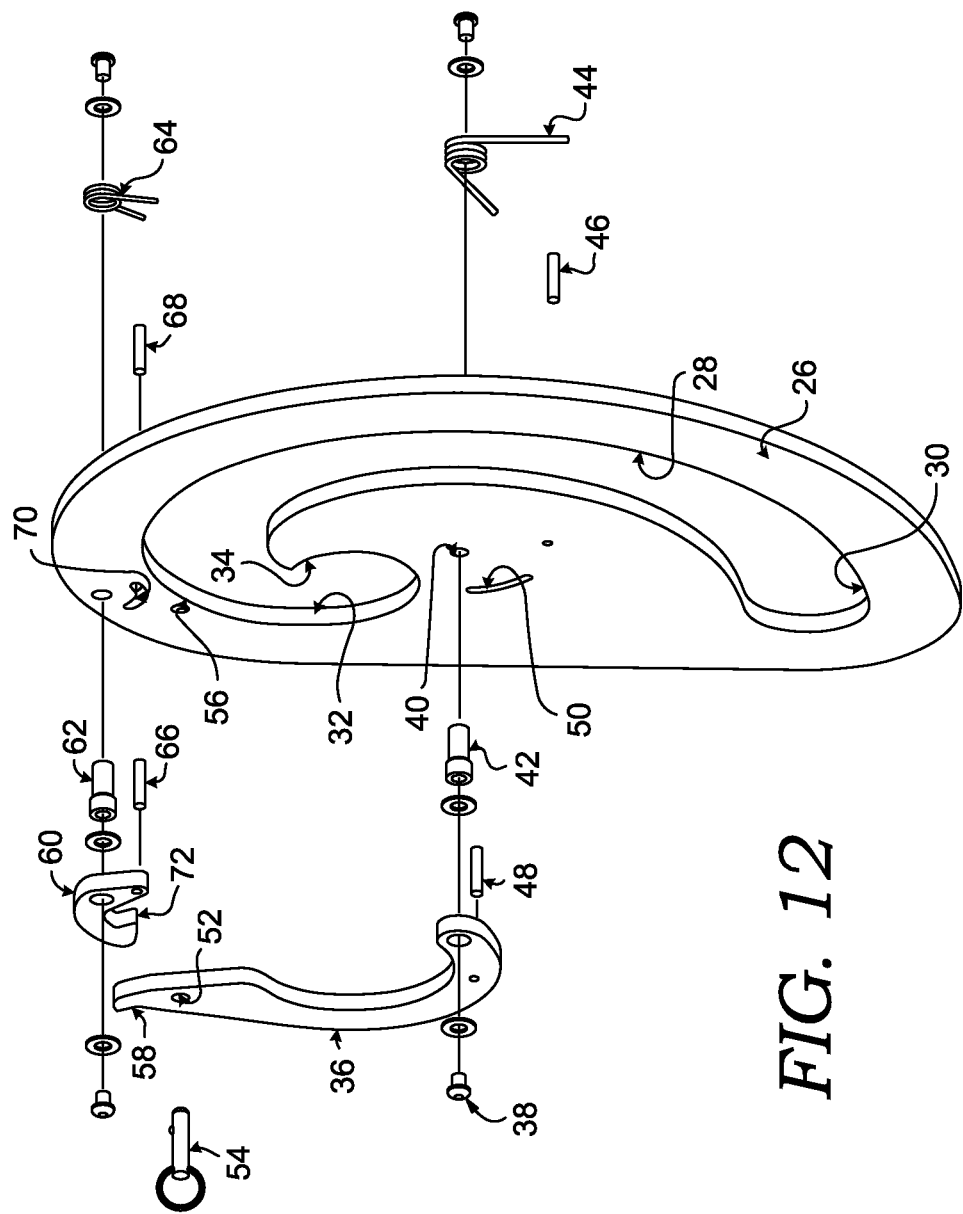
FIG. 12 depicts an enlarged, exploded view of another cam plate and hook-and-latch locking mechanism.
Figure 13:
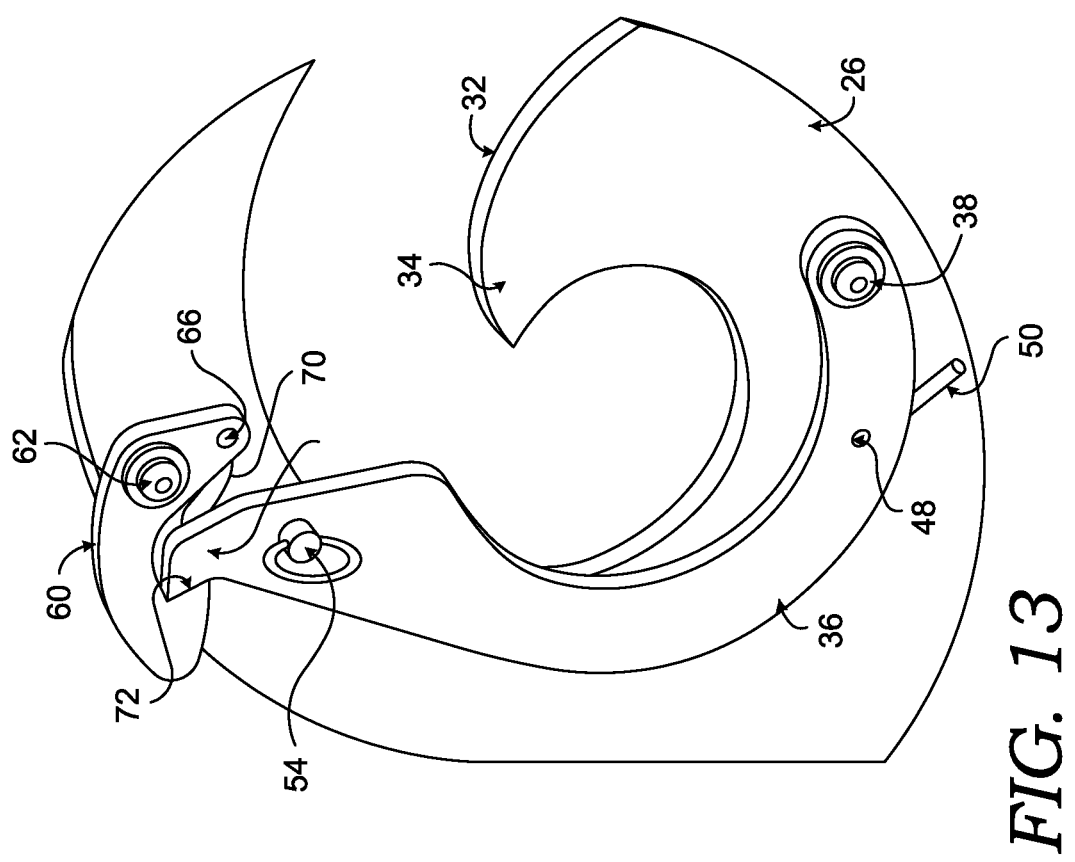
FIG. 13 depicts an enlarged, partial perspective front view of the locking mechanism of FIG. 12.

With continued reference to FIG. 6, a pair of flanges 20" is shown. Each flange 20" has an outer rim 22 that defines the outer diameter of the flange 20". A number of spokes 24 extend radially inward from the rim 22. The spokes 24 provide added structural strength to the flanges 20". The flanges 20" are shown with an open-spoke design, but also could be constructed with the rim 22, the spokes 24, and a solid backing. So, the flanges 20" may be equipped with a covering for the spokes 24 to prevent access through the spokes 24 from the outside to the inside. In one exemplary aspect, this covering is a solid disc with a relief channel for the movement of a hub assembly 80 (described below). In another exemplary aspect, this covering is an outer band extending radially inward from the outer rim 22 a sufficient distance to cover the opening between rim 22 and the outer diameter of disc 12. A cam plate 26 is coupled to each flange 20". As one example, the cam plate 26 can be welded to the adjacent spokes 24. The cam plate 26 has an overall shape that is roughly an oval with a slot, or aperture, 28 formed within the cam plate 26. As best seen in FIG. 12, the aperture 28 starts at a lower end 30 and curves upwardly and radially, eventually turning inwardly at an upper end 32. The upper end 32 of the aperture 28 is also defined by an inwardly extending lip 34 (see FIG. 12). The aperture 28 is shaped roughly like a comma.

Figure 14:
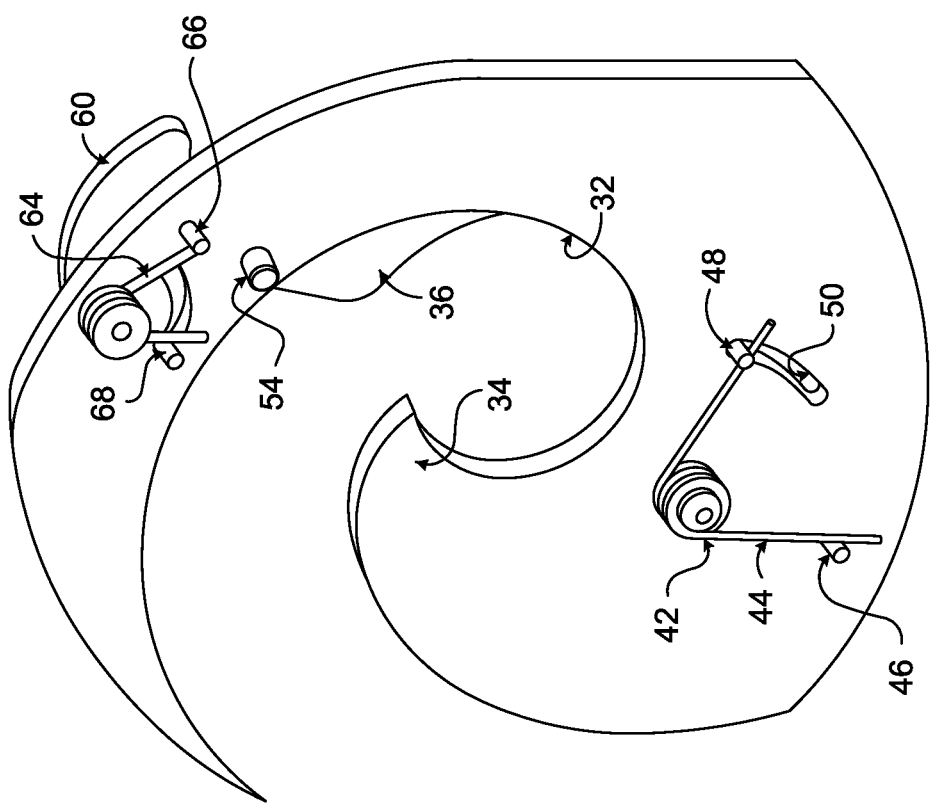
FIG. 14 depicts an enlarged, partial perspective rear view of the locking mechanism of FIG. 12.

Near the upper end 32 of the aperture 28, a latch 36 is pivotally attached to the cam plate 26. As best seen in FIG. 12, the latch 36 is shaped like a shallow C and is pivotally attached at a lower end with a screw 38. The cam plate 26 has a through hole 40 to accommodate a latch spring shaft 42 that is used to pivotally couple the latch 36 to the cam plate 26. As best seen in FIGS. 12 and 14, the latch spring shaft 42 also provides an attachment point for a torsion spring 44 on the side of the cam plate 26 opposite the latch 36. One leg of the torsion spring 44 is contained by a dowel pin 46 that is fixedly attached to the cam plate 26, such as by a press fit. The other leg of the torsion spring 44 is contained by a dowel pin 48. Dowel pin 48 extends through a curved slot 50 in the cam plate 26 and is press fit into the latch 36 near the screw point 38. The upper end of the latch 36 has a through hole 52 that accommodates a quick release pin 54. The pin 54 is also extendable into a hole 56 in the cam plate 26. The pin 54 is used to retain the latch 36 in position, as is further described below. The upper end of the latch 36 defines a catch finger 58 that interacts with a hook 60 pivotally attached to the cam plate 26 with a pivot pin 62. As best seen in FIGS. 12 and 14, the pivot pin 62 is also used to couple a torsion spring 64 to the cam plate 26 on the side opposite the hook 60. One leg of the torsion spring 64 is contained by a dowel pin 66 that is fixedly attached to the cam plate 26, such as by a press fit. The other leg of the torsion spring 64 is contained by a dowel pin 68. The dowel pin 68 extends through a curved slot 70 in the cam plate 26 and is press fit into the hook 60 near the pivot pin 62. The hook 60 has a terminal end 72 shaped to selectively engage with the catch finger 58 of the latch 36, as further described below.

Returning to FIG. 6, the cam plate 26 carries the hub assembly 80 that travels along the slot 28. The components of the hub assembly 80 are shown in an exploded view in FIG. 9. The hub assembly 80 includes a cylindrical outer follower hub 82. The outer follower hub 82 has an outer face 84 and an inner face 86. The inner face 86 has a first recessed area 88 and a second recessed area 90 formed therein. A number of spaced through-holes 92 extend from the outer face 84 through to the inner face 86 generally around the circumference of the first recessed area 88. Finally, the outer follower hub 82 includes a central bore 94.

Figure 11:
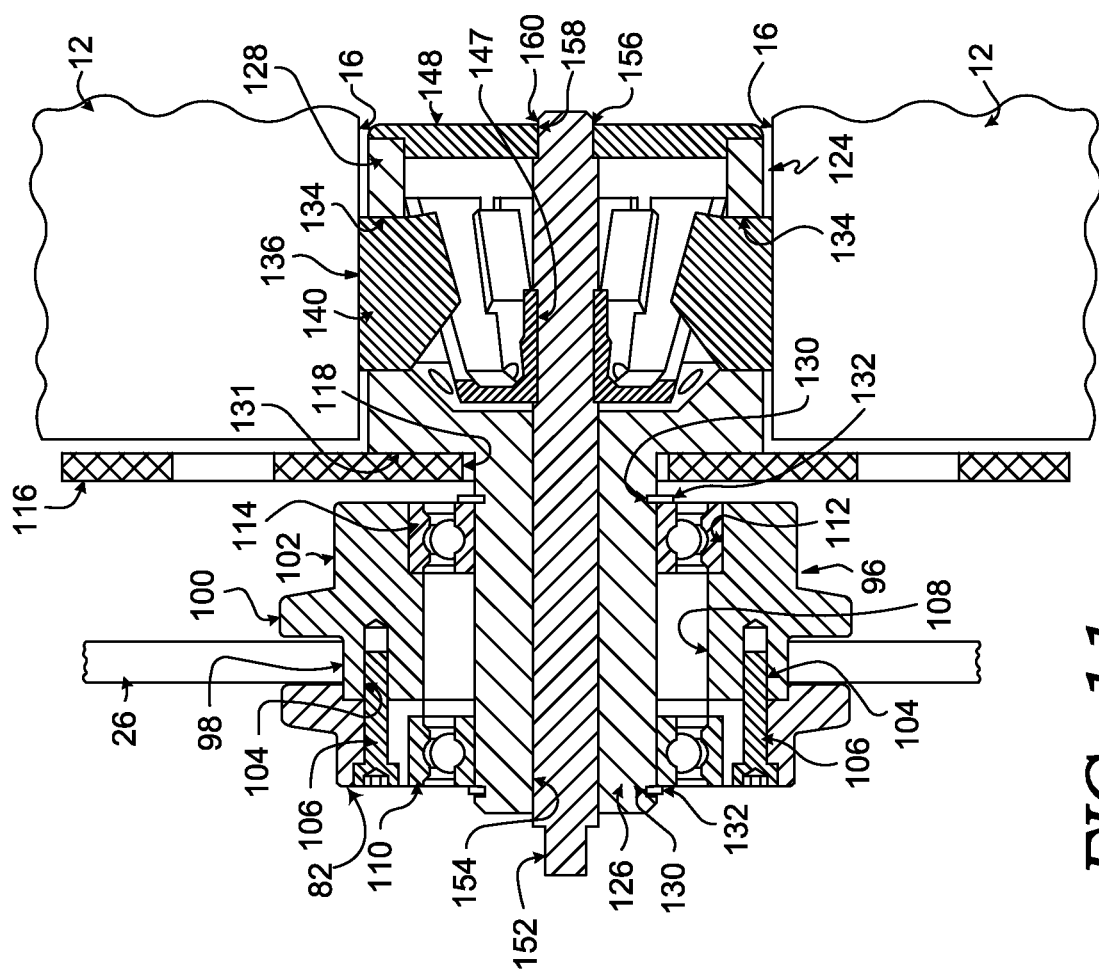
FIG. 11 depicts a section view through the hub assembly of FIGS. 9 and 10, as assembled onto a reel.

The outer follower hub 82 is coupled to an inner follower hub 96. As best seen in FIG. 11, the inner follower hub 96 includes a coupling section 98, an outer flange 100 and a collar 102. The coupling section 98 includes threaded holes 104 that are spaced around the circumference of the coupling section 98 to correspond to the location of the through holes 92 in the outer follower hub 82. Bolts 106 are used to couple the outer follower hub 82 to the inner follower hub 96 using the through holes 92 and the threaded holes 104. The coupling section 98 also includes a recessed area 108. The recessed area 108 in the inner follower hub 96 cooperates with the first recessed area 88 in the outer follower hub 82 to provide a space for, and contain, a bearing assembly 110. As an example, the bearing assembly 110 can be a ball bearing, a taper roller bearing, or other type of bearing assembly. The outer diameter of the outer flange 100 of the inner follower hub 96 is roughly equal to the outer diameter of the outer follower hub 82, in an exemplary aspect. The collar 102 extends away from the outer flange 100 and defines a recessed area 112 that is sized to accommodate a press fit bearing assembly 114. Like bearing assembly 110, press-fit bearing assembly 114 can be any type of bearing assembly.

Figure 9:
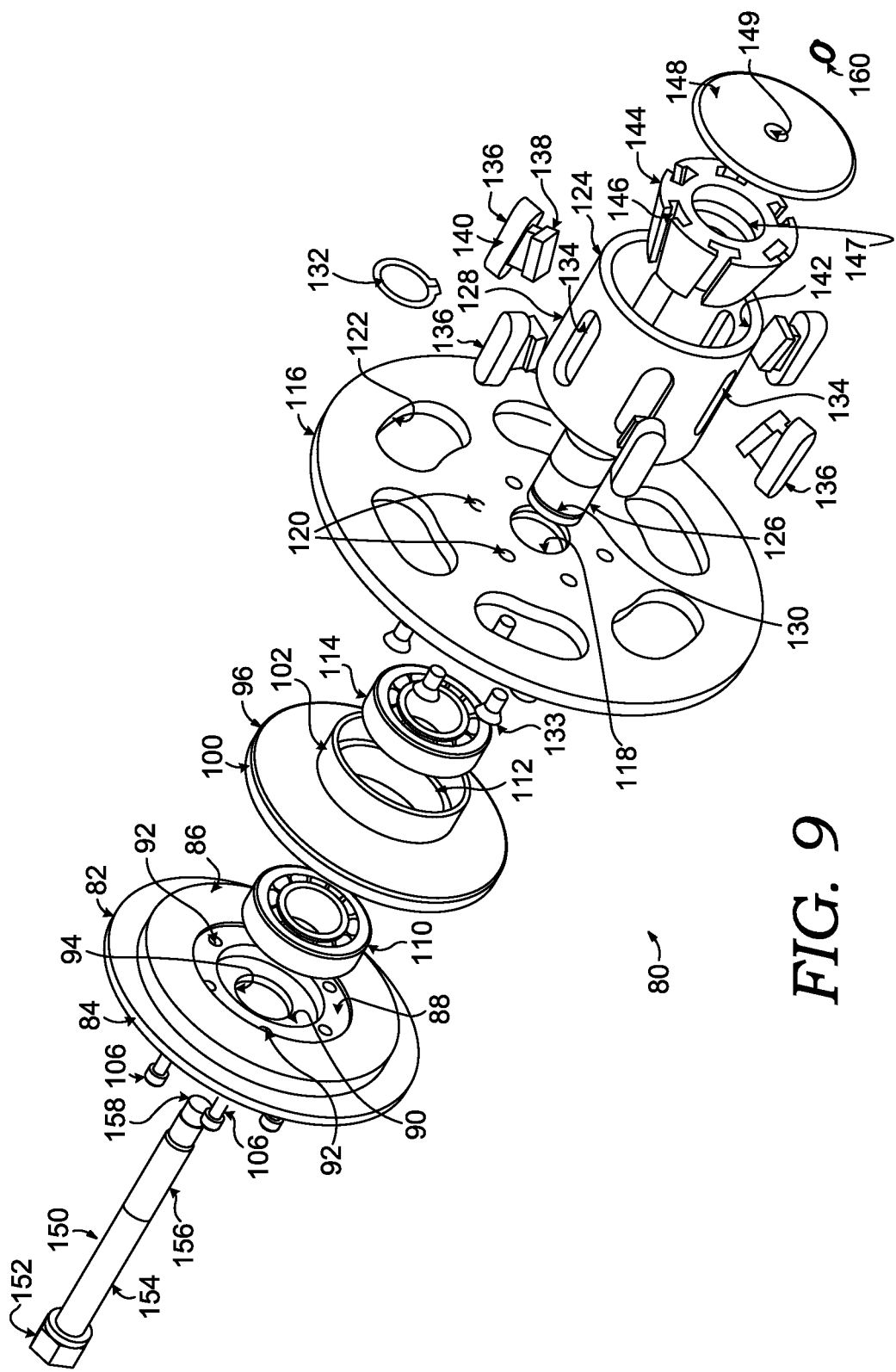
FIG. 9 depicts an enlarged, exploded view of one embodiment of the hub assembly.
Figure 10:
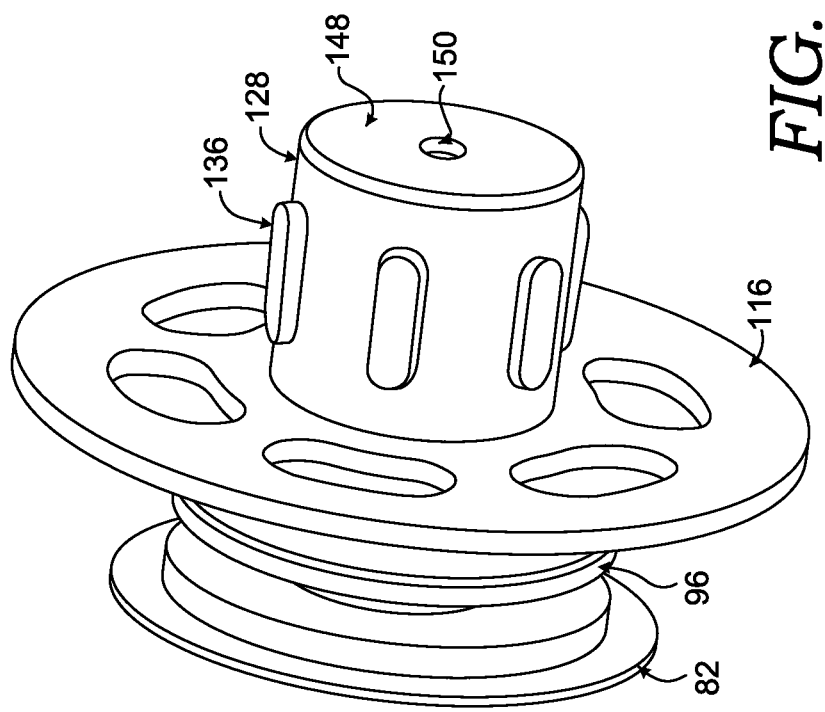
FIG. 10 depicts an enlarged, perspective view of the hub assembly of FIG. 9 in an assembled condition.

As best seen in FIG. 6, the hub assembly 80 further includes a stop disc 116. The stop disc 116 has an outer diameter that is larger than the hubs 82 and 96. As can be seen in FIG. 9, the stop disc 116 includes a central bore 118 and a series of circumferentially spaced through-holes 120. Additionally, the stop disc 116 may include, in an exemplary aspect, a series of circumferentially spaced, elongated holes 122.

With continued referenced to FIG. 9, the hub assembly 80 also includes an arbor 124. The arbor 124 includes an arbor shaft 126 that extends away from a sleeve 128. The arbor shaft 126 has an outer diameter sized to extend through the bore 118 of the stop disc 116, and through the bearing assemblies 110 and 114. The arbor shaft 126 further has a central bore extending therethrough. As further described below, the arbor shaft 126 has grooves 130 formed therein that accommodate the retaining rings 132. The arbor sleeve 128 forms a mounting face 131 (as seen in FIG. 11) that includes a series of spaced, threaded holes located to correspond to the through holes 120 in the stop disc 116. A corresponding number of bolts 133 are used to couple the stop flange 116 with the arbor 124 using the through holes 120 and the threaded holes in the arbor sleeve. The arbor sleeve 128 has a series of circumferentially spaced, elongated holes 134 formed therein. The holes 134 are each sized to allow a corresponding cleat 136 to move through the hole 134. Each cleat 136 has a lower tab section 138 that extends downwardly from a stop section 140. The lower tab section 138 includes an angled face that operates as a cam surface as explained below. The arbor sleeve 128 has an inner bore 142 that is sized to receive a frusto-conically shaped wedge 144. The wedge 144 has a series of slots 146 that are shaped to contain the lower tab sections 138 of the cleats 136, such that the cleats 136 can slide within the slots 146. The wedge 144 also has a central threaded bore 147, as best seen in FIGS. 9 and 11.

The hub assembly 80 further includes an arbor cap 148 that has an outer diameter corresponding to the outer diameter of the arbor sleeve 128. The arbor cap 148 has a central hole 149. A draw bolt 150 is used to hold the hub assembly 80 together. The draw bolt 150, in an exemplary embodiment, has a hexagonal-shaped head 152 with a shank 154 extending from the hexagonal-shaped head 152. Below the shank 154, the draw bolt 150 has a threaded section 156 and has a terminal end with an annular groove 158.

The hub assembly 80 is assembled to engage the cam plate 26 and moves as constrained by the aperture 28 as illustrated in FIG. 6. More specifically, with reference to FIG. 9, the outer follower hub 82 is coupled to the inner follower hub 96 with the bolts 106, sandwiching the bearing 110 in between. The arbor 124 is assembled with the cleats 136 installed within the slots 146, and with the wedge 144 inside the sleeve 128. The stop flange 116 is coupled to the arbor 124 using the bolts 133. The arbor shaft 126 extends through the central bore 118 in the stop disc 116 and through the bearing assemblies 110 and 114. The retaining ring 132 is then snap fit into the groove 130. The shank 154 of the draw bolt 150 extends through the central bore in the arbor shaft 126. The threaded section 156 is threaded through the threaded bore 147 of the wedge 144, and the terminal end of the draw bolt 150 extends through the central hole 149 in the arbor cap 148. Finally, the retaining ring 160 is snap fit into place within the groove 158.

As best seen in the cross-section of FIG. 11, the hub assembly 80 is installed surrounding the cam plate 26, such that the cam plate 26 is held between the inner follower hub 96 and the outer follower hub 82. As installed, the hub assembly 80 is able to move within the aperture 28, riding on the outer circumference of the coupling section 98.

The hub assembly 80 also operates to couple the flange 20 to the arbor hole 16 of the reel 10 as illustrated in FIG. 6. More specifically, with reference to FIGS. 6 and 9, the sleeve 128 of the arbor 124 is aligned with the arbor hole 16, and is inserted into the arbor hole 16. Because the hub assembly 80 is freely movable within the aperture 28, the sleeve 128 is easily moved into alignment with arbor hole 16. By turning the flange 20", the hub assembly 80 will move within the aperture 28. So the vertical position of the sleeve 128 is adjusted to align with the arbor hole 16 by turning the flange 20", thereby moving the hub assembly 80.

Figure 7:
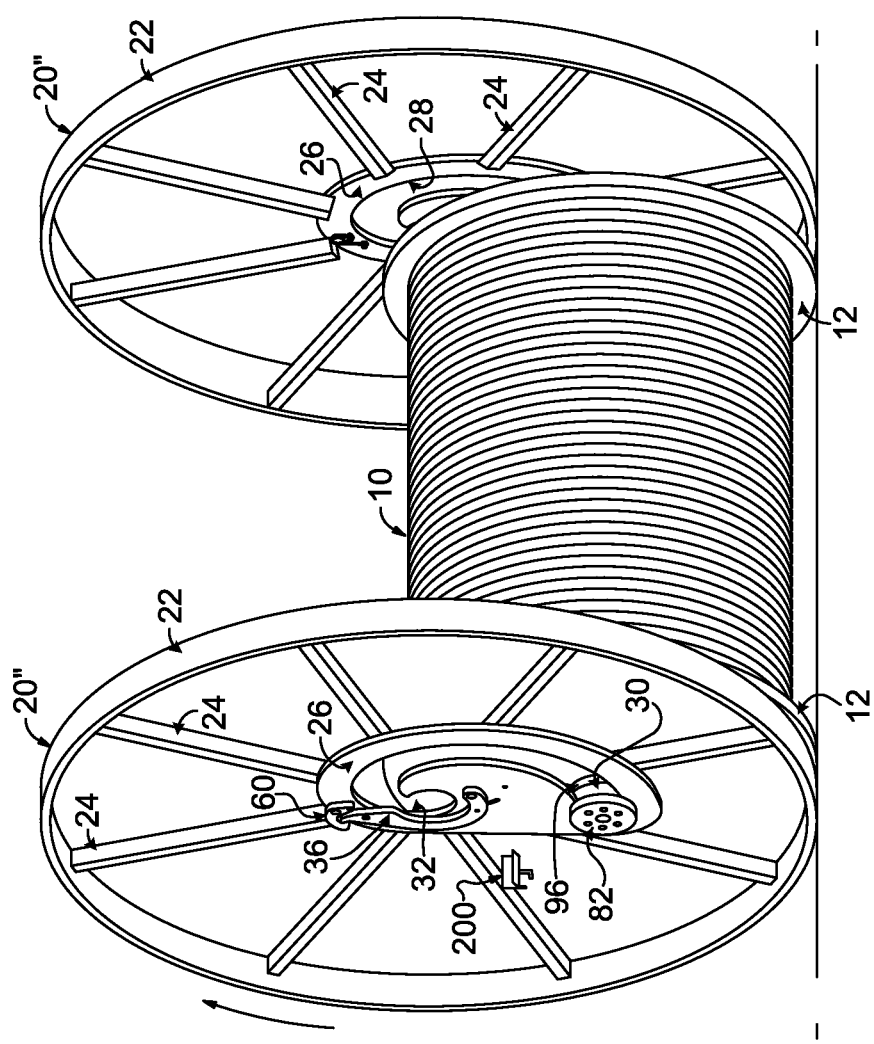
FIG. 7 depicts a perspective illustration of a pair of flanges and a reel of FIG. 6 after the flanges have been coupled to the reel.

FIG. 6 shows the sleeve 128 aligned with the arbor hole 16 of the a reel 10, and FIG. 7 shows the sleeve 128 inserted into the arbor hole 16. As shown, the hub assembly 80 is in the lower end 30 of the slot 28 to align with the arbor hole 16 of the reel 10. Turning to both FIGS. 9 and 11, with the sleeve 128 inserted into the arbor hole 16, the head 152 of the draw bolt 150 is used to rotate the draw bolt 150. A wrench used to tighten the draw bolt 150 may be conveniently held on the flange 20", the spokes 24, or the cam plate 26, through a magnetic or releasable mechanical arrangement. Rotating the draw bolt 150 threads the draw bolt 150 within the threaded bore 147 of the wedge 144. As the wedge 144 is moved along the threaded section 156 of the draw bolt 150, the incline surface of the slots 146 engages the inclined surface of the lower tab section 138 of each cleat 136 which positions the stop sections 140 of the cleats 136 radially outwardly, guided by the holes 134 in the sleeve 128.

The draw bolt 150 can be turned until the cleats 136 sufficiently engage the arbor hole 16 of the reel 10, thereby holding the hub assembly 80 in place within the arbor hole 16. The wedge 144 and the movable cleats 136 allow the hub assembly 80 to fit within the arbor holes 16 of differing diameters. In the initial position shown in FIG. 7, the hub assembly 80 resides in the lower end 30 of the aperture 28. With the cleats 136 engaging the arbor hole 16 to hold the reel 10, the flanges 20" can be rolled forwardly (by exerting a force in the direction of the arrow in FIG. 7).

As the flanges 20" roll, the hub assembly 80 moves via gravity within the aperture 28 towards the upper end 32 of the slot 28. The curved shape of the aperture 28 allows for this movement. Curves other than the particular curved shape shown for the aperture 28 can be used for the aperture 28 such as that shown in FIGS. 4A-4D and 5A-5B. As the hub assembly 80 travels along the aperture 28, the hub assembly 80 is lifted away from the underlying surface. Larger diameter reels 10, having larger diameter discs 12, will have a starting position spaced from the lower end 30 of the aperture 28.

Figure 8:
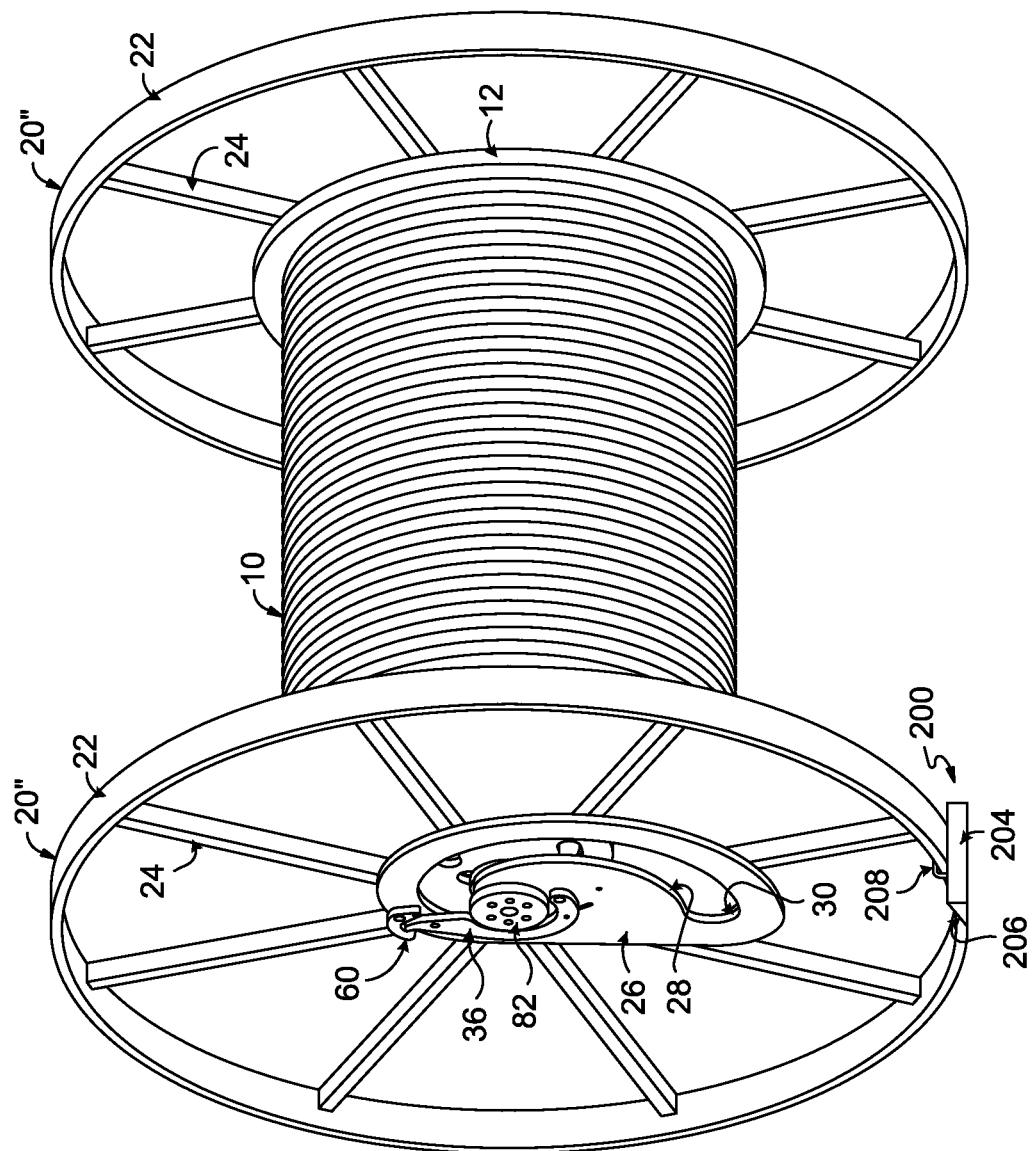
FIG. 8 depicts a perspective illustration of a fully loaded reel of FIGS. 6 and 7 centered onto the flanges.

With continued reference to FIGS. 7 and 8, it has been found that the larger reels 10 are easier to lift than smaller reels 10, even though the larger reels 10 weigh more. The shorter starting distance from the arbor hole 16 to the upper end 32 of the aperture 28 allows for this to be the case. The easily movable hub assembly 80 allows reels, such as reel 10, with arbor holes 16 of varying heights to be loaded onto the flanges 20".

When the hub assembly 80 nears the upper end 32 of the aperture 28, the outer surface of the outer follower hub 82 engages the hook 60 causing the hook 60 to pivot around the pivot pin 62 and disengaging the terminal end 72 of the hook 60 from the catch finger 58 of the latch 36. Further travel of the hub assembly 80 causes the outer follower hub 82 to engage the latch 36. Because the hook 60 is no longer engaged with the catch finger 58, the latch 36 is allowed to rotate about the screw 38 at a pivot point. This rotation of the latch 36 allows the hub assembly to reach the final extent of the aperture 28 at the upper end 32. In this final position, the torsion springs 44 and 64 cause the latch 36 and the hook 60 to return to a position of engagement, which will effectively lock the hub assembly 80 in place in the upper end 32 of the aperture 28. This final loaded position is shown in FIG. 8. To more positively lock the hub assembly 80 in position, the quick release pin 54 (FIG. 12) can be inserted into the through hole 52 in the latch 36 and the hole 56 in the cam plate 26.

It can be seen then, that the flanges 20", with the cam plates 26 and the hub assemblies 80 as described, allow the reel 10 to be easily loaded onto the flanges 20" and held in place with the latch 36 and the hook 60. Other mechanisms could be used to lock the hub assembly 80 in place at the upper end 32 of the slot 28, with the described latch 36 and the hook 60 being only one example.

Once loaded, the hub assembly 80 allows the associated flange 20" to be rotated independently of the reel 10, and vice versa. Each flange 20" is also independently rotatable relative to the other flange 20". This allows the loaded reel 10 to be easily maneuvered. Using durable and high-strength materials for the various components, such as wood, aluminum, steel and other metals, even the reels 10 having significant weight can be easily maneuvered. As an example, loaded or unloaded reels weighing from 200 to 3,000 pounds can be easily secured to flanges 20". With the reel 10 lifted off of the underlying floor or surface, the weight of the reel 10 is carried by the flanges 20", the cam plates 26, and the hub assemblies 80. This redistribution of the weight of the reels 10, and the independently rotatable flanges with bearing assemblies 110 and 114 in the hub assembly 80, greatly increases the ability to roll the flanges 20", and greatly increases the maneuverability of the assembled reel 10 and the flanges 20".

Once in place, chocks can be used to prevent further movement of the flanges, and the reel 10 can be rotated independently of the flanges 20" to easily pay off the wire or cable that is loaded on the drum of the reel 10. In one exemplary aspect, a chock 200 may be secured to the cam plate 26, such as with magnets 202. The chock 200 is shown schematically in FIGS. 6-9, and is shown enlarged in FIG. 15. The chock 200 has a first face 204 having embedded magnets 202 (or the face 204 can be formed of a magnetic material in its entirety). The magnets 202 can be secured in place, such as with a retaining screw. In one exemplary aspect, an additional plate 203 is secured behind the first face 204, with the magnets 202 countersunk into the additional plate 203.

The retaining screw extends into this additional plate 203 to retain the magnets 202 in place. A second face 206 extends orthogonally from the first face 204. The chock 200 also has a sliding bracket formed by a retaining hook 208 and a retaining finger 210. The retaining hook 208 and the retaining finger 210 form a bracket that can be placed around the outer rim 22 of the flanges 20" that allows the chock 200 to slide downwardly, guided by the outer rim 22 of the flange 20". The hook 208 extends inwardly along the inside surface of the outer rim 22, and the retaining finger 210 extends along an inner face of the flange 20". This allows the chock 200, once in place on the outer rim 22 of the flanges 20", to slide downwardly into position to retain the flange 20" and prevent the flange 20" from rolling backward.

Figure 15:
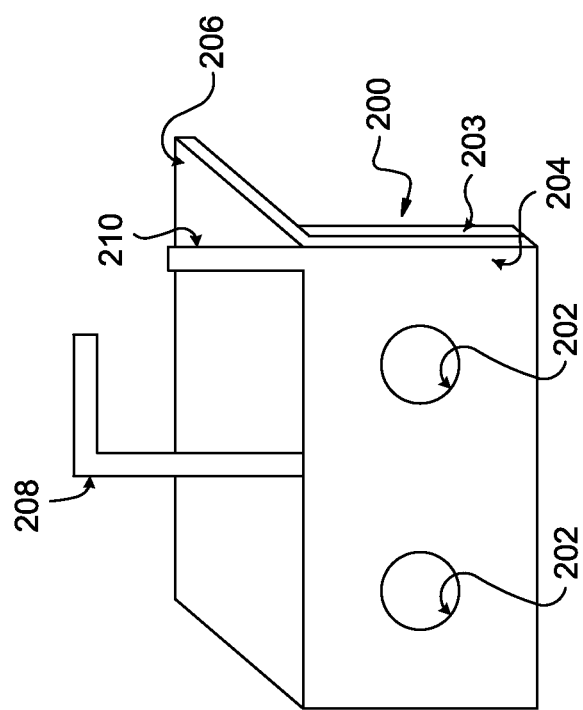
FIG. 15 depicts a chock that prevents rotation of the flanges.

As incremental rotational movements of the flange 20" are imparted, the chock 200 slides into position to maintain the forward-most position of the flanges 20". While only one chock 200 is shown in FIG. 15, it should be understood that a complementary, mirror-image chock 200 is used for the opposite flange 20", so that left-hand and right-hand chocks 200 are used. An additional chock 200 can be used to more positively secure the flanges 20" in place in both a forward and a rearward direction. This additional chock 200 can be used, for example, when the flanges 20" and the reel 10 are moved into a position for the wire to be paid off of the reel 10. The chocks 200 ensure the flanges 20" do not move from their desired positions.

Figure 16:
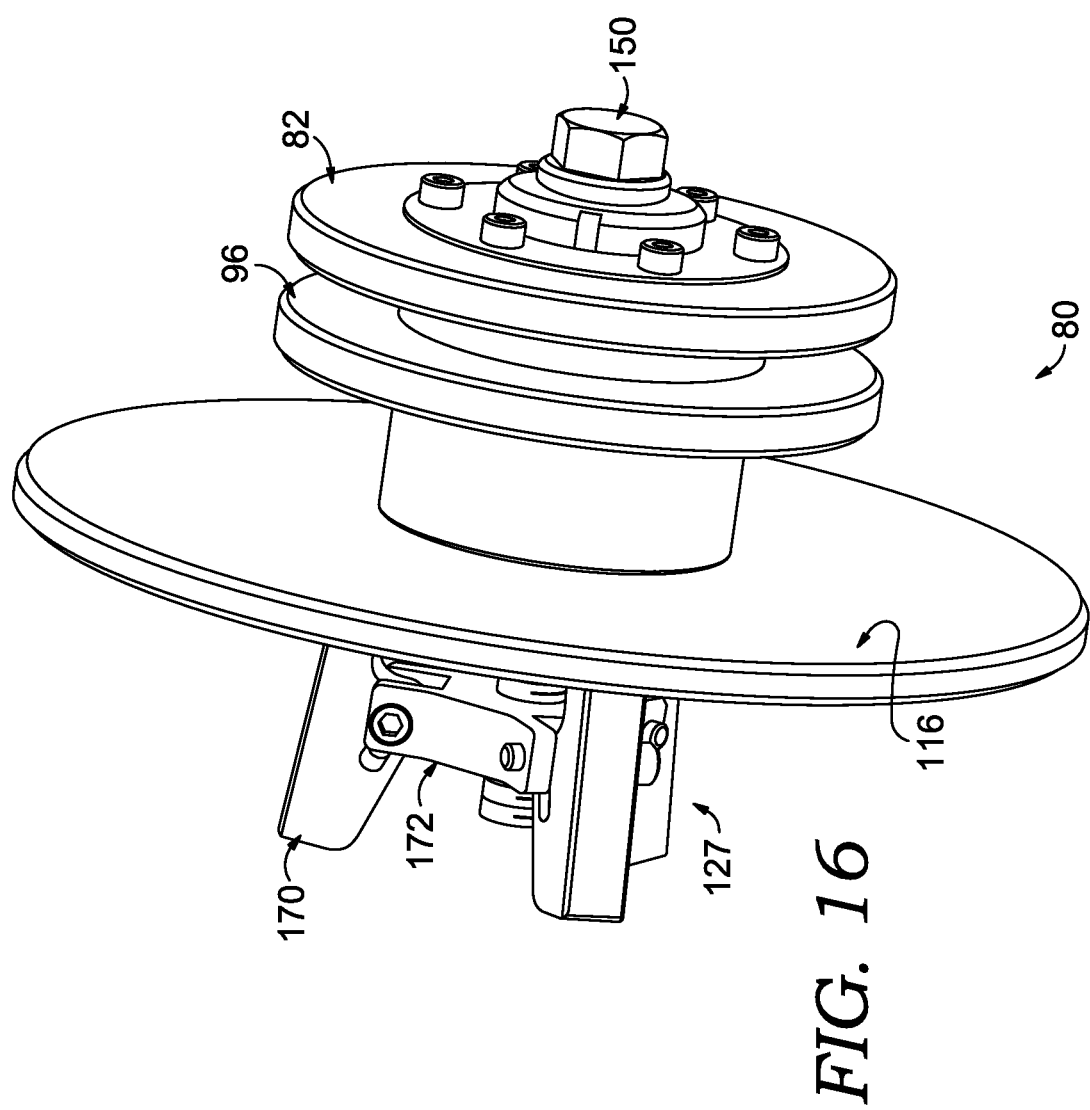
FIG. 16 depicts an enlarged, perspective view of an assembled embodiment of the hub assembly with arbor fingers.
Figure 17:
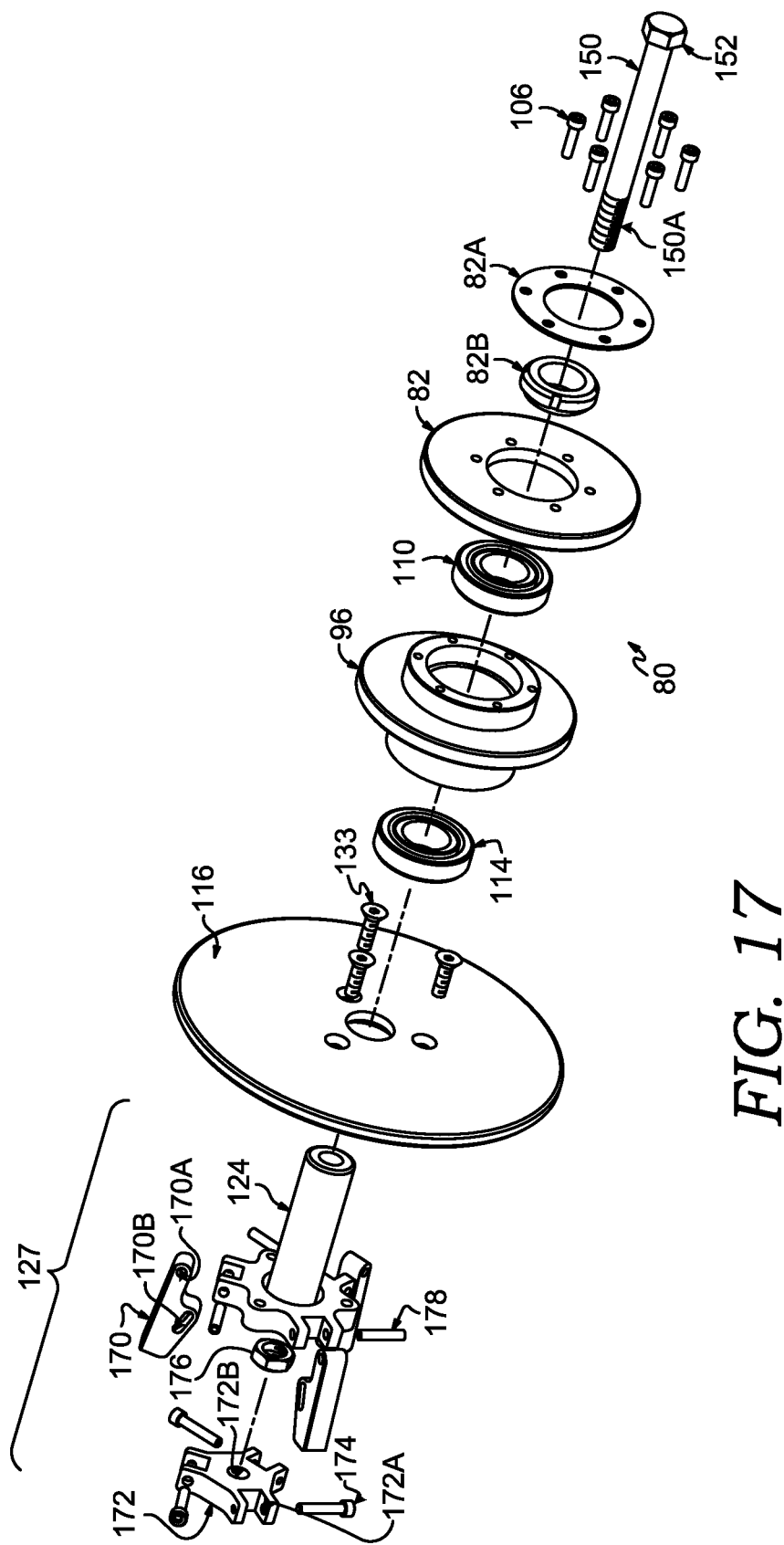
FIG. 17 depicts an enlarged, exploded view of the embodiment of the hub assembly of FIG. 16.

In other embodiments, the hub assembly 80 may be configured with a different arbor hole adapter to secure the flange 20" to the arbor hole 16 of the reel 10. FIG. 16 depicts an enlarged, perspective view of an assembled embodiment of another hub assembly 80. Like the hub assembly 80 of FIG. 9, this embodiment of the hub assembly 80 includes, among other things, the outer follower hub 82, the inner follower hub 96, the disc flange 116, and an arbor hole adapter 127. The main difference in the embodiment of FIGS. 16-20 is in the arbor hole adapter 127. The additional components of this embodiment of the hub assembly 80 are illustrated in FIG. 17, which depicts an enlarged, exploded view of the hub assembly 80 depicted in FIG. 16.

Like the hub assembly of FIG. 9, this embodiment of the hub assembly 80 shown in FIG. 17 includes bolts 106 that secure the outer follower hub 82 to the inner follower hub 96. With continued reference to FIG. 17, in some embodiments, the outer follower hub 82 may have some minor modifications. For instance, the bolts 106, in some embodiments, may secure a dust cover 82A to a face of the outer follower hub 82. The outer follower hub 82 may also include a lock nut 82B that secures the bearing assemblies 110 and 114 of the hub assembly 80. The inner follower hub 96 may include the same components and configuration as the embodiment described above in FIG. 9. The arrangement of this embodiment of the hub assembly 80 is thus largely similar to that described above with respect to FIG. 9 from the disc flange 116 rightward (as viewed in FIG. 17).

Figure 18:
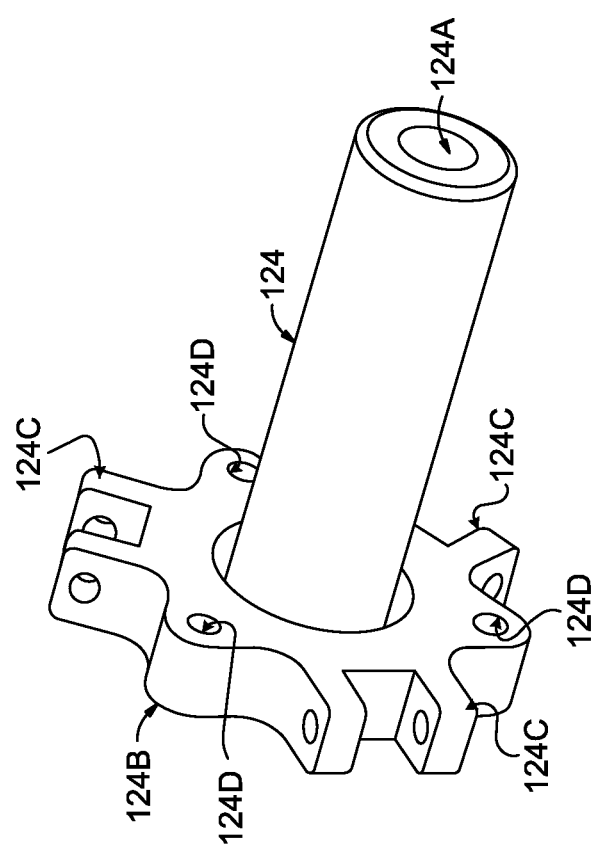
FIG. 18 depicts an enlarged, perspective view of the arbor shaft of the embodiment of the hub assembly of FIG. 16.

As stated above, the main difference between this embodiment and that previously described is the arbor hole adapter 127. As best seen in FIGS. 17 and 18, arbor hole adapter 127 includes an arbor shaft 124 having a central bore 124A. An arbor cap 124B is secured to (or made integral with) the arbor shaft 127. Arbor cap 124B has a number of radially spaced clevises 124C (FIG. 18). In the embodiment shown, there are three clevises 124C. Additionally, the arbor cap 124B has a number of radially spaced, threaded holes 124D that are used (as seen in FIG. 18) to secure the arbor 124 to the disc flange 116 with bolts 133. When the hub assembly 80 is assembled, the draw bolt 150 extends through the central bore 124A, with a threaded end 150A protruding from the arbor cap 124B. A nut 176 (shown in FIGS. 19 and 20) is threaded onto the end 150A of the draw bolt 150 abutting the arbor cap 124B.

As shown in FIGS. 19 and 20, a number of fingers 170 are pivotally coupled to the arbor cap 124B. The fingers 170 are preferably fabricated from metal, such as steel or iron. In some embodiments, the fingers 170 may be claw-shaped, fin-shaped, or L-shaped. Each finger 170 has a rear portion with a hole 170A (FIG. 17). The rear portion fits within a corresponding clevis 124C, such that the hole in the clevis 124C aligns with the hole 170A in the finger 170. A pin 178 is press fit into the clevis 124C to pivotally couple the finger 170 to the clevis 124C, and thus the arbor cap 124B. As an example, the pin 178 can be a spring pin. The finger 170 also has a forward portion with an angled slot 170B. As best seen in FIG. 17, the slot 170B angles upwardly and outwardly away from the arbor cap 124B.

A yoke nut 172 is used to positively move the fingers 170 inwardly and outwardly, rotating about the pin 178. More specifically, the yoke nut 172 has a central, threaded bore 172B that allows the yoke nut 172 to be threaded onto the threaded end 150A of the draw bolt 150. The yoke nut 172 has a number of spaced clevises 172A. The number of clevises 172A corresponds to the number of fingers 170 and clevises 124C. With the yoke nut 172 threaded onto the end 150A of the draw bolt 150, each finger 170 is rotated about the pin 178 into a corresponding clevis 172A such that the hole in clevis 172A aligns with the slot 170B in the finger 170. Thereafter, a pin or screw 174 is placed through the clevis 172A and the slot 170B in the finger 170.

The hub assembly 80 of FIGS. 17 and 18 is shown assembled in FIGS. 19 and 20. FIG. 20 shows the hub assembly 80 with the fingers 170 in a retracted position. In this position, with the hub assembly 80 coupled to the flange 20", it can be coupled to the arbor hole 16 of the reel 10. Because the hub assembly 80 is freely movable within the slot on the flange 20", the fingers 170 are easily moved into alignment with the arbor hole 16. With the fingers 170 inserted into the arbor hole 16 of the reel 10, the head 152 of the draw bolt 150 is used to rotate the draw bolt 150. As the draw bolt 150 rotates, the yoke nut 172 moves inwardly, travelling along the threaded end 150A of the draw bolt 150. As the yoke nut 172 moves inwardly, the pin 174 moves within the slot 170B. As the pin 174 moves within the slot 170B on the finger 170, the finger 170 is forced to rotate outwardly, pivoting about the pin 174. The fingers 170 thus move from a retracted position as shown in FIG. 20, to an extended position as shown in FIG. 19. As the fingers 170 move to the extended position of FIG. 19, they positively grip the inside of the arbor hole 16 on the reel 10. When it is desirable to decouple the flange 20" and the hub assembly 80 from the reel 10, the head 152 of the draw bolt 150 can be turned in the opposite direction. This causes the yoke nut 172 and the fingers 170 to move from the extended position of FIG. 19 to the retracted position of FIG. 20. Because the fingers 170 are constrained by the slots 170B and the pins 174, the fingers 170 are forced to return to a retracted position, as opposed to relying only on gravity, for example. This allows a more positive decoupling of the flange 20" and the hub assembly 80 from the reel 10.

The above-described flanges 20, 20' and 20" and the hub assemblies 80 thus allow the reel 10 to be easily loaded and held in place on the flanges 20, 20' and 20". The reel 10 can then be easily maneuvered into a desired location, and the cable or wire on the reel 10 can be easily paid off the reel 10.

Figure 21:
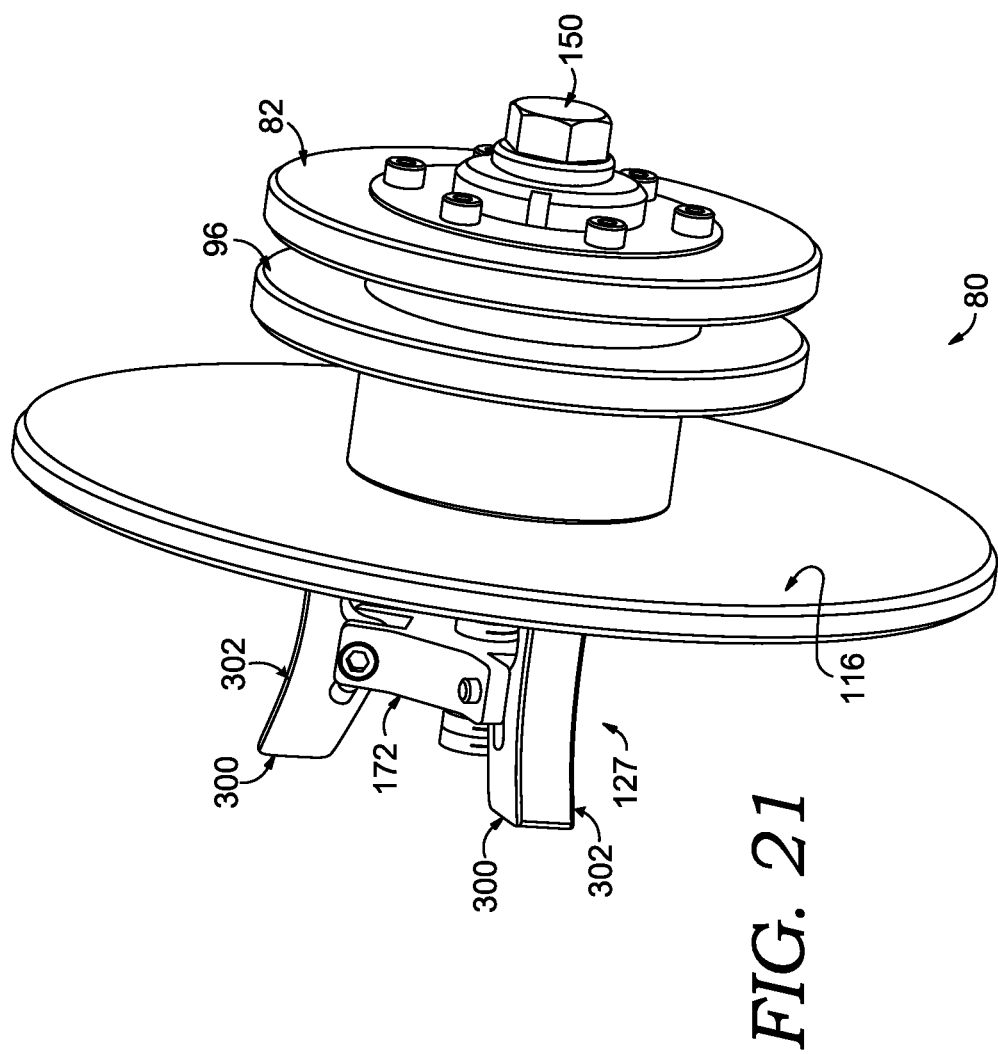
FIG. 21 depicts a perspective view of one aspect of the hub assembly, similar to that of FIGS. 16-20, but with other arbor fingers.
Figure 23:
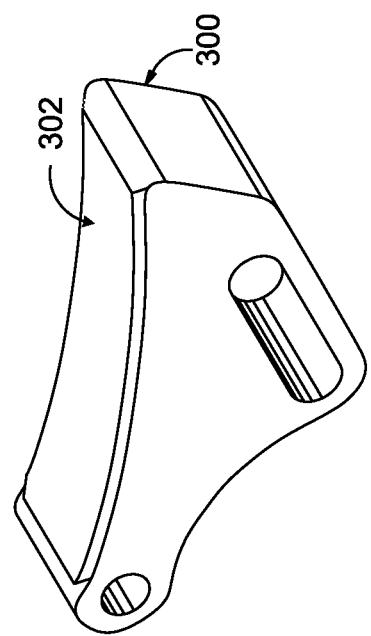
FIG. 23 depicts an enlarged, perspective view of another arbor finger.
Figure 22:
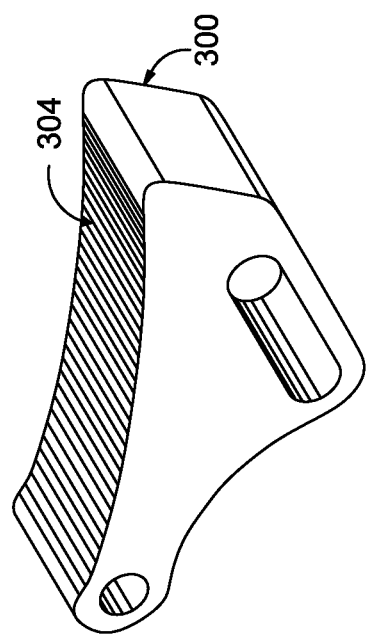
FIG. 22 depicts an enlarged, perspective view of another arbor finger.

Another hub assembly 80 is shown in FIG. 21. The hub assembly 80 of FIG. 21 is similar in all respects to that described above with respect to FIGS. 16-20, with one exception. In the hub assembly 80 shown in FIG. 21, the fingers 170 are replaced by the fingers 300 that have a curved upper surface 302. The curved upper surface 302 of each finger 300 engages with the arbor hole 16 of reel 10. FIG. 23 depicts one enlarged finger 300, showing the curved upper surface 302. Curved upper surface 302 can have a textured or knurled surface 304, as shown in FIG. 22. The curved surface 302, and the knurled surface 304 may be used to more positively grip the inside of the arbor hole 16 of the reel 10. Other contours for the upper surface 302, and surface treatments for the upper surface 302, also could be used. While the embodiments shown and described with respect to FIGS. 16-23 show arbor hole adapters having three fingers, other embodiments are contemplated with more, or less, fingers.

Figure 24:
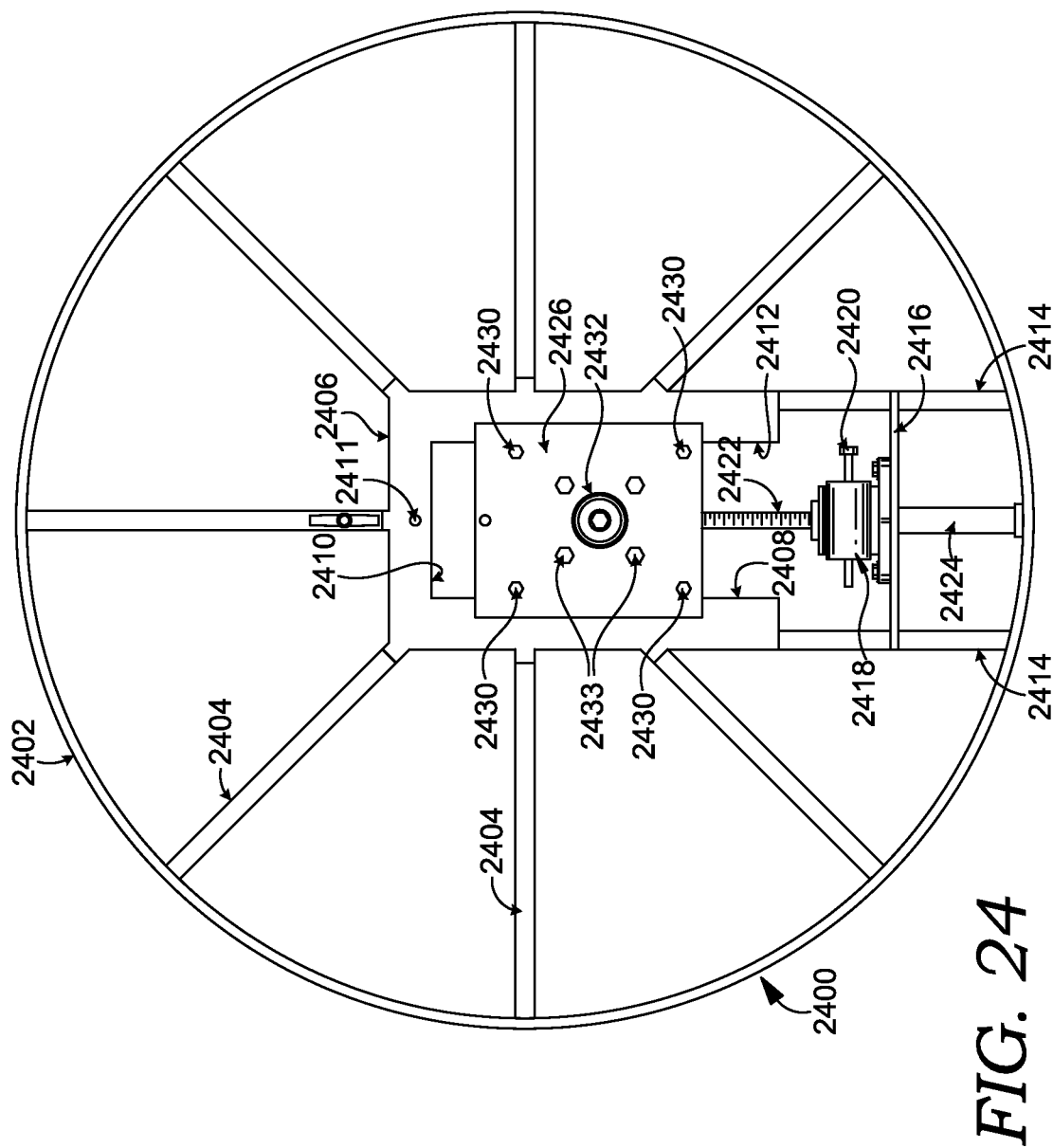
FIG. 24 depicts a front view of the outside of an aspect of a flange assembly.
Figure 25:
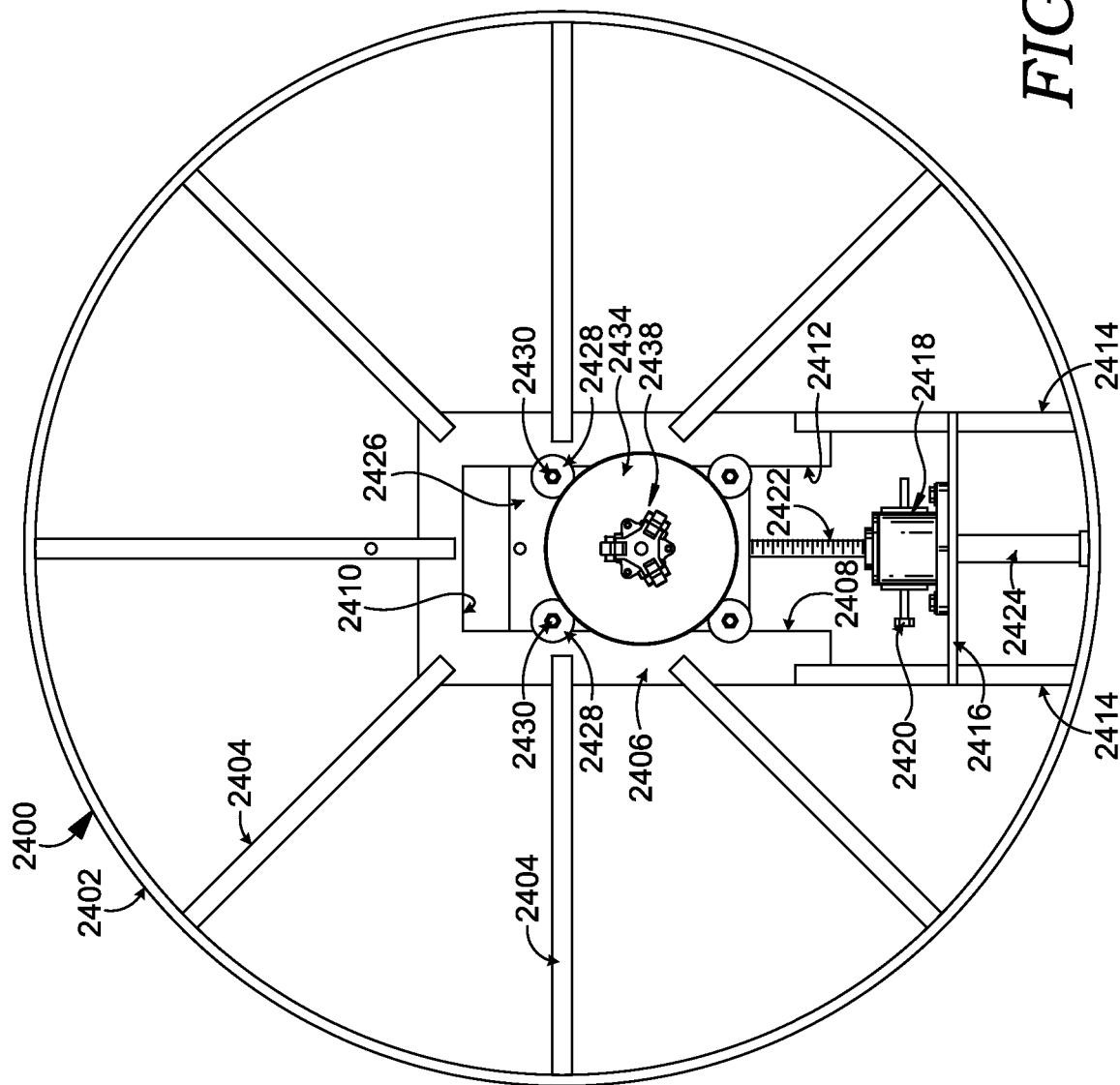
FIG. 25 depicts a back view of the inside of the aspect of the flange assembly of FIG. 24.

Yet another aspect is shown in FIGS. 24-29. FIG. 24 depicts a flange 2400. As with flanges 20, 20' and 20" described above, in use there will be a pair of flanges 2400. Each flange 2400 has an outer rim 2402 that defines the outer diameter of the flange 2400. A number of spokes 2404 extend radially inwardly from the rim 2402. The spokes 2404 provide added structural strength to the flanges 2400. The flanges 2400 are shown with an open-spoke design, but could also be constructed with the rim 2402, spokes 2404, and a solid backing. So, the flanges 2400 may be equipped with a covering for the spokes 2404 to prevent access through the spokes 2404 from the outside to the inside. In one exemplary aspect, this covering is a solid circular sheet with a relief channel for the vertical movement of a hub (described below). In another exemplary aspect, this covering is an outer band extending radially inwardly from the outer rim 2402 a sufficient distance to cover the opening between the rim 2402 and the outer diameter of the reel loaded onto the flange 2400. A guide plate 2406 is coupled to each flange 2400. As one example, the guide plate 2406 can be welded to the adjacent spokes 2404. The guide plate 2406 has an overall shape that is roughly rectangular with a defined rectangular aperture, or slot, 2408 formed within it. As best seen in FIGS. 24 and 25, the aperture 2408 starts at a lower end 2410 and extends upwardly to a closed upper end 2412. Near the upper end 2412 of the aperture 2408 the guide plate 2406 has a hole 2411 (the importance of which is described further below).

In FIG. 24, the guide plate 2406 may be further supported by a pair of support legs 2414, which may be welded between the outer rim 2402 and the lower end 2410 of the guide plate 2406. A platform 2416 is secured between the support legs 2414, such as by welding. As will be understood by those of skill in the art, rotary motion of the input shaft 2420 operates to linearly translate the lifting screw 2422 relative to the input shaft 2420. The lifting screw 2422 travels within a protective tube 2424 that is coupled between the outer rim 2402 and the screw jack 2418 to protect the lifting screw 2422 when it extends below platform 2416.

As illustrated in FIG. 24, the upper end of the lifting screw 2422 is coupled to a support plate 2426. The support plate 2426 travels up and down as the lifting screw 2422 is moved up and down by the screw jack 2418. As shown in FIG. 25, the support plate 2426 has a number of roller guides 2428 coupled to it, such as by bolts 2430. The roller guides 2428 are spaced from the guide plate 2426 by a shoulder that serves as a roller bearing surface that rolls along the edge of the slot 2408. The shoulders of the roller guides 2428 allow the support plate 2426 to travel (e.g., vertically) relative to the guide plate 2406 and to support the travel of the support plate 2426. In other words, the roller guides 2428 provide guided support to the support plate 2426 as it travels within the aperture 2408 of the guide plate 2406. In an exemplary embodiment, there are two upper roller guides 228 and two lower roller guides 2428.

Figure 26:
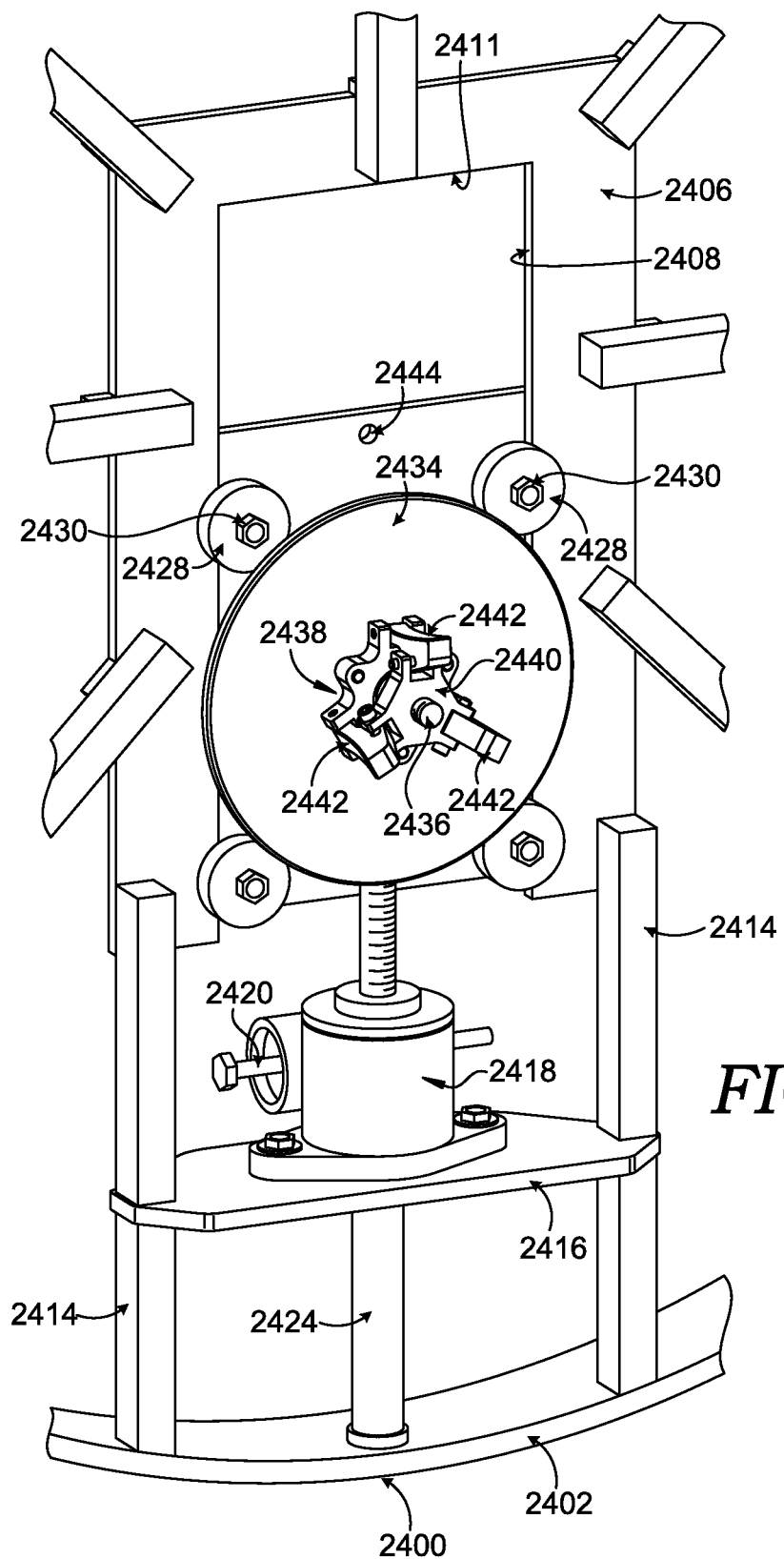
FIG. 26 depicts an enlarged view of a portion of the flange assembly of FIG. 25, showing the inside view.
Figure 27:
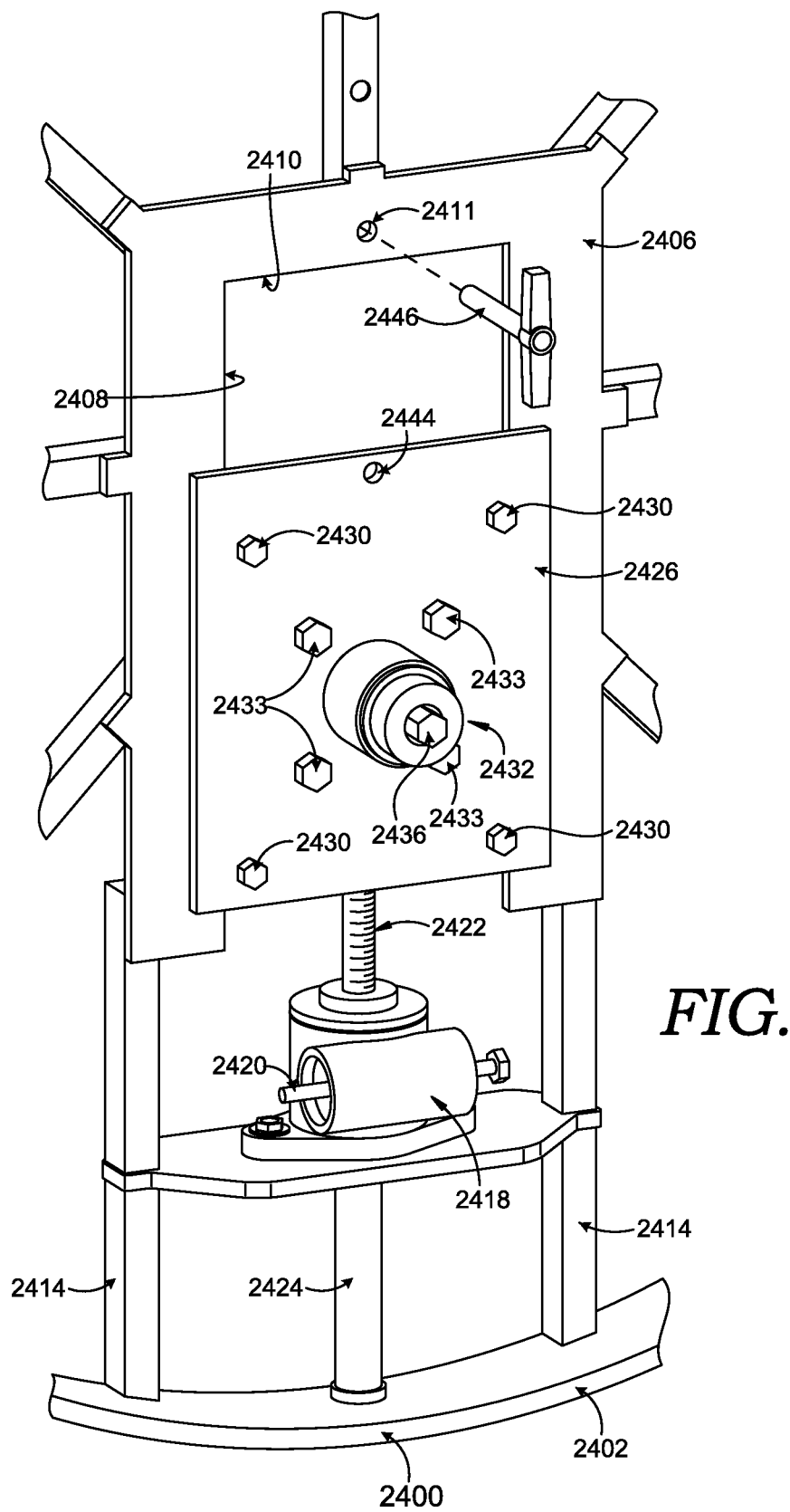
FIG. 27 depicts a view similar to FIG. 26, showing the outside view.

The support plate 2426 has a bearing assembly 2432 coupled thereto, as best seen in FIG. 27. The bearing assembly 2432 is coupled to the support plate 2426 with the bolts 2433. Turning to both FIGS. 26 and 27, the bearing assembly 2432 rotatably supports a stop flange 2434 (similar to the stop flange 116 described above). A draw bolt 2436 (best seen in FIGS. 26 and 27) extends through the bearing assembly 2432, and through an arbor hole adapter 2438 that is coupled to the stop flange 2434. The arbor hole adapter 2438 and the draw bolt 2436 operate as the arbor hole adapter 127 and the draw bolt 150 described above with respect to FIG. 17. The arbor hole adapter 2438 thus similarly has an arbor yoke nut 2440 threaded onto the end of draw bolt 2436 that operates to engage and disengage a number of fingers 2442 in the same manner as the arbor yoke nut 172 and fingers 170 described with reference to FIGS. 17-20 (or the fingers 300 in FIGS. 22-23). Therefore, the arbor hole adapter 2438 and the stop flange 2434 independently rotate relative to the flange 2400 using the bearing assembly 2432.

In use, the arbor hole adapter 2438 can be vertically positioned to mate with an arbor hole of the reel 10. With reference to FIGS. 26 and 27, the arbor hole adapter 2438 can be vertically positioned by rotating the input shaft 2420, which in turn vertically moves the lifting screw 2422 within the screw jack 2418. With the fingers 2442 inserted into the arbor hole of the reel 10, the head of the draw bolt 2436 is used to rotate the draw bolt 2436. As the draw bolt 2436 rotates, the arbor yoke nut 2440 positively moves the fingers 2442 between retracted and extended positions, and vice versa depending on the rotational direction of the draw bolt 2436 (similar to that described above with respect to FIGS. 16-23). Once the arbor hole adapter 2438 is engaged within the arbor hole 16, the reel 10 can be vertically lifted using the screw jack 2418.

More specifically, a tool, such as a drill, can be attached to the input shaft 2420 to impart rotational movement to input shaft 2420. As the input shaft 2420 rotates, the screw jack 2418 causes the lifting screw 2422 to travel vertically upward, which thus moves the support plate 2426 upward, guided by the slot 2408 (and the roller guides 2428). This upward movement lifts the reel 10 (coupled to support plate 2426 by the arbor hole adapter 2438, the draw bolt 2436, the stop flange 2434, and the bearing assembly 2432). Once in the upper position, a hole 2444 in the support plate 2426 aligns with the hole 2411 in the guide plate 2406. The raised position can be positively locked in place with a locking pin 2446 placed in the holes 2444 and 2411. As an example, the locking pin 2446 can be a t-handle push button quick release pin. Once lifted to the upper position, the bearing assembly 2432 allows rotational movement of the stop flange 2434 and the arbor hole adapter 2438 (and thus the reel 10) relative to the flange 2400, to allow wire to be paid off of the reel 10.

Figure 28:
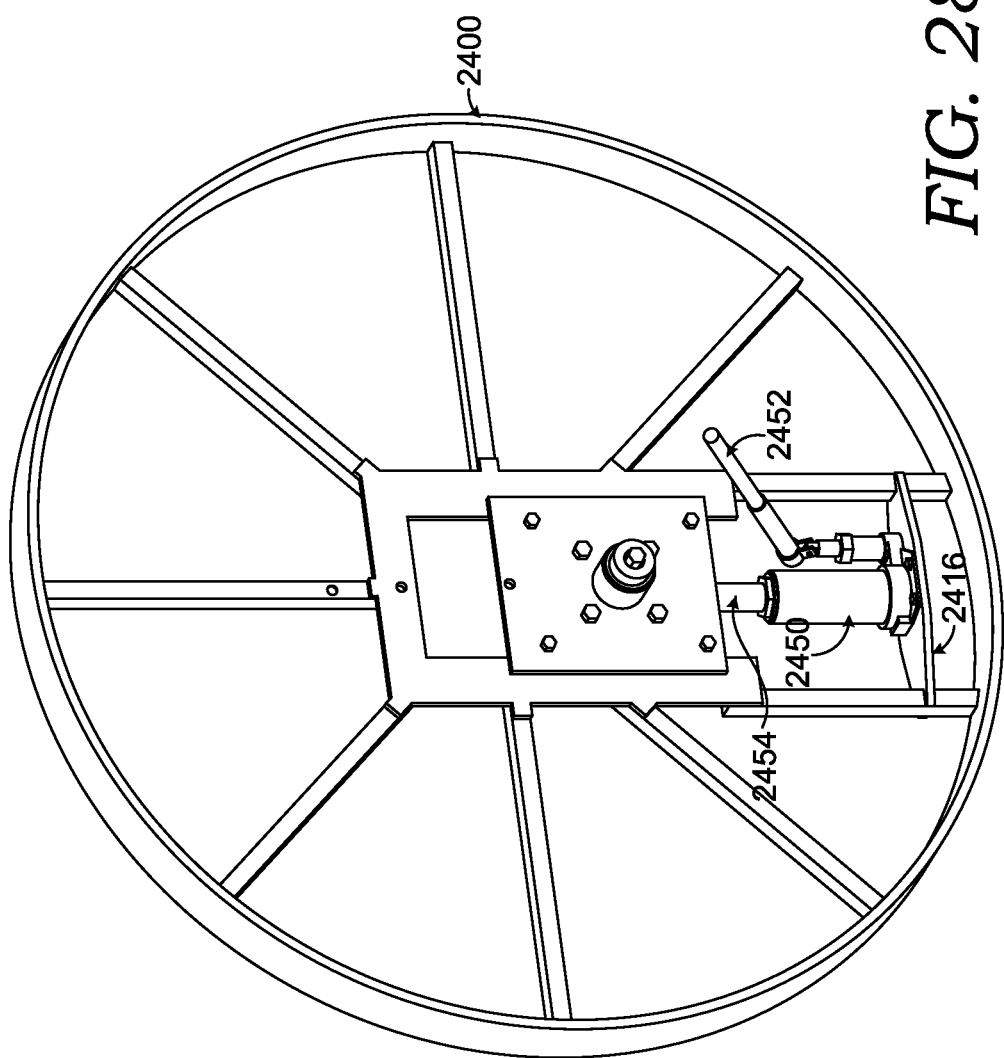
FIG. 28 depicts a front view of the outside of an aspect of a flange assembly.
Figure 29:
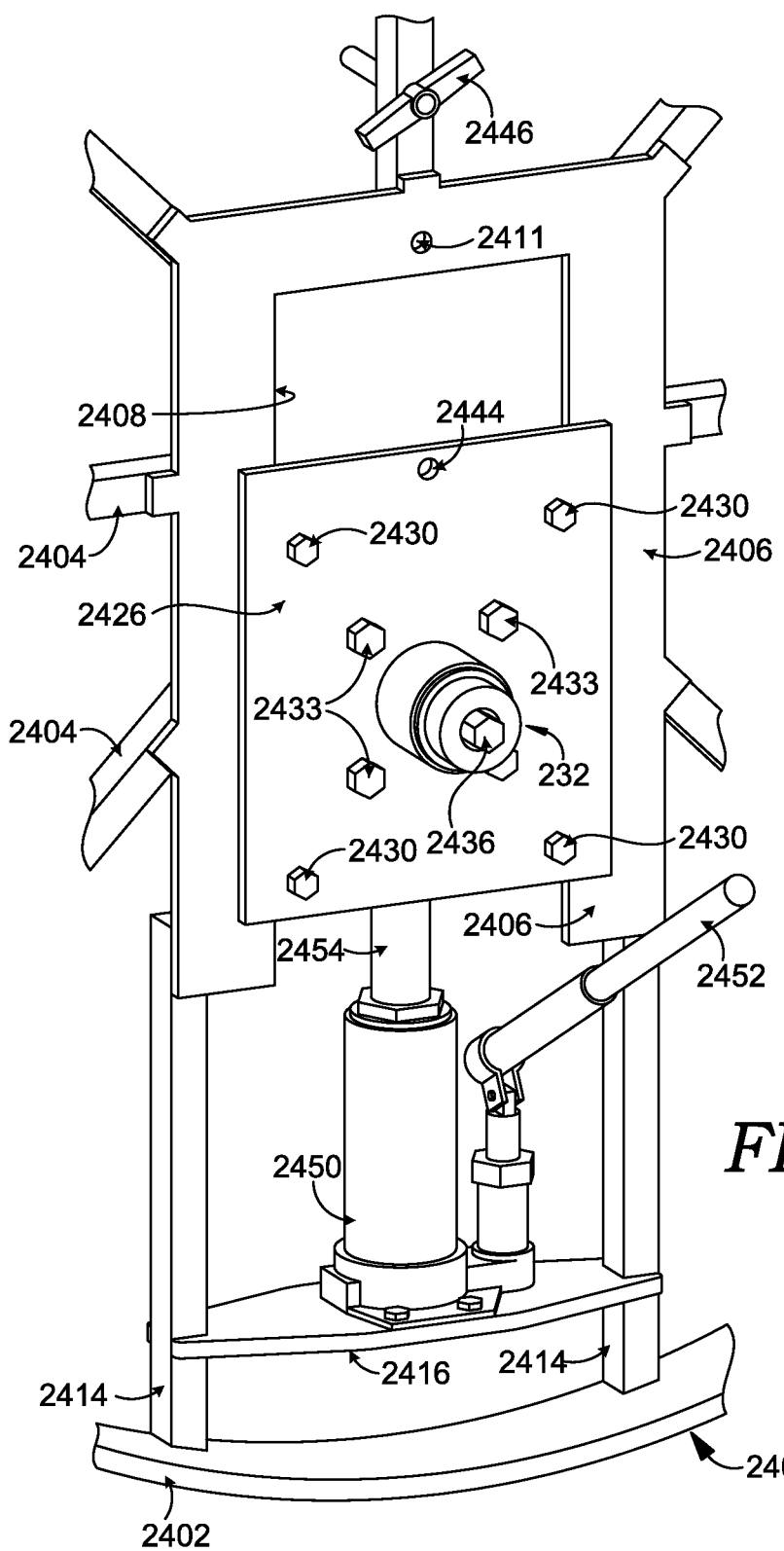
FIG. 29 depicts a partial, enlarged perspective view of a flange assembly of FIG. 28, showing another lifting mechanism.

Yet another aspect is shown in FIGS. 28 and 29, which depict the flange 2400 similar to that described with respect to FIGS. 24-27, but showing another lifting mechanism different from screw jack 2418. As shown in FIGS. 28 and 29, the platform 2416 is used to support a lift jack 2450. The lift jack 2450 is equipped with a handle 2452 that is operated to extend a shaft 2454 from the body of the lift jack 2450. The lift jack 2450 is preferably a hydraulic or pneumatic jack. As can be seen, the overall construction and operation are very similar to the aspects described above with reference to FIGS. 24-27 but with the lift jack 2450 replacing the screw jack 2418. Both the screw jack 2418 and the lift jack 2450 operate to move the support plate 2426 (and thus the arbor hole adapter 2438 and the reel 10, once attached) within the slot 2408 of the guide plate 2406.

Figure 30:
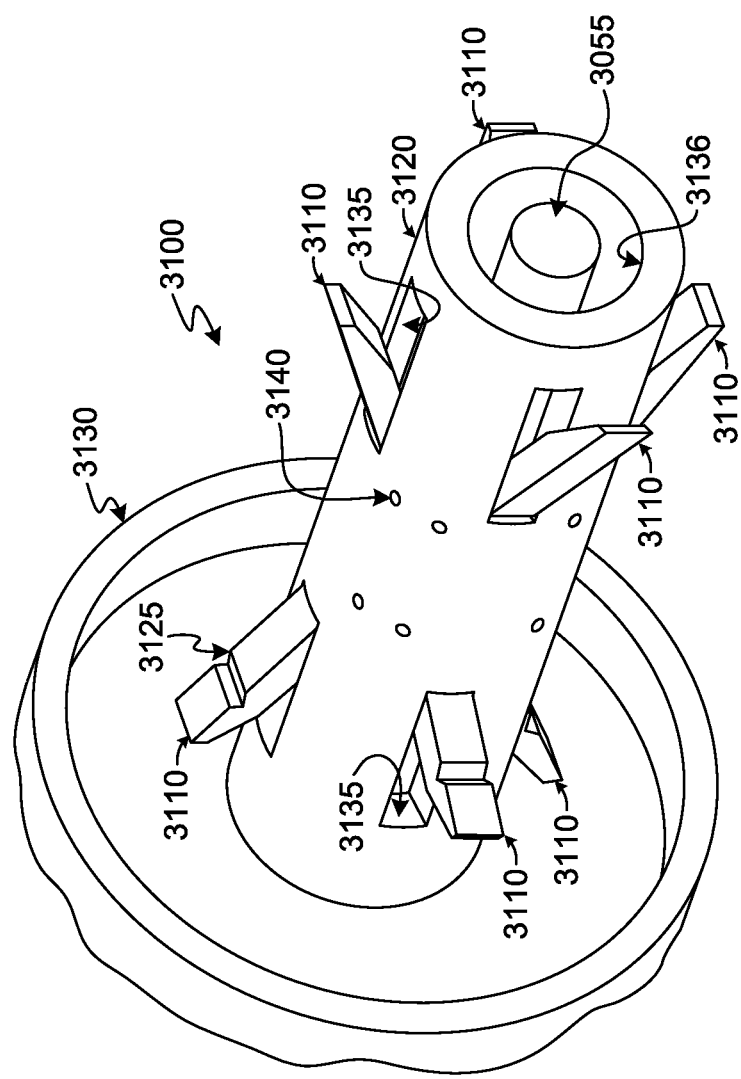
FIG. 30 shows a perspective view of the modified arbor adapter.
Figure 31:
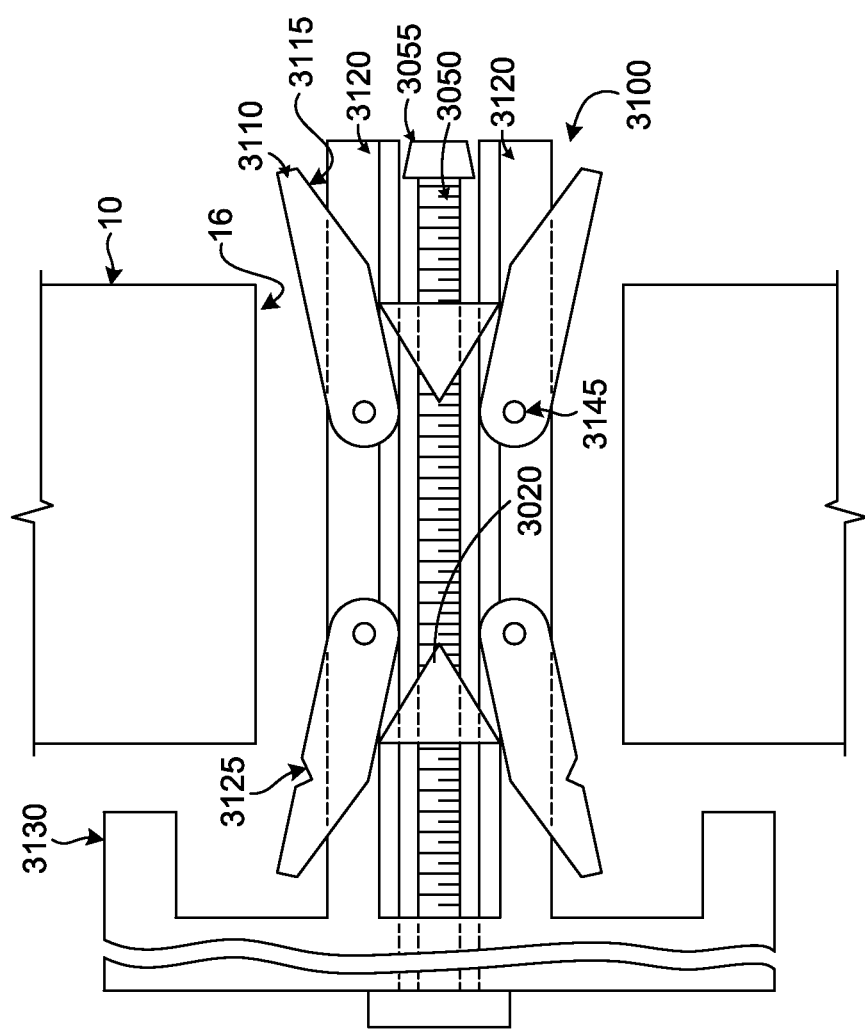
FIG. 31 shows a partial, cross-sectional view of the modified arbor adapter of FIG. 30.

FIGS. 30 and 31 provide other constructions for the arbor hole adapter 3100. Turning to FIG. 30, the modified arbor hole adapter 3100 includes a central housing 3120 and an end cap 3130. The housing 3120 and the end cap 3130 may be integrally formed, or may be fixedly coupled together. The housing 3120 is a tube with a series of circumferentially spaced slots 3135. The housing 3120 also has a series of spaced through-holes 3140 spaced radially and longitudinally about the housing 3120. The housing 3120 further has an internal bore 3136 that extends the length of the housing 3120. The slots 3135 and the through-holes 3140 extend from the outer perimeter of the housing 3120 to the internal bore 3136.

As best seen in FIG. 31, the arbor adapter 3100 further includes a central threaded bolt 3050 and end nut 3055 arrangement. The bolt 3050 carries cone-shaped nuts 3020 that are threaded onto the bolt 3050. The arbor adapter 3100 has locking fingers 3110 pivotably coupled to the housing 3120 using through-holes 3140 and slots 3135, with pins 3145. When coupled to the housing 3120, the fingers 3110 can extend from the housing 3120 through the slots 3135, and can be retracted into housing 3120 as well. The fingers 3110 may be formed with a slanted internal edge 3115 that allows the fingers 3110 to be retracted to a point at which the slanted internal edge 3115 abuts the housing 3120. The slots 3135 and the fingers 3110 are sized to allow the arbor adapter 3100 to be inserted through the arbor hole 16 of the reel 10 when the fingers 3110 are in a retracted position. The outer surface of at least some of the fingers 3110 may be formed with a notch 3125. As an example, the fingers 3110 on the outside of the arbor hole adapter 3100 may include the notch 3125. As best seen in FIG. 31, the cone shaped nuts 3020 are threaded onto the bolt 3050 and positioned to operate as a cam to extend and retract the fingers 3110 as the bolt 3050 is turned. In operation, the arbor hole adapter 3100 is placed through the arbor hole 16 with the fingers 3110 in a retracted position. The bolt 3050 may then be turned to move the nuts 3020, which in turn extends the fingers 3110. This continues until the fingers 3110 engage the circumferential edge of the arbor hole 16 on both the inside and the outside of the reel 10. The end cap 3130 is positively engaged with the reel 10 when the fingers 3110 are in the fully-extended position. Preferably, the notches 3125 engage with the circumferential edge of the arbor hole 16.

While differing embodiments of arbor hole adapters, flanges, hub assemblies and lift mechanisms have been described above, one or more of the embodiments, or portions of the embodiments, could be used in combination as well. For example, the arbor hole adapter of FIG. 10 could be combined with the arbor hole adapter of FIG. 30, resulting in a coupling having forces on the inside of the arbor hole and the outer perimeter of the arbor hole of the reel. Moreover, in some embodiments, other components described above might be used different hub assemblies might be used with any of the flanges.

Figure 32:
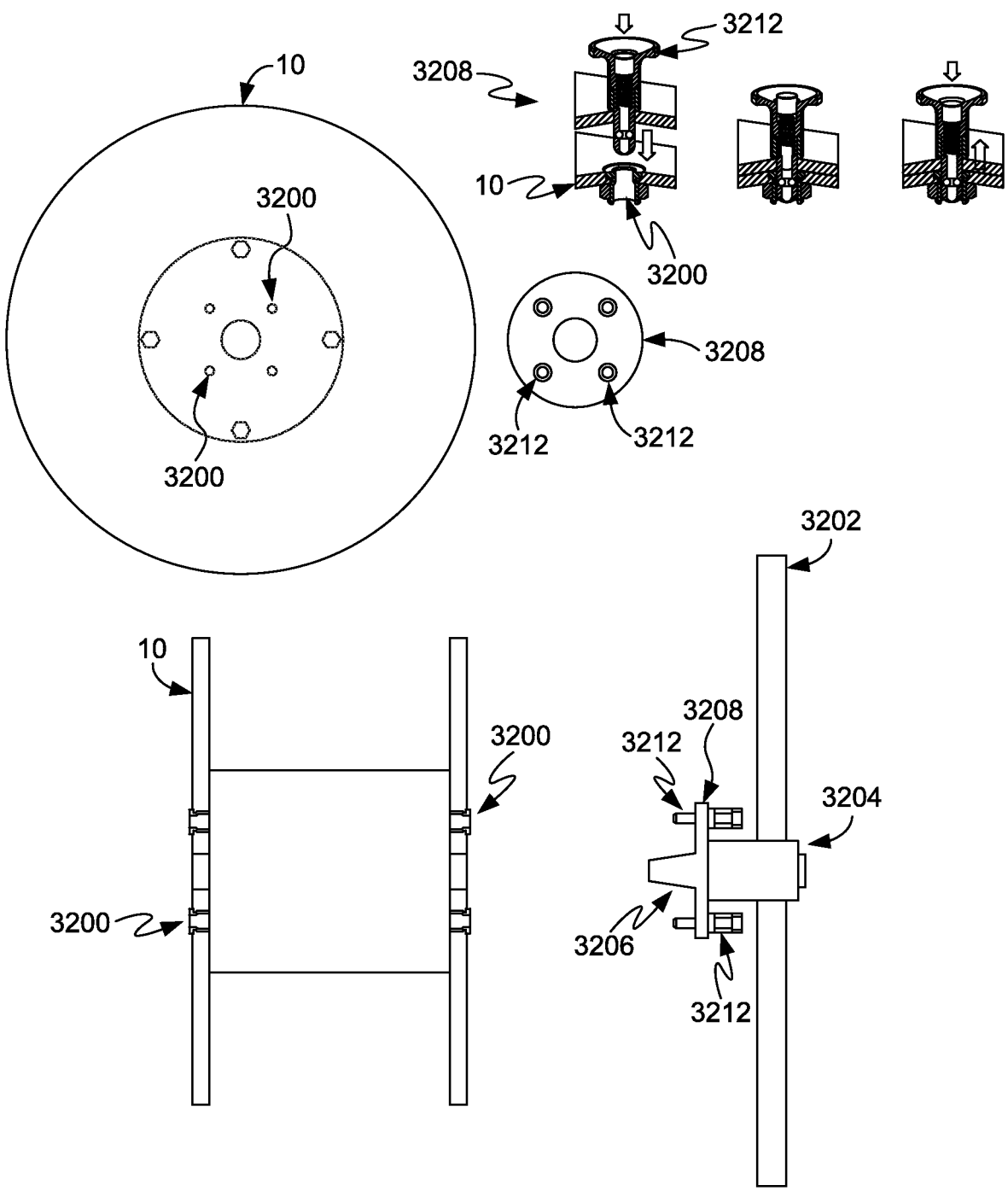
FIG. 32 shows another embodiment of a reel with a removable flange.
Figure 33:
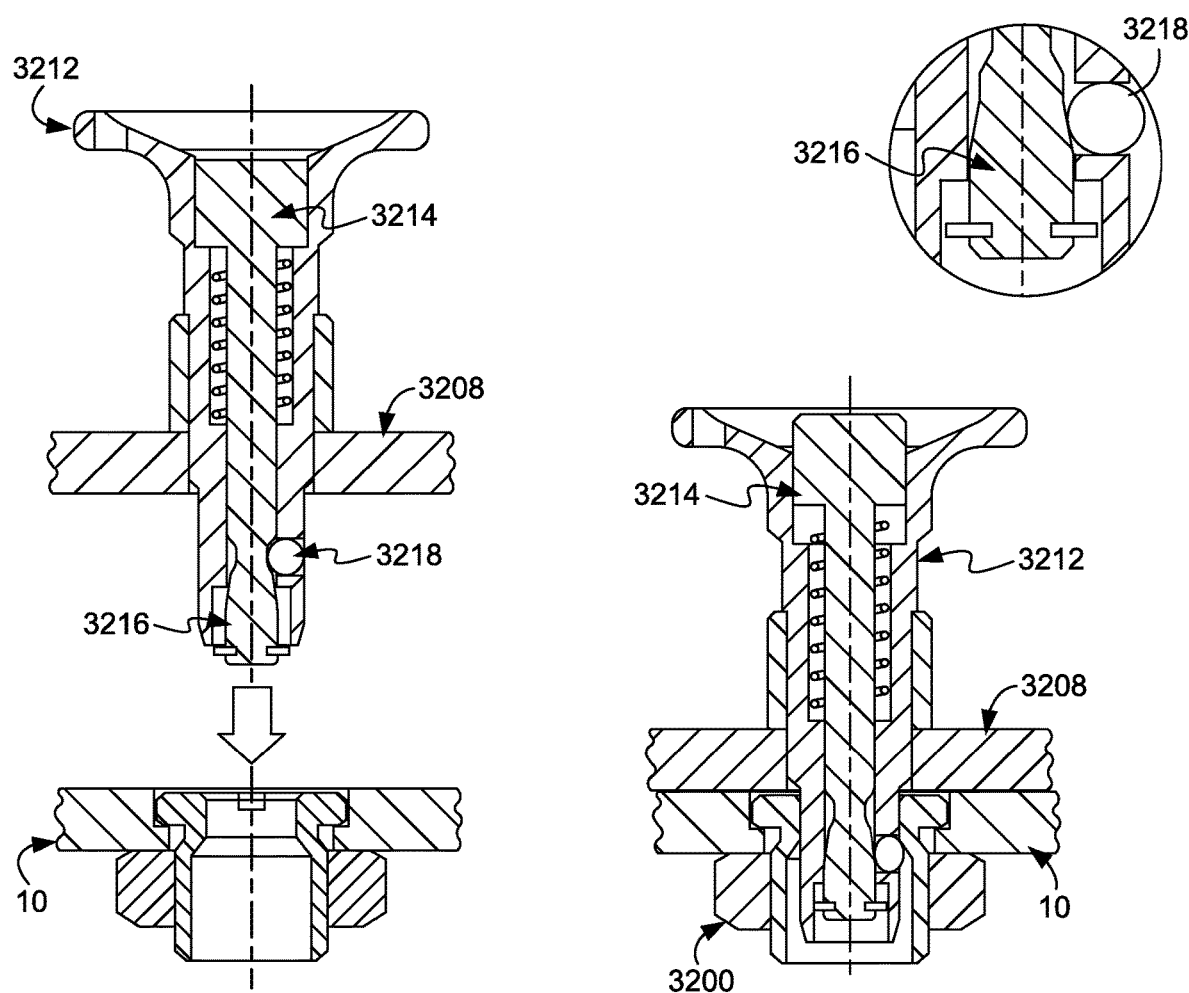
FIG. 33 shows partial, enlarged details of certain components of FIG. 32.

FIGS. 32 and 33 illustrate another embodiment releasably coupling the reel 10 to a flange 3202. The reel 10 in this embodiment has a number of receptacles 3200 spaced about the discs on the reel 10. The receptacles 3200 are fixedly coupled to the reel 10, and are shown enlarged in FIG. 33. The flange 3202 has a hub assembly 3204 constructed similarly to those described above, in that the hub assembly 3204 allows the flange 3202 to rotate about the hub assembly 3204. An arbor insert 3206 is coupled to the hub assembly 3204. The arbor insert 3206 includes a mounting disc 3208, and a truncated, conical projection 3210. A number of release locking pins 3212 are coupled to the mounting disc 3208, and preferably correspond in number to the number of receptacles 3200 on reel 10. FIG. 32 shows four such receptacles 3200 and pins 3212, but other numbers of receptacles and pins could be used. The receptacles 3200 and pins 3212 may be those that are commercially available in the market. In operation, a button 3214 on the pins 3212 is depressed and the flange 3202 is moved into engagement with the reel 10, and the pins 3212 are inserted into the receptacles 3200. When the button 3214 is depressed, a wedge 3216 on the pins 3212 moves a ball 3218 to allow the pin 3212 to be inserted in the receptacle 3200. When the button 3214 is released, the ball 3218 pushes onto a taper 3220 on the receptacle 3200, thereby clamping the pin 3212 to the receptacle 3200 (and thus clamping the flange 3202 to the reel 10). To release the flange 3202 from the reel 10, the button 3214 is depressed while pulling outwardly on the pin 3212. Other releasable locking mechanisms and receptacles may also be used. As only one example, releasable locking clamps may also be used with the receptacles 3200.

The above-described flanges and hub assemblies allow a reel to be easily loaded and held in place on flanges. Once on the flange, the reel can be easily maneuvered into a desired location, where the cable or wire on the reel can be easily paid off the reel.

Figure 34:
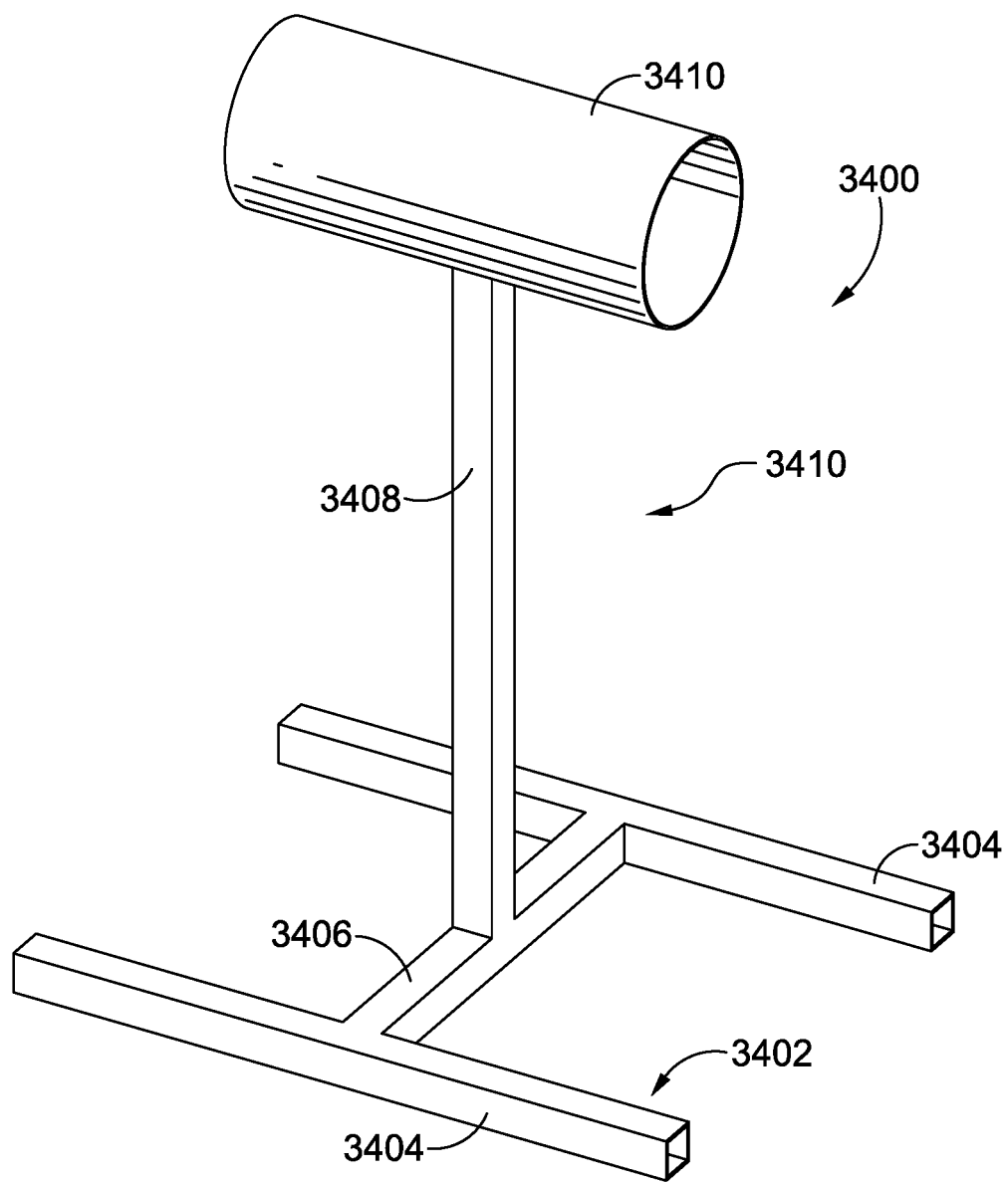
FIG. 34 shows a perspective view of a flange stand.

A flange stand 3400 is shown in FIG. 34. The flange stand 3400 includes a base portion 3402. In one aspect, the base portion 3402 includes spaced apart legs 3404 connected by a center base member 3406. Midway between the legs 3404, and coupled to the center base member 3406, is a support portion 3408. As shown, in one aspect, the legs 3404, the center base member 3406, and the support portion 3408 are constructed from square steel tubing. Other materials, and geometries, could be used to construct the base portion 3402 and the support portion 3408. A coupler 3410 is attached to the center base member 3406. The coupler 3410 is a hollow cylinder sized to accept any of the arbor hole adapters described herein. In one aspect, the coupler 3410 is constructed from a piece of narrow-walled steel tubing.

Figure 35:
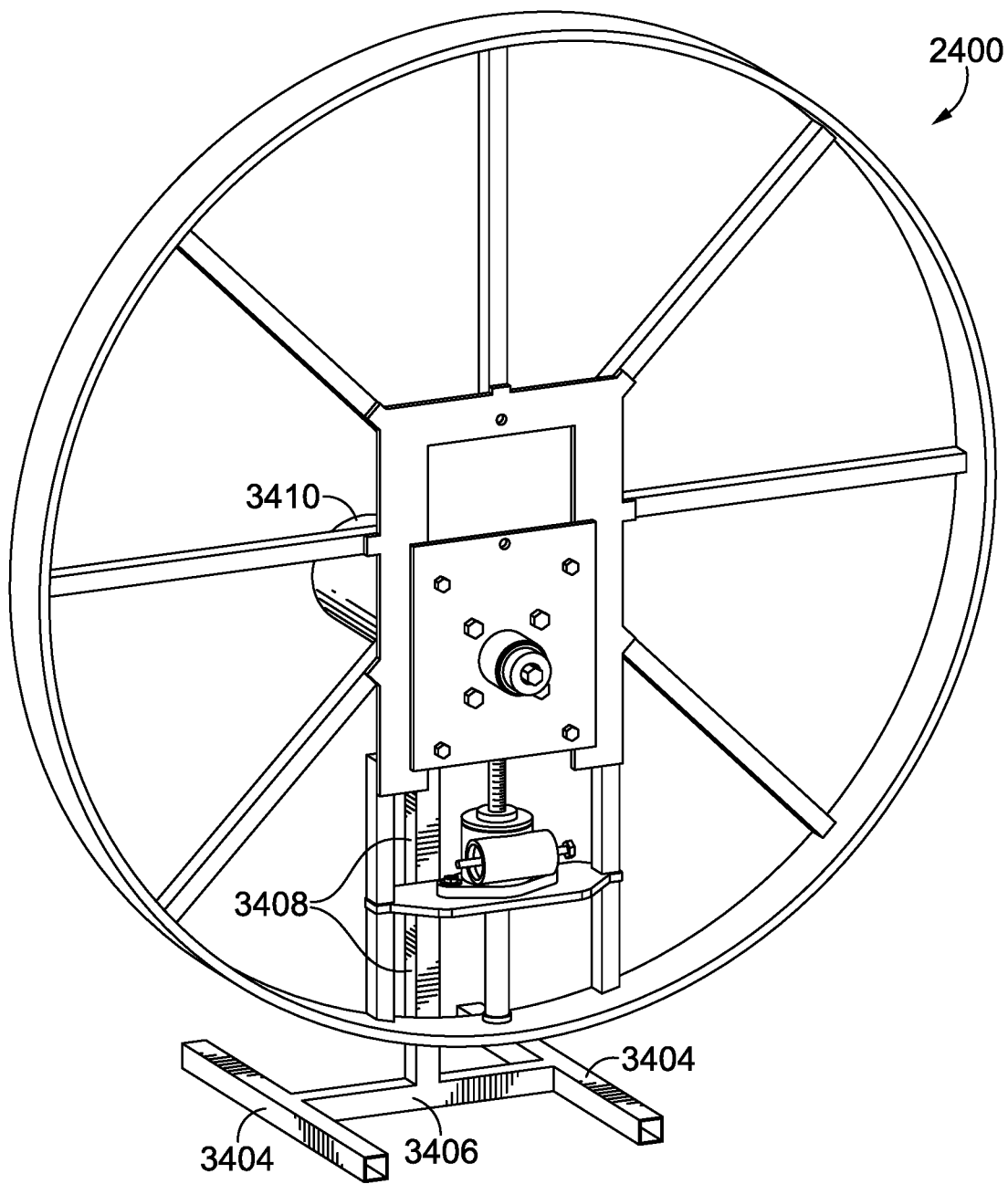
FIG. 35 shows the flange stand coupled to a flange.

In use, the flange stand 3400 can be coupled to any of the flanges described above. When coupled to a flange, the flange stand 3400 supports the flange (such as flange 2400 shown in FIG. 35) in an upright condition, such as the position shown in FIG. 35. The flange stand 3400 is able to rotate relative to the flange. This allows a user to grasp one of the legs 3404, for example, rotate the flange stand 3400 relative to the flange, and to thereafter use the flange stand 3400 as a handle to maneuver the flange as desired. Once in a desired location, the user can rotate the flange stand 3400 such that one of the legs 3404 rests on the floor or on another support surface and the flange stand 3400 then supports the flange 2400 in the upright condition. The flange stand 3400 thus operates to support flanges when they are not in use, and also operates as a handle to assist users in moving the flanges to desired locations.

Figure 36:
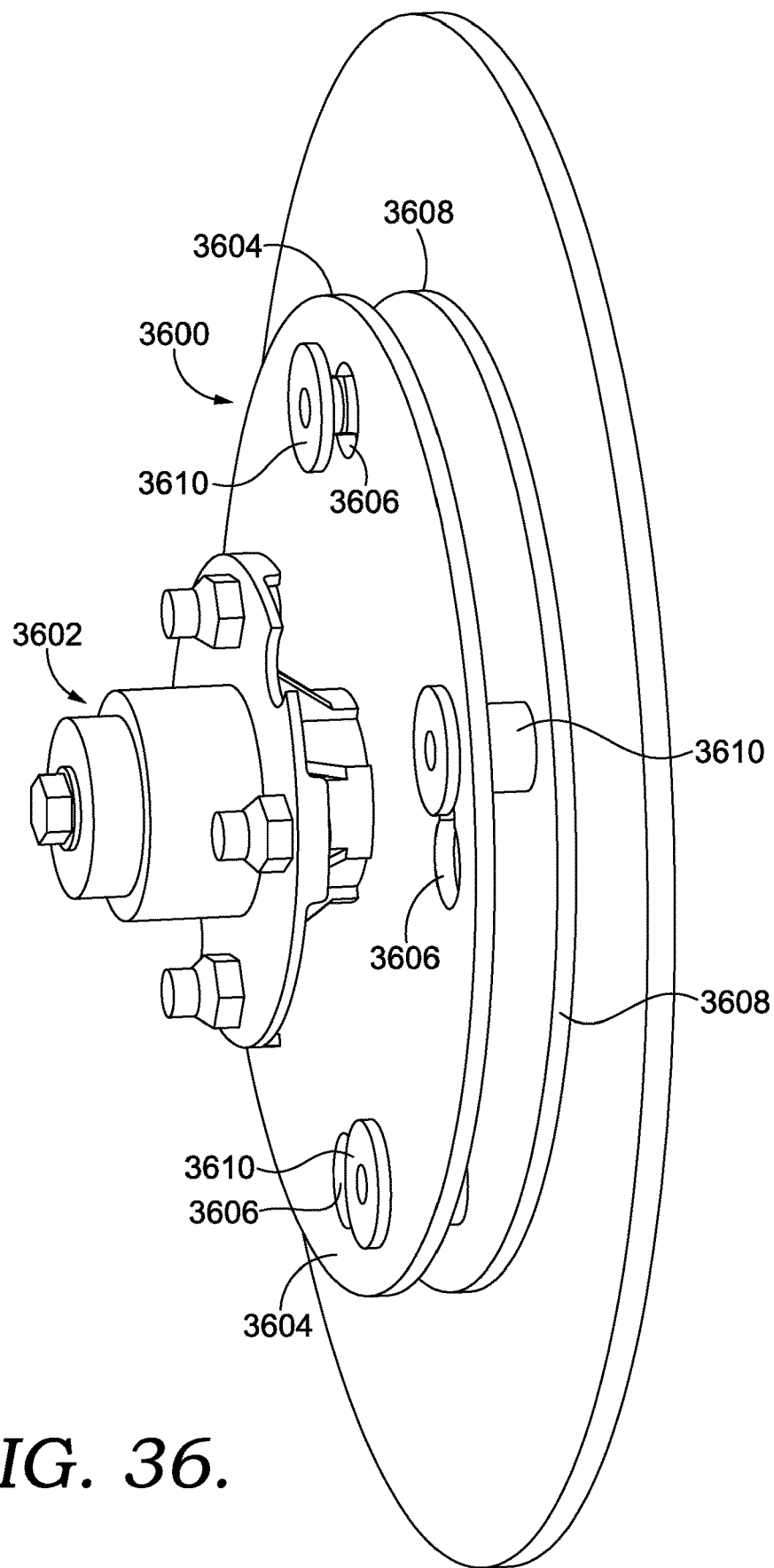
FIG. 36 shows a side perspective view of a flange adapter installed on a reel.
Figure 37:
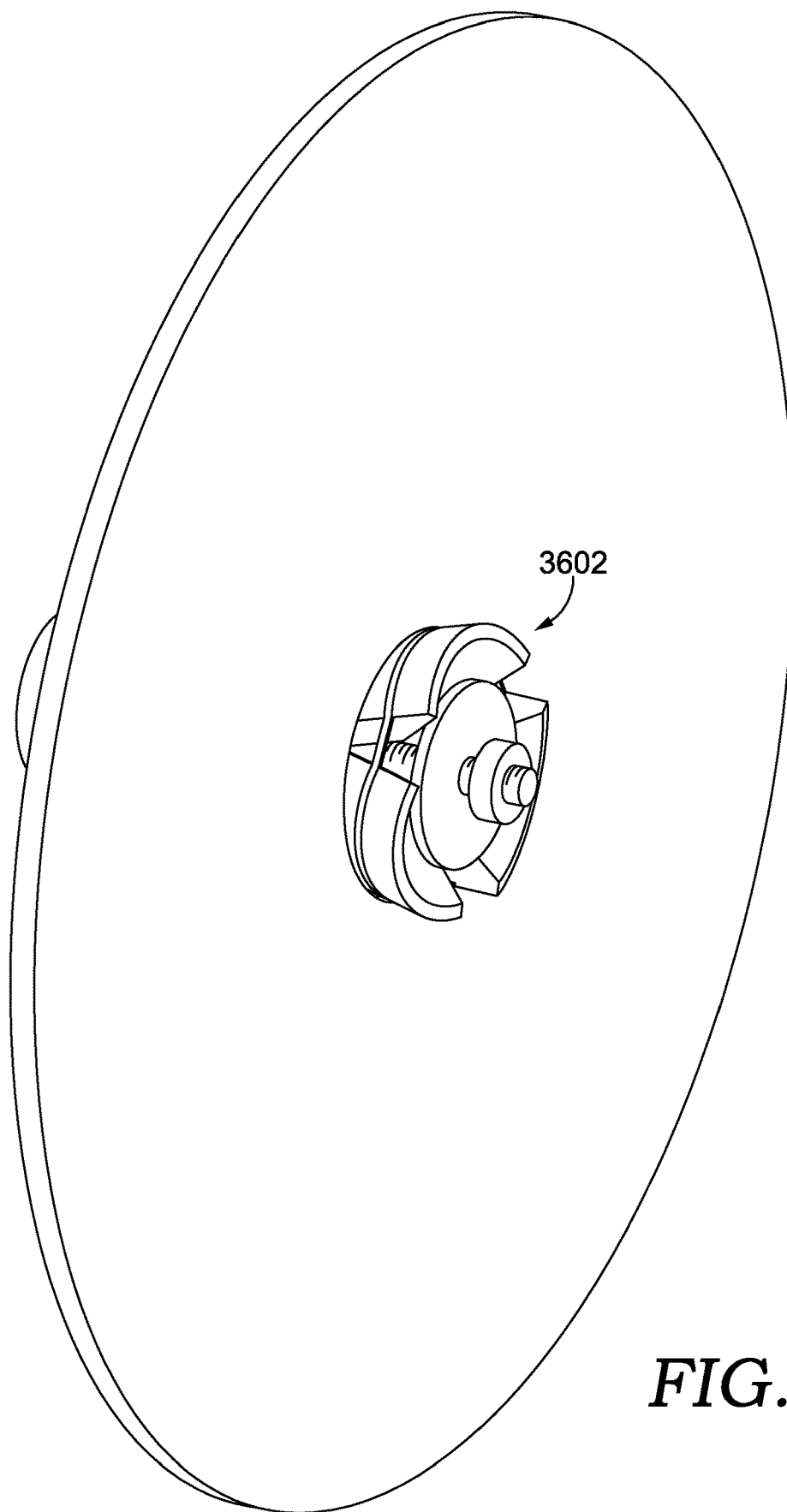
FIG. 37 shows the interior view of the adapter, illustrating the arbor hole adapter in an expanded condition.
Figure 38:
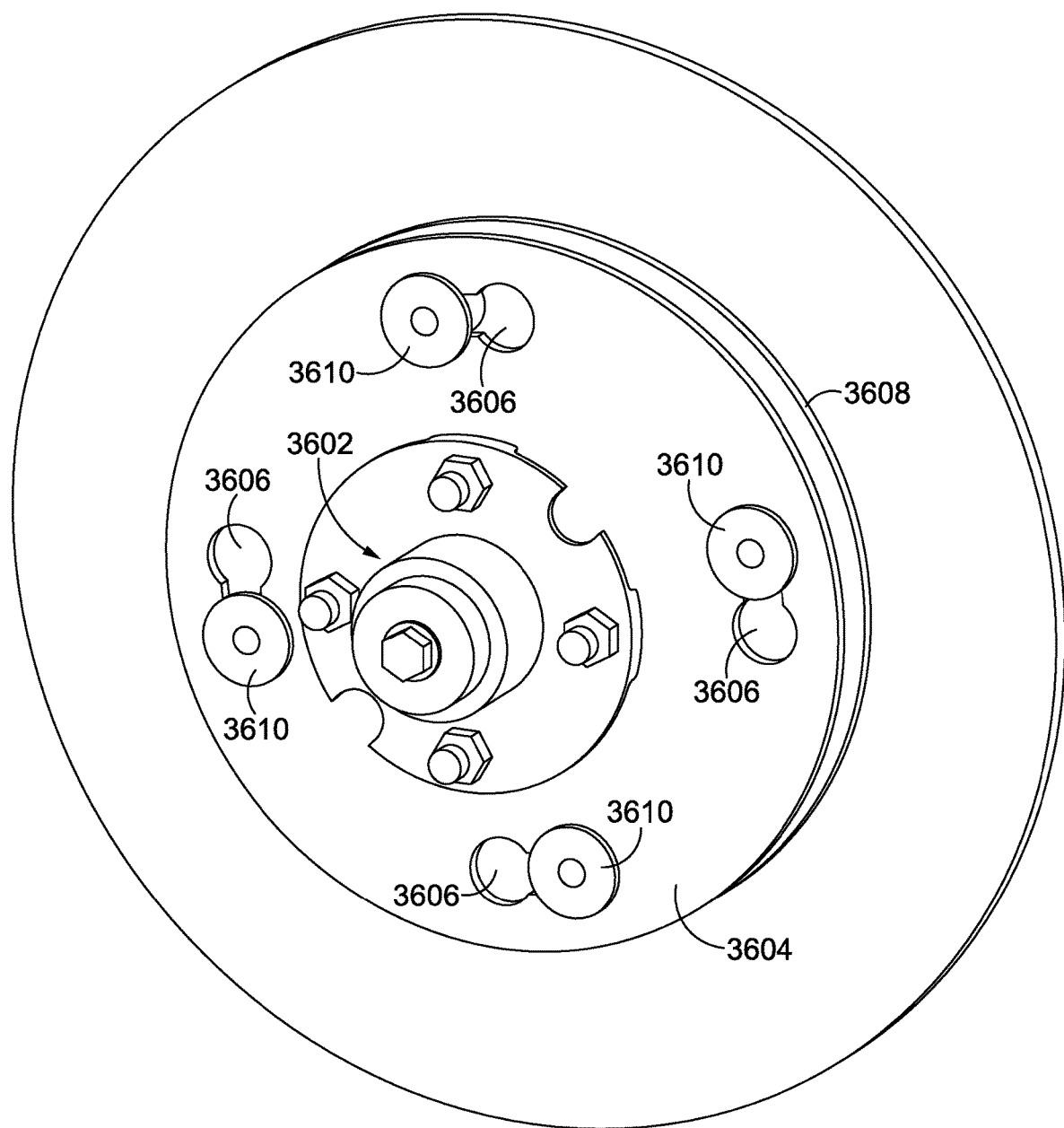
FIG. 38 shows a perspective front view of the adapter on the reel, with the expansion plates in the extended condition.
Figure 39:
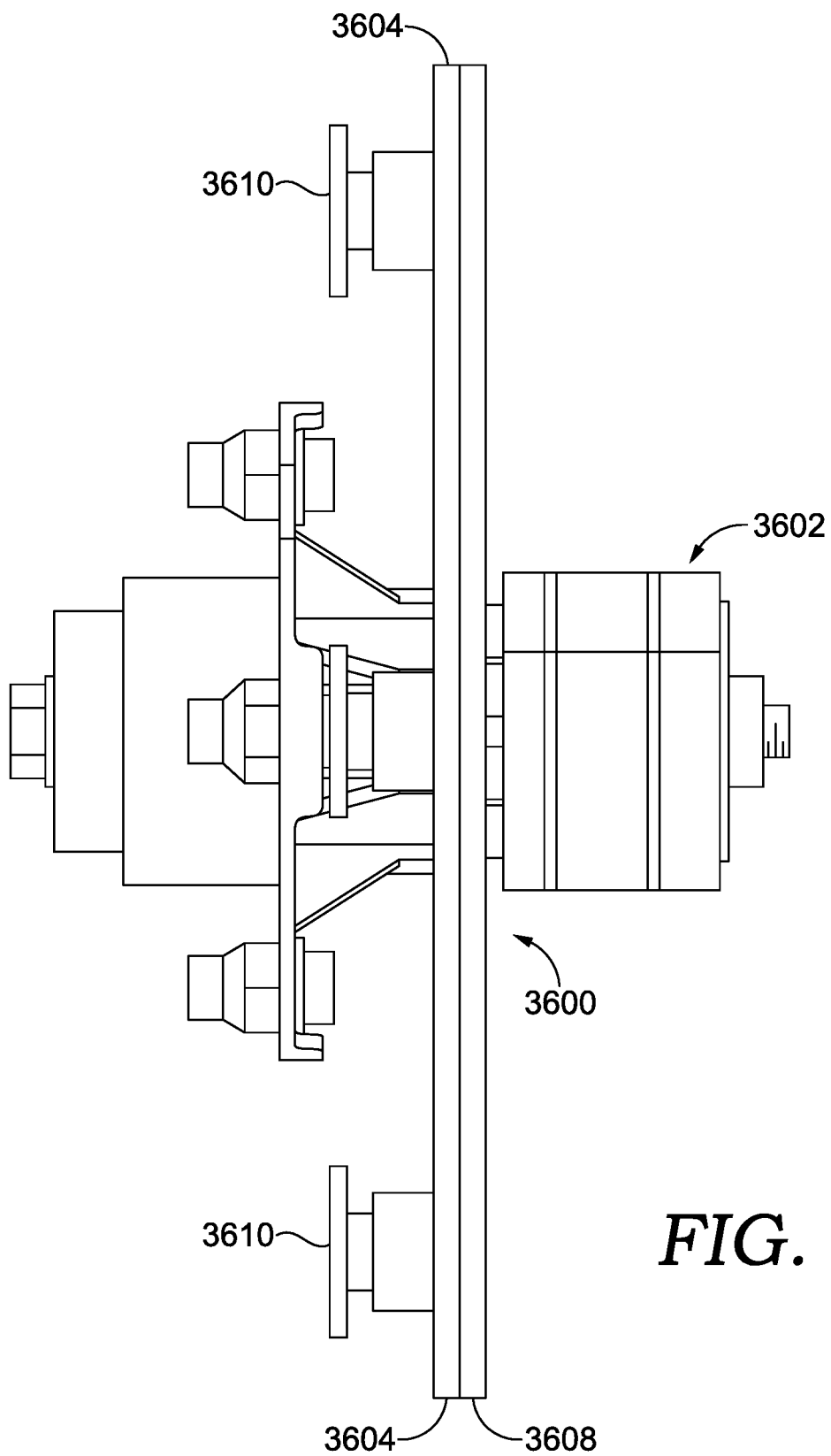
FIG. 39 shows a side view of the adapter before installation on the reel, with the expansion plates abutting one another.

As seen in FIGS. 36-39, a flange adapter assembly 3600 will be described that could be used on any of the flanges described above. FIGS. 36-39 show a simplified flange adapter assembly 3600, without the remainder of the overall flange, for simplicity. A side view of the flange adapter assembly 3600 is shown in FIG. 39. The flange adapter assembly 3600 includes an arbor hole adapter 3602, which could be any of the previously described arbor hole adapters (such as arbor hole adapter 820 shown in FIGS. 2B and 5B). The arbor hole adapter 3602 is operable (as described above) to move between a recessed or retracted condition/position/configuration, shown in FIG. 39, to an expanded condition shown in FIG. 37. As the arbor hole adapter 3602 expands, the outer diameter engages with the inner walls of the arbor hole of the reel, as shown in FIG. 37 (note that in FIG. 37, the central drum of the reel is not shown).

The arbor hole adapter 3602 is coupled to a first expansion plate 3604, as best seen in FIG. 36. Note again that the remainder of the flange is not shown in FIGS. 36-39 for simplicity in explanation, and that the flange adapter assembly 3600 could be used and integrated into any of the flanges described above. The first expansion plate 3604 includes a number of circumferentially-spaced locking slots 3606. The locking slots 3606 are used to couple the first expansion plate 3604 to a second expansion plate 3608 using shoulder bolts 3610. The shoulder bolts 3610 are threaded into the second expansion plate 3608 with the shoulder extending through the locking slots 3606 to slidably secure the first expansion plate 3604 to the second expansion plate 3608. The first expansion plate 3604, and thus the arbor hole adapter 3602, can therefore move from the position shown in FIG. 39 (with the first expansion plate 3604 abutting the second expansion plate 3608), to the position shown in FIGS. 36 and 38 (with the first expansion plate 3604 spaced from the second expansion plate 3608). The shoulder bolts 3610 may include a groove that holds the first expansion plate 3604 in the position shown in FIG. 36, or that holds the expansion plates 3604, 3608 in other positions relative to each other (e.g., an abutting position).

In use, the flange adapter assembly 3600 operates to allow the arbor hole adapter 3602 to better engage the arbor hole of the reel when a thin-walled reel is encountered. When a flange is installed on a reel, if the arbor hole adapter (such as the arbor hole adapter 3602) does not seem to be fully-engaged with the arbor hole of the reel, the flange adapter assembly 3600 operates to move the arbor hole adapter 3602 relative to the reel to adjust its engagement. More specifically, with the arbor hole adapter 3602 in the extended position as shown in FIG. 37, the first expansion plate 3604 can be moved away from the second expansion plate 3608, guided by shoulder bolts 3610. Once in this position, the first expansion plate 3604 can be turned relative to the second expansion plate 3608 to lock the first expansion plate 3604 in place extended away from the second expansion plate 3608. The movement of the first expansion plate 3604 relative to the second expansion plate 3608 moves the arbor hole adapter 3602 as well, moving the arbor hole adapter 3602 into a more-positive engagement with the arbor hole of the reel (i.e., by moving to a different axial position relative to the reel). The flange adapter assembly 3600 thus allows a more positive, or secure, engagement of the flange with the reel, even when thin-walled reels are encountered.

The subject matter described above is provided by way of illustration only and should not be construed as limiting. Values disclosed may be at least the value listed. Values also may be at most the value listed. Various modifications and changes may be made to the subject matter described herein without following the example embodiments and applications illustrated and described, and without departing from the true spirit and scope of the claimed subject matter, which is set forth in the following claims.

What is claimed is:

1. An assembly for attaching a flange to a reel, the assembly comprising:
   the flange;
   a hub assembly coupled to the flange; and
   an arbor hole adapter coupled to the hub assembly, the arbor hole adapter having at least one expandable portion that is movable between a retracted position and an extended position for securing the flange to the reel, wherein the flange is independently rotatable relative to the reel when attached to the reel using the arbor hole adapter wherein the arbor hole adapter is coupled to a first expansion plate and a second expansion plate wherein the first expansion plate includes a plurality of circumferentially-spaced slots wherein each of the plurality of circumferentially-spaced slots comprises an elongated locking slot.

2. The assembly of claim 1, further comprising a plurality of shoulder bolts coupled between the first expansion plate and the second expansion plate.

3. The assembly of claim 2, wherein the plurality of shoulder bolts are threaded through the second expansion plate and through the respective plurality of circumferentially-spaced slots on the first expansion plate, slidably securing the first expansion plate to the second expansion plate.

4. The assembly of claim 3, wherein the first expansion plate and the second expansion plate are movable between an abutting configuration and a spaced-apart configuration guided by the plurality of shoulder bolts.

5. The assembly of claim 4, wherein the plurality of shoulder bolts include respective grooves for locking a position of the first expansion plate relative to the second expansion plate in the spaced-apart configuration.

6. A method of securing a flange to a reel, the method comprising:
   positioning the flange adjacent to the reel, the flange coupled to an arbor hole adapter and a hub assembly, the arbor hole adapter having at least one expandable portion that is movable between a retracted position and an extended position;
   inserting the expandable portion at least partially into an arbor hole of the reel while the expandable portion is in the retracted position; and
   moving the expandable portion from the retracted position to the extended position to engage the reel, wherein the hub assembly permits independent rotation of the flange relative to the reel when the flange is secured to the reel using the arbor hole adapter wherein the arbor hole adapter is coupled to a first expansion plate and a second expansion plate that are movable between an abutting configuration and a spaced-apart configuration.

7. The method of claim 6, wherein the first expansion plate and the second expansion plate are coupled with a plurality of shoulder bolts that extend between the first expansion plate and the second expansion plate.

8. The method of claim 7, wherein the plurality of shoulder bolts are threaded through the second expansion plate and through a plurality of circumferentially-spaced slots in the first expansion plate, slidably securing the first expansion plate to the second expansion plate.

9. The method of claim 8, further comprising:
   moving the first expansion plate and the second expansion plate from the abutting configuration to the spaced-apart configuration; and
   rotating the first expansion plate relative to the second expansion plate to move the plurality of shoulder bolts into a locked position in the plurality of circumferentially-spaced slots, securing the first expansion plate and the second expansion plate in the spaced-apart configuration.

10. The method of claim 9, further comprising:
    prior to moving the first expansion plate and the second expansion plate from the abutting configuration to the spaced-apart configuration, moving the expandable portion from the extended position to the retracted position; and
    after moving the first expansion plate and the second expansion plate from the abutting configuration to the spaced-apart configuration, moving the expandable portion from the retracted position to the extended position to engage the reel.

* * * * *